(12) United States Patent
Shamoto et al.

(10) Patent No.: US 11,883,973 B2
(45) Date of Patent: Jan. 30, 2024

(54) CUTTING APPARATUS AND CONTACT POSITION SPECIFYING PROGRAM

(71) Applicant: NATIONAL UNIVERSITY CORPORATION TOKAI NATIONAL HIGHER EDUCATION AND RESEARCH SYSTEM, Aichi (JP)

(72) Inventors: Eiji Shamoto, Nagoya (JP); Hongjin Chung, Nagoya (JP); Takehiro Hayasaka, Nagoya (JP); Seiji Hamada, Nagoya (JP)

(73) Assignee: NATIONAL UNIVERSITY CORPORATION TOKAI NATIONAL HIGHER EDUCATION AND RESEARCH SYSTEM, Aichi (JP)

( * ) Notice: Subject to any disclaimer, the term of this patent is extended or adjusted under 35 U.S.C. 154(b) by 630 days.

(21) Appl. No.: 16/826,803

(22) Filed: Mar. 23, 2020

(65) Prior Publication Data

US 2020/0269458 A1 Aug. 27, 2020

Related U.S. Application Data

(63) Continuation of application No. PCT/JP2019/007326, filed on Feb. 26, 2019.

(51) Int. Cl.
*B26D 5/00* (2006.01)
*G05B 19/401* (2006.01)
(Continued)

(52) U.S. Cl.
CPC ......... *B26D 5/005* (2013.01); *B23Q 17/2233* (2013.01); *G05B 19/401* (2013.01); *G05B 19/4086* (2013.01)

(58) Field of Classification Search
CPC .. G05B 19/18; G05B 19/401; G05B 19/4086; G05B 2219/37408; B23Q 17/2233; B23B 3/16; B23B 25/06; B26D 5/005
(Continued)

(56) References Cited

U.S. PATENT DOCUMENTS 10,261,495 B2 * 4/2019 Ishii ................... G05B 19/4065
2020/0183372 A1 * 6/2020 Hara .................. G05B 23/0221

FOREIGN PATENT DOCUMENTS

CN 101898253 A 12/2010
CN 103522348 A 1/2014
(Continued)

OTHER PUBLICATIONS

English translation of JP 08-118103. (Year: 1996).*
(Continued)

*Primary Examiner* — Jennifer S Matthews
(74) *Attorney, Agent, or Firm* — Muncy, Geissler, Olds & Lowe, P.C.

(57) ABSTRACT

A controller uses detection information of a contact sensor or time-series data of a detection value related to a drive motor included in a rotation mechanism and/or a feed mechanism to acquire a coordinate value when a cutting tool comes into contact with a to-be-cut object or a component. The controller determines a relative positional relationship between the cutting tool and a rotation center of the to-be-cut object based on coordinate values when the cutting tool comes into contact with the to-be-cut object subjected to turning work or a reference surface whose relative positional relationship with the rotation center of the to-be-cut object is known at least at two positions different from a rotation angle position of the cutting tool during the turning work.

8 Claims, 38 Drawing Sheets

(51) Int. Cl.
*G05B 19/408* (2006.01)
*B23Q 17/22* (2006.01)

(58) Field of Classification Search
USPC .......................................................... 82/118
See application file for complete search history.

(56) References Cited

FOREIGN PATENT DOCUMENTS

| JP | 64-16354 A | 1/1989 |
|---|---|---|
| JP | 8-118103 A | 5/1996 |
| JP | 10-20911 A | 1/1998 |
| JP | H10244409 A | 9/1998 |
| JP | 2002-120130 A | 4/2002 |
| JP | 2004090199 A | 3/2004 |
| JP | 2009034738 A | 2/2009 |
| JP | 2017-164699 A | 9/2017 |
| JP | 2019-000945 A | 1/2019 |
| JP | 2019000945 A * | 1/2019 |
| KR | 910005508 B1 * | 7/1991 |
| WO | WO 98/57776 A1 | 12/1998 |
| WO | WO 00/054913 A1 | 9/2000 |
| WO | WO 2019/044911 A1 | 3/2019 |

OTHER PUBLICATIONS

English translation of JPH1020911A. (Year: 1998).*
Office action dated Nov. 24, 2021 for corresponding Japanese Patent Application No. 2021-044938, with English translation, 5 pages.
Office Action of JP Application No. 2020516931 and English translation, dated Jan. 19, 2021, 11 pages.
International Search Report and Written Opinion of ISA issued in corresponding PCT application No. PCT/JP2019/007326 dated Jun. 4, 2019 (with an English translation).
International Preliminary Examination Authority Opinion issued in corresponding PCT application No. PCT/JP2019/007326 dated Feb. 2, 2020 (with an English translation).
Duong et al., *Tool alignment on the B axis rotary table of an ultra-precision lathe machine*. J Tsinghua Univ (Sci & Technol), 2014, vol. 54, No. 11, ISSN 1000-0054, DOI:10.16511/j.cnki.qhdxxb.2014.11.005, pp. 1466-1470.

* cited by examiner

LOCATED AT SAME Z POSITION

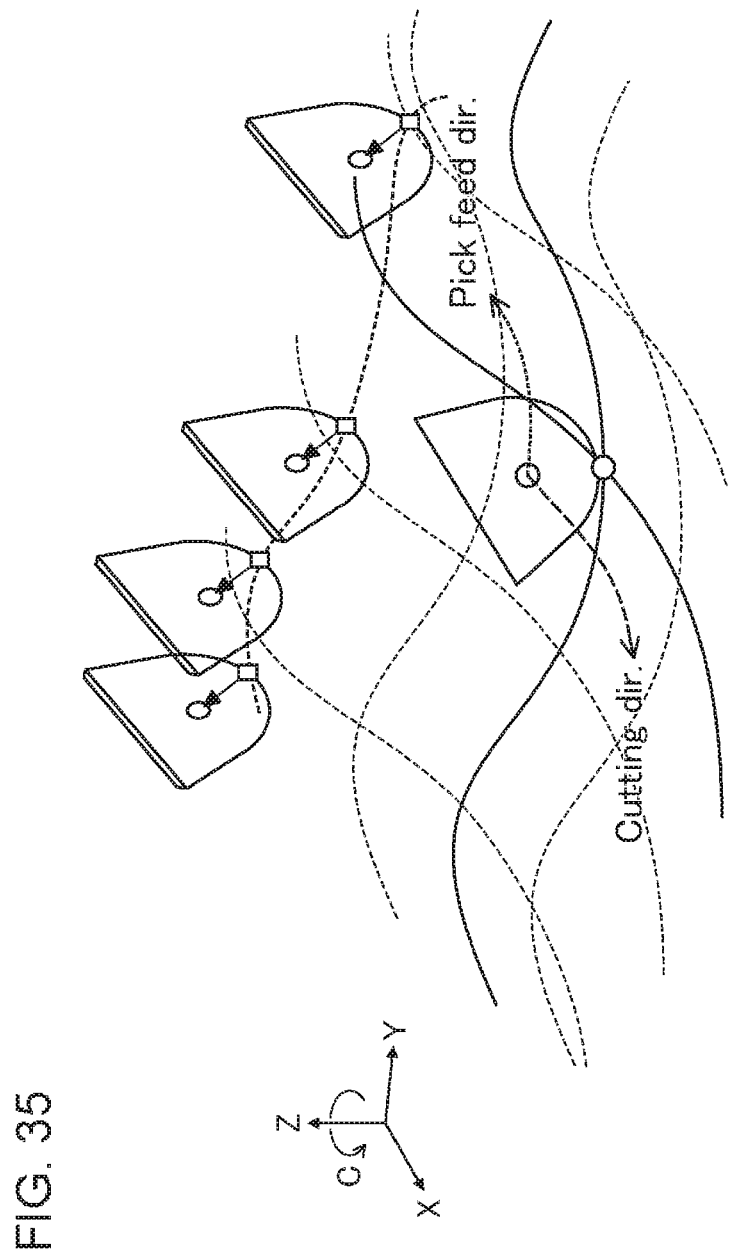

B-AXIS ROTATION CENTER

B-AXIS ROTATION CENTER

CUTTING APPARATUS AND CONTACT POSITION SPECIFYING PROGRAM

CROSS-REFERENCE TO RELATED APPLICATIONS

This application is based upon and claims the benefit of priority from the International Application No. PCT/JP2019/007326, filed on Feb. 26, 2019, the entire contents of which are incorporated herein by reference.

BACKGROUND

1. Field of the Invention

The present disclosure relates to a cutting apparatus that cuts a to-be-cut object (workpiece) with a cutting tool.

2. Description of the Related Art

In a conventional method for setting an origin for a cutting apparatus, a cutting edge position of a cutting tool is measured with a measuring instrument and then adjusted. In another method, a to-be-cut object is first machined with a cutting tool, a shape of the to-be-cut object subjected to the machining work is measured with a measuring instrument, and then a cutting edge position is corrected based on the measurement result. The above methods are both origin setting methods using a measuring instrument.

JP 2004-090199 A discloses a contact detector that detects contact with a rotary tool attached to a spindle of a machining apparatus. The contact detector includes a disk-shaped contact that can come into contact with the rotary tool, and a vibration sensor that detects contact vibrations when the contact and the rotary tool come into contact with each other. Bringing the rotary tool into contact with a flat surface portion and side surface portion of the contact causes a length and outer diameter of the rotary tool to be measured, and an accurate position of the rotary tool is grasped accordingly.

JP 2002-120130 A discloses a cutting edge position control method for causing a cutting edge of a cutting tool and a to-be-contacted object to relatively move to come into contact with each other and controls, based on a movement position of a moving device at the time of the contact, subsequent relative movement between the cutting tool and a to-be-machined object. In this method, a mechanism by which, when the cutting edge comes into contact with the to-be-contacted object, an electric circuit is closed to allow a current to flow is used to detect the position of the moving device for cutting tool at the time of current flow. The detected position is used as a reference position for subsequent movement control of the cutting tool.

JP 2009-034738 A discloses a technique for determining contact between a workpiece and a probe when a result from comparison between a position deviation input from X-axis servo means and a reference value set by a position deviation reference value setting means shows that the position deviation is greater than the reference value.

For the purpose of origin setting, it is not preferable to install a measuring instrument that measures the cutting edge position, the shape of the to-be-cut object subjected to machining work, and the like because the installation of the measuring instrument leads to an increase in cost.

Therefore, it is desired to implement a highly accurate origin setting without using such a measuring instrument.

SUMMARY

The present disclosure has been made in view of such circumstances, and it is therefore an object of the present disclosure to provide a technique for specifying a relative positional relationship between a tool cutting edge and a target object such as a to-be-cut object without a measuring instrument or a technique required for specifying the relative positional relationship between the two without a measuring instrument.

In order to solve the above-described problems, a cutting apparatus according to an aspect of the present invention includes a rotation mechanism that rotates a spindle to which a cutting tool or to-be-cut object is attached, a feed mechanism that moves the cutting tool relative to the to-be-cut object or a component, and a controller that controls rotation of the spindle by the rotation mechanism and relative movement of the cutting tool by the feed mechanism. The controller has a capability of using detection information of a contact sensor or time-series data of a detection value related to a drive motor included in the rotation mechanism and/or the feed mechanism to acquire a coordinate value when the cutting tool comes into contact with the to-be-cut object or the component. The controller determines a relative positional relationship between the cutting tool and a rotation center of the to-be-cut object based on coordinate values when the cutting tool comes into contact with the to-be-cut object subjected to turning work or a reference surface whose relative positional relationship with the rotation center of the to-be-cut object is known at least at two positions different from a rotation angle position of the cutting tool during the turning work.

Another aspect of the present invention is also a cutting apparatus. The cutting apparatus includes a rotation mechanism that rotates a spindle to which a cutting tool or to-be-cut object is attached, a feed mechanism that moves the cutting tool relative to a target object, and a controller that controls rotation of the spindle by the rotation mechanism and relative movement of the cutting tool by the feed mechanism. The controller has a capability of acquiring a coordinate value when the cutting tool is moved relative to an object having a known shape to bring a cutting edge of the cutting tool into contact with a portion having the known shape of the object using detection information of a contact sensor or time-series data of a detection value related to a drive motor included in the rotation mechanism and/or the feed mechanism. The controller obtains, based on coordinate values when the cutting edge of the cutting tool comes into contact with the portion having the known shape of the object at least at three positions, at least one of a nose radius of the cutting edge of the cutting tool, center coordinates of the cutting edge of the cutting tool, and an error in shape of the cutting edge of the cutting tool.

Yet another aspect of the present invention is also a cutting apparatus. The cutting apparatus includes a rotation mechanism that rotates a spindle to which a cutting tool or to-be-cut object is attached, a feed mechanism that moves the cutting tool relative to the to-be-cut object, and a controller that controls rotation of the spindle by the rotation mechanism and relative movement of the cutting tool by the feed mechanism. The controller has a capability of using detection information of a contact sensor or time-series data of a detection value related to a drive motor included in the rotation mechanism and/or the feed mechanism to acquire a coordinate value when the cutting edge of the cutting tool comes into contact with the to-be-cut object. The controller specifies, based on coordinate values when the cutting tool is moved relative to the to-be-cut object subjected to cutting work using a feed capability of the feed mechanism in a movement direction not used for the cutting work to bring the cutting tool into contact with the to-be-cut object at least at two positions, at least one of an attachment error of the cutting tool, an error in shape of the cutting edge of the cutting tool, and a deviation in movement direction of the cutting tool relative to the to-be-cut object.

Yet another aspect of the present invention is also a cutting apparatus. The cutting apparatus includes a rotation mechanism that rotates a spindle to which a cutting tool or to-be-cut object is attached, a feed mechanism that moves the cutting tool relative to the to-be-cut object, and a controller that specifies a contact position between the cutting tool and the to-be-cut object from time-series data of a detection value related to a drive motor included in the rotation mechanism and/or the feed mechanism. The controller specifies the contact position based on first time-series data of a detection value acquired before contact and second time-series data of a detection value acquired after contact.

Note that any combination of the above-described components, or an entity that results from replacing expressions of the present disclosure among a method, an apparatus, a system, a recording medium, computer program and the like is also valid as an aspect of the present disclosure.

BRIEF DESCRIPTION OF THE DRAWINGS

FIG. 35 is a diagram showing a method for measuring an error in shape of the cutting edge;

DETAILED DESCRIPTION

The invention will now be described by reference to the preferred embodiments. This does not intend to limit the scope of the present invention, but to exemplify the invention.

Figure 1:
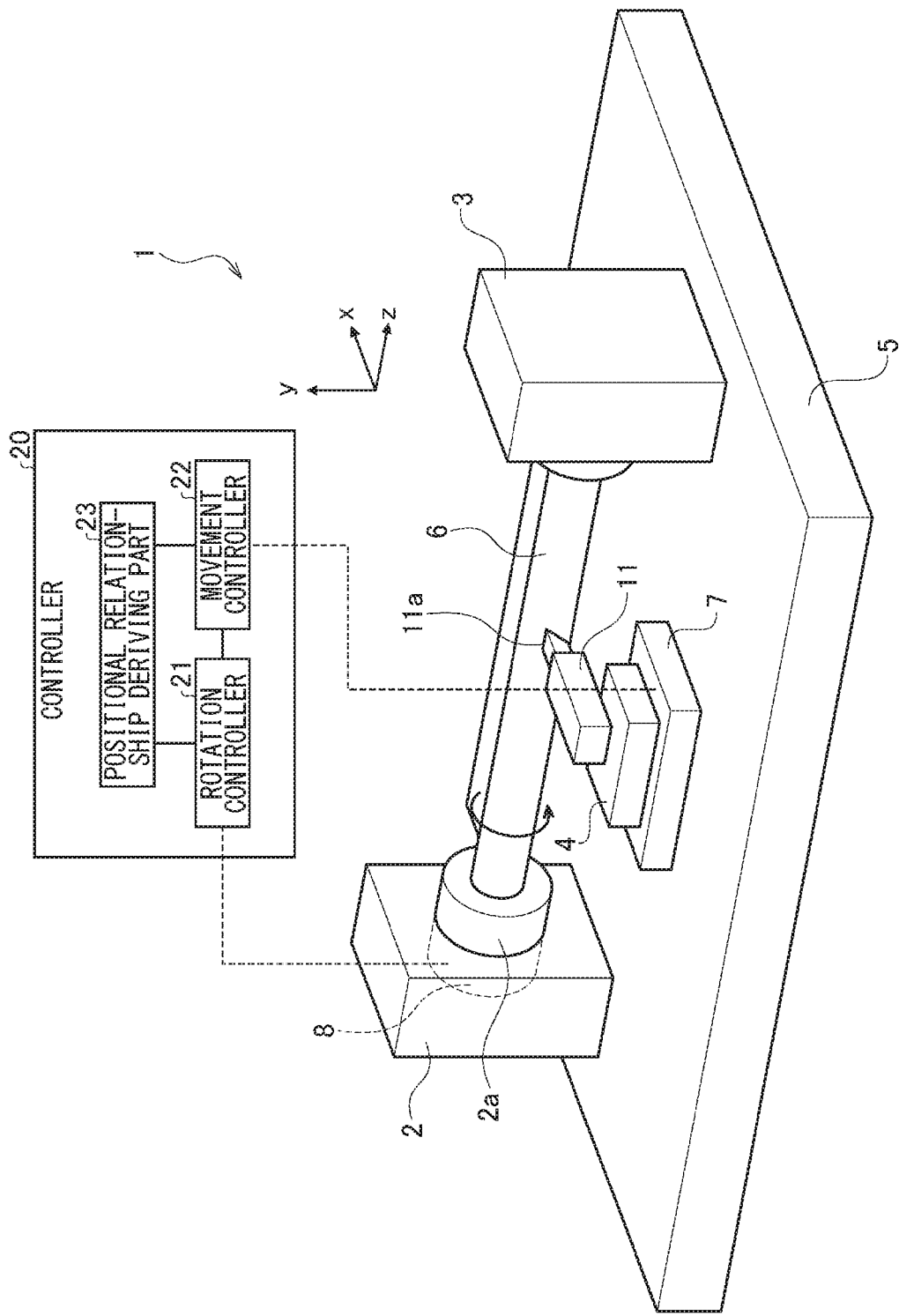
FIG. 1 is a diagram showing a schematic structure of a cutting apparatus.

FIG. 1 shows a schematic structure of a cutting apparatus 1 according to an embodiment. The cutting apparatus 1 shown in FIG. 1 is a cutting apparatus that brings a cutting edge 11a of a cutting tool 11 into contact with a to-be-cut object 6 to turn the to-be-cut object 6. The cutting apparatus 1 may be a numerical control (NC) machine tool. The cutting apparatus 1 shown in FIG. 1 is a roll lathe that turns the to-be-cut object 6 having a cylindrical shape to form a roll for rolling, but may be a cutting apparatus of any other type than turning, such as a cutting apparatus using a rotary tool such as an end mill.

The cutting apparatus 1 includes, on a bed 5, a headstock 2 and a tailstock 3 that support the to-be-cut object 6 rotatable and a tool post 4 that supports the cutting tool 11. A rotation mechanism 8 is provided inside the headstock 2 and rotates a spindle 2a to which the to-be-cut object 6 is attached. A feed mechanism 7 is provided on the bed 5 and moves the cutting tool 11 relative to the to-be-cut object 6. In this cutting apparatus 1, the feed mechanism 7 moves the tool post 4 in X-axis, Y-axis, and Z-axis directions to move the cutting tool 11 relative to the to-be-cut object 6.

In FIG. 1, an X-axis direction is a horizontal direction and depth-of-cut direction orthogonal to an axis of the to-be-cut object 6, a Y-axis direction is a cutting direction that coincides with a vertical direction, and a Z-axis direction is parallel to the axis of the to-be-cut object 6. In FIG. 1, positive and negative directions of each of the X, Y, and Z axes are directions when viewed from the cutting tool 11, but the positive and negative directions are relative directions between the cutting tool 11 and the to-be-cut object 6. Therefore, the positive and negative directions of each axis is not strictly defined herein, and when referring to the positive and negative directions, the directions shown in each drawing are followed.

A controller 20 includes a rotation controller 21 that controls rotation of the spindle 2a by the rotation mechanism 8, a movement controller 22 that causes the feed mechanism 7 to bring the cutting tool 11 into contact with the to-be-cut object 6 to machine the to-be-cut object 6 with the cutting tool 11 while the spindle 2a is rotating, and a positional relationship deriving part 23 that derives a relative positional relationship between the to-be-cut object 6 and the cutting tool 11. The movement controller 22 may control movement of the cutting tool 11 based on coordinates of the cutting edge 11a. The rotation mechanism 8 and the feed mechanism 7 each include a drive unit such as a drive motor, and the rotation controller 21 and the movement controller 22 each adjust power to be supplied to a corresponding drive unit to control behavior of a corresponding one of the rotation mechanism 8 and the feed mechanism 7.

In the cutting apparatus 1 according to the embodiment, the to-be-cut object 6 is attached to the spindle 2a and is rotated by the rotation mechanism 8. Another example may be employed where a cutting tool that is a rotary tool is attached to the spindle 2a and is rotated by the rotation mechanism 8. Further, the feed mechanism 7 only needs to move the cutting tool 11 relative to the to-be-cut object 6 and have a mechanism for moving at least either the cutting tool 11 or the to-be-cut object 6.

The feed mechanism 7 may have not only a feed capability in translation directions along the X axis, the Y axis, and the Z axis but also a feed capability in rotation directions about an A axis, a B axis, and a C axis. The feed mechanism 7 according to the embodiment preferably has not only a feed capability in a movement direction that is required for cutting work but also a feed capability in a movement direction that is not used for cutting work. That is, the feed mechanism 7 is configured to have the feed capability in the movement direction that is not required (in other words, redundant) for cutting work in addition to the feed capability in the movement direction that is required for cutting work. The feed capability in the redundant direction may be used to move the cutting tool 11 relative to a pre-machined surface to be described later.

When the cutting tool 11 is newly attached to the cutting apparatus 1 at the time of tool change, for example, it is required that, in order to allow the movement controller 22 to achieve high movement accuracy (machining accuracy), an origin be appropriately set, and a coordinate value of the cutting edge 11a be accurately specified. In the embodiment, when the origin is set, the movement controller 22 moves the cutting edge 11a to bring the cutting edge 11a into contact with a target object (for example, a pre-machined to-be-cut object 6), specifies a contact timing, and then specifies a contact position from control information, at the contact timing, of the movement controller 22. Therefore, the cutting apparatus 1 may include a contact sensor that detects contact of the cutting edge 11a with the target object. The contact sensor may be, for example, a vibration sensor that detects vibrations at the time of contact, or a sensor that detects continuity when the cutting edge comes into contact with the target object.

Note that the cutting apparatus 1 according to the embodiment may have a capability of analyzing a history of internal information on the cutting apparatus 1 that changes when the cutting edge 11a comes into contact with the target object to detect contact between the cutting edge 11a and the target object. Using a detection value related to the drive motor included in the rotation mechanism 8 and/or the feed mechanism 7 as the internal information eliminates the need for an additional component. The cutting apparatus 1 having such a capability eliminates the need for a sensor that detects contact, but a contact sensor may be provided for the purpose of increasing contact detection accuracy.

Figure 2:
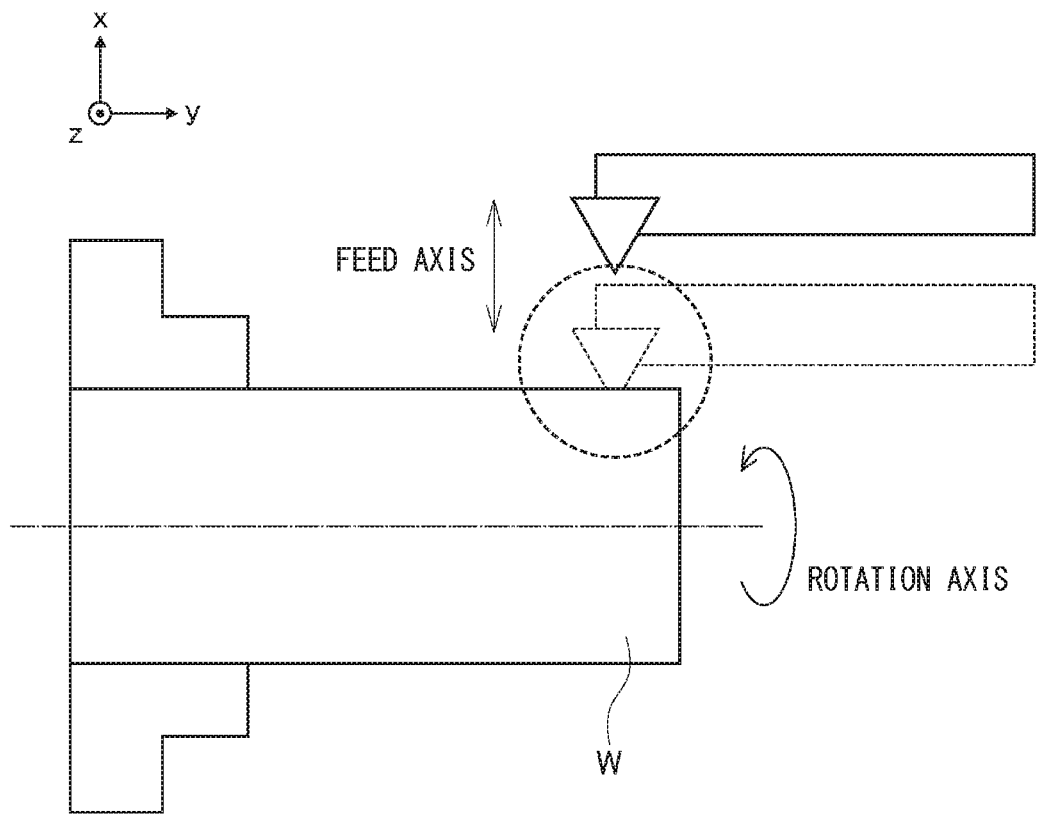
FIG. 2 is a diagram showing an outline of an experiment on a contact detection method.
Figure 3:
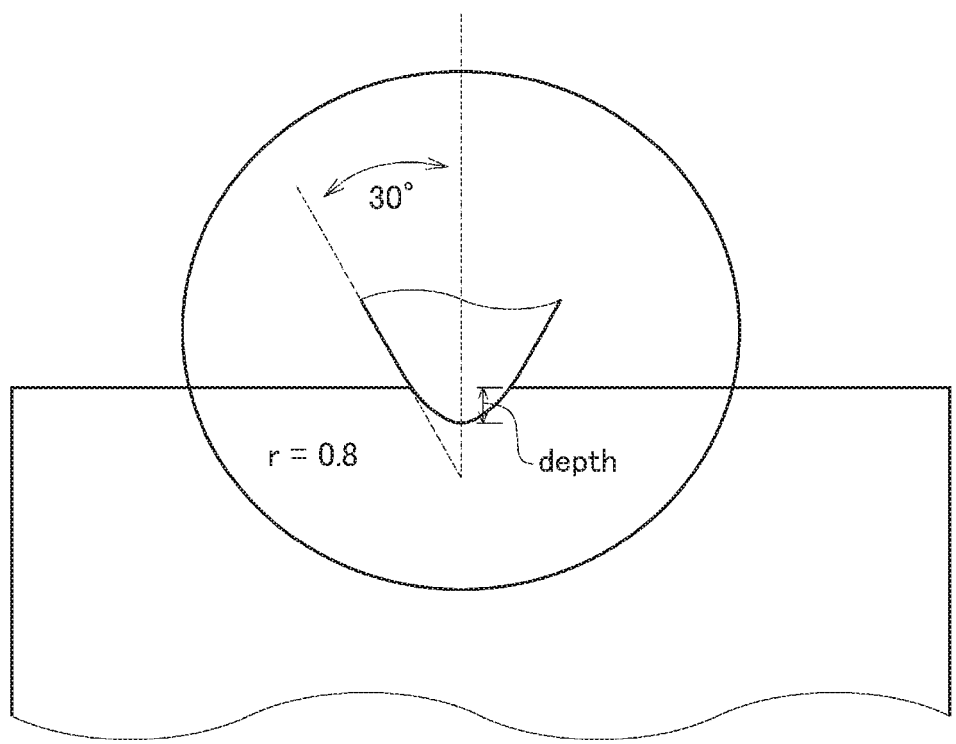
FIG. 3 is a diagram showing a state where a cutting edge comes into contact with a workpiece and is then cut in the workpiece.

FIG. 2 shows an outline of an experiment on a contact detection method. This experiment was conducted in order to verify the contact detection method using the internal information on the condition that the origin is preset. As a workpiece W, a round bar made of H3250 C4641BE (Naval Brass) and having a diameter of 70 mm was used. During the experiment, the rotation controller 21 rotates the spindle to which the workpiece W is attached at a rotation speed of 120 rpm. The movement controller 22 brings the cutting tool 11 close to the workpiece W at a feed speed of 0.2 mm/rev to cut in the workpiece W by cutting depth of 0.1 mm, and then moves the cutting tool 11 away from the workpiece W at the same feed speed. FIG. 3 shows a state where the cutting edge 11a comes into contact with the workpiece W and then cut in the workpiece W.

Figure 4:
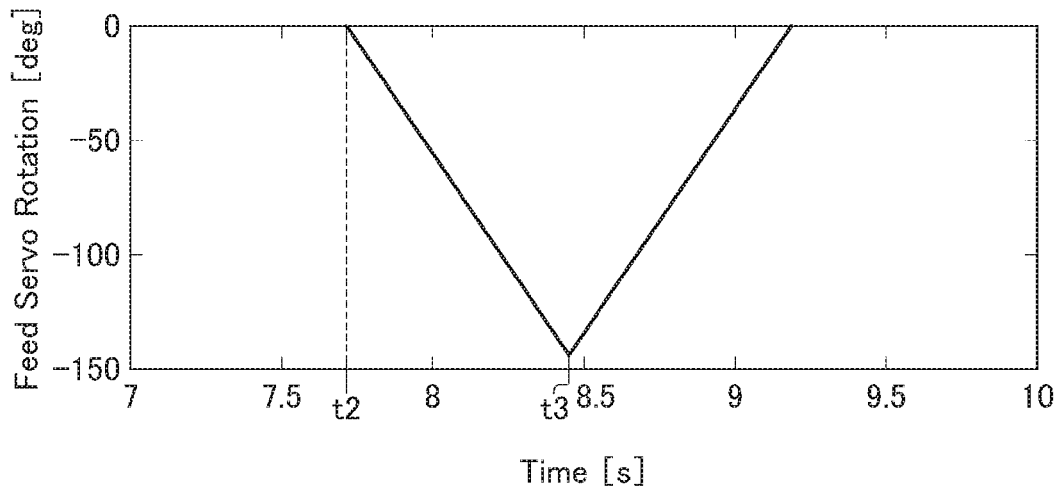
FIG. 4 is a diagram showing changes over time in internal information on a feed axis during the experiment.

FIG. 4 shows changes over time in internal information on a feed axis during the experiment. The movement controller 22 starts to feed the cutting tool 11 at a time t2, and keeps feeding the cutting tool 11 in the depth-of-cut direction at the constant feed speed of 0.2 mm/rev to cut in the workpiece W by depth of 0.1 mm (time t3). Subsequently, the movement controller 22 moves the cutting tool 11 away from the workpiece W at the feed speed of 0.2 mm/rev.

Figure 5:
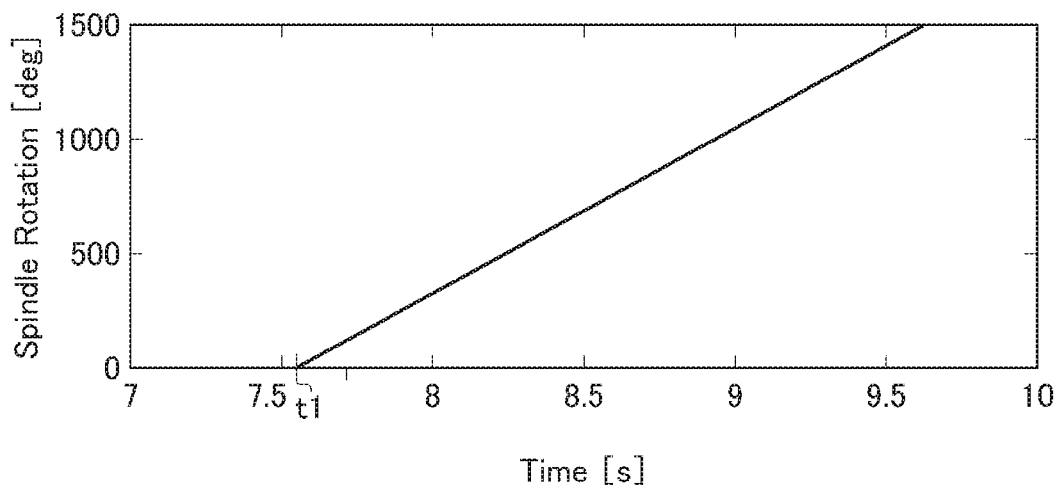
FIG. 5 is a diagram showing changes over time in internal information on a spindle rotation axis during the experiment.

FIG. 5 shows change over time in internal information on a rotation axis of the spindle during the experiment. The rotation controller 21 starts to rotate the spindle at a time t1. The rotation speed is 120 rpm.

Figure 6:
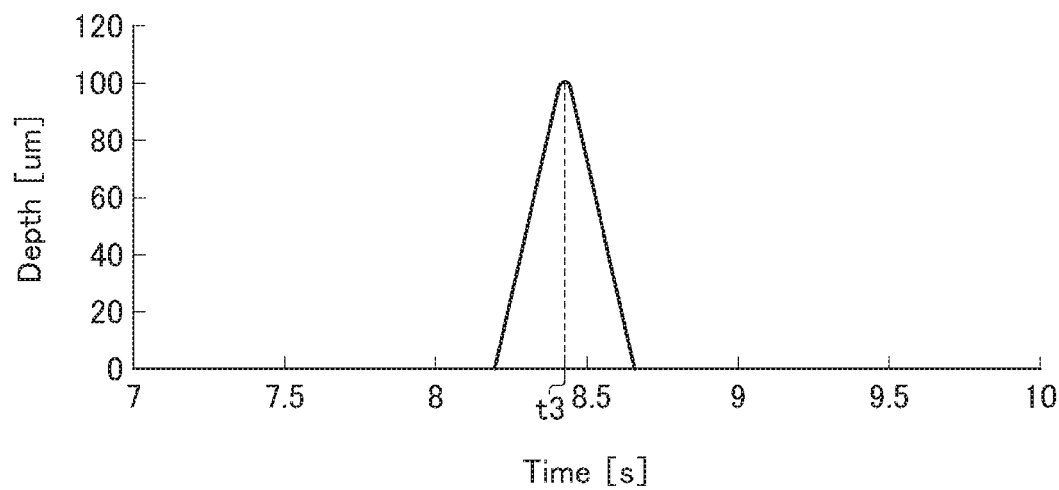
FIG. 6 is a diagram showing changes over time in cutting depth of the cutting edge.

FIG. 6 shows changes over time in cutting depth of the cutting edge. The cutting depth is calculated from the internal information on the feed axis shown in FIG. 4.

Figure 7:
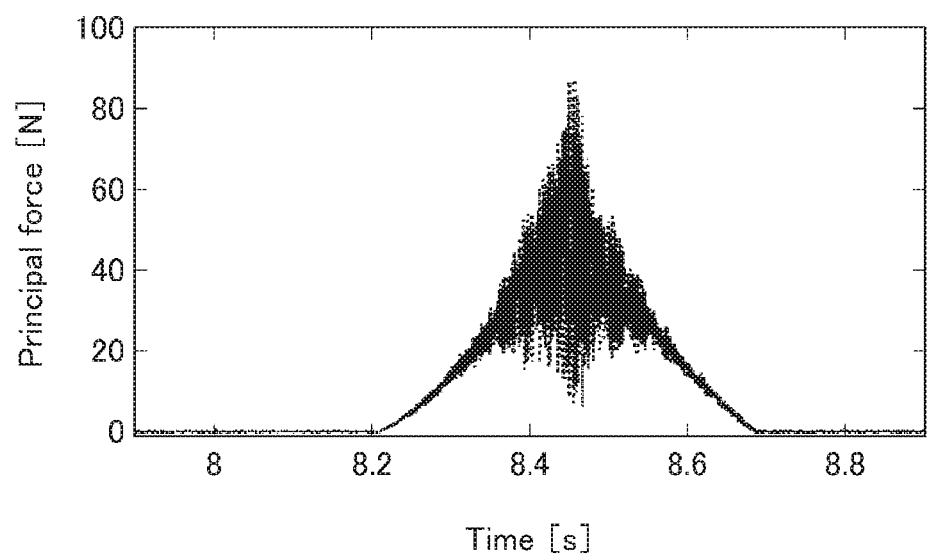
FIG. 7 is a diagram showing changes in detection value of principal force of cutting force detected by an external sensor.

FIG. 7 shows changes in detection value of principal force of cutting force detected by an external sensor. The cutting apparatus used in this experiment is equipped with the external sensor that detects cutting force, and FIG. 7 shows changes over time in cutting force detected by the external sensor.

Figure 8:
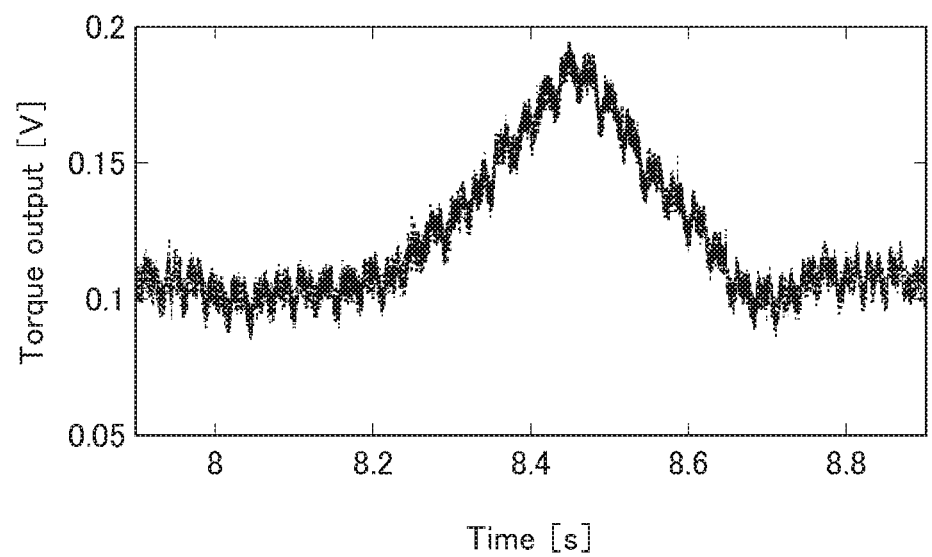
FIG. 8 is a diagram showing changes in detection value of torque output.

FIG. 8 shows changes in detection value of torque output. The torque detection value is calculated using an estimation function installed in the cutting apparatus. A torque value is proportional to a motor current value, and the cutting apparatus acquires a motor current through the drive motor of the spindle and calculates the torque output.

A waveform of the principal force shown in FIG. 7 and a waveform of the torque value shown in FIG. 8 are almost identical to each other. Therefore, it is understood that the contact between the workpiece W and the cutting tool 11 can be detected by analyzing a torque output (motor current).

Figure 9:
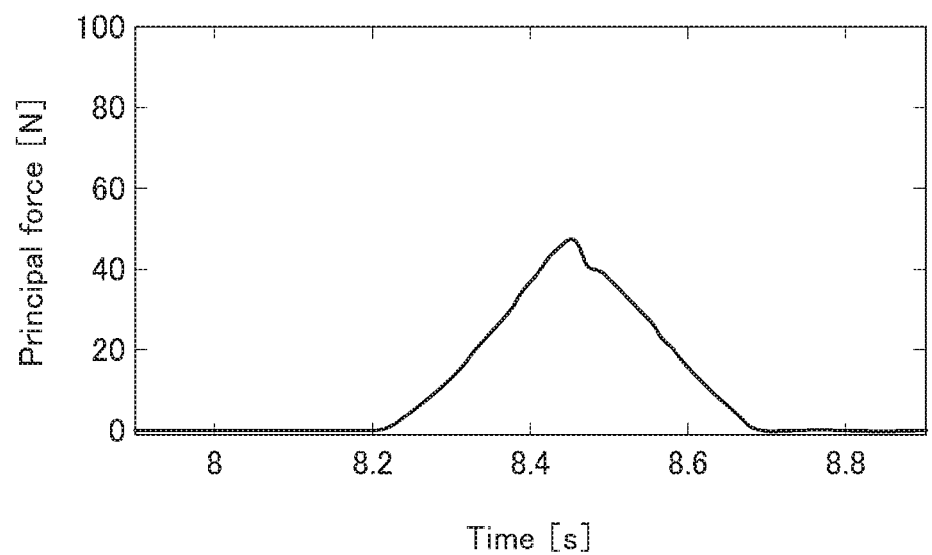
FIG. 9 is a diagram showing changes in principal force resulting from signal processing on the detection value of the principal force to remove noise.

FIG. 9 shows changes in principal force resulting from signal processing on the detection value of the principal force to remove noise.

Figure 10:
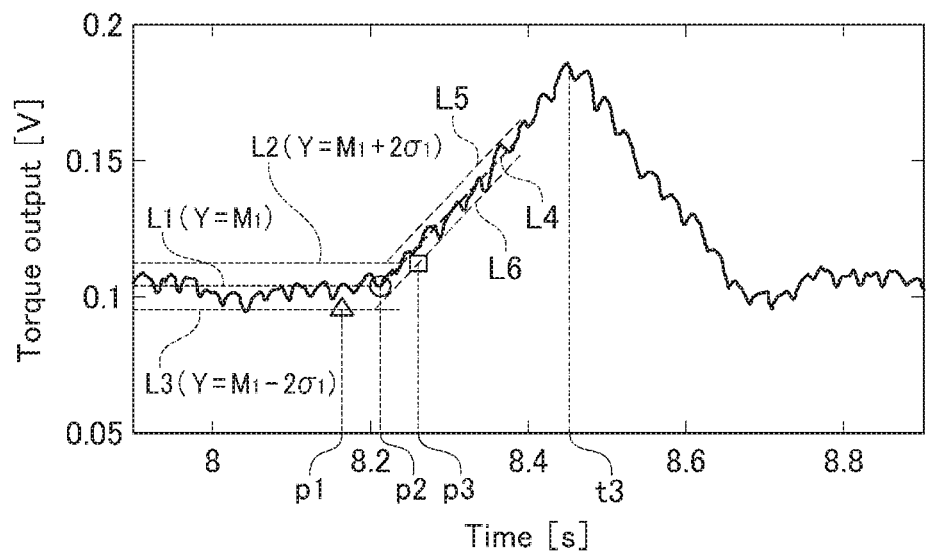
FIG. 10 is a diagram showing changes in torque resulting from signal processing on the torque detection value to remove noise.

FIG. 10 shows changes in torque resulting from signal processing on the torque detection value to remove noise. The removal of noise allows an increase in reliability of time-series data of the torque detection value.

A description will be given below of a method in which the controller 20 determines the contact between the cutting tool 11 and the workpiece W from the time-series data of the torque detection value subjected to the signal processing. Note that the controller 20 can also determine the contact using the time-series data of the torque detection value that has not been subjected to the signal processing. The positional relationship deriving part 23 according to the embodiment has a capability of specifying a contact position from time-series data of the detection value related to the drive motor included in the rotation mechanism 8 and/or the feed mechanism 7.

After the feed of the cutting tool 11 by the movement controller 22, the positional relationship deriving part 23 acquires time-series data of a torque estimation value shown in FIG. 10, and specifies first time-series data of a detection value acquired before contact and second time-series data of a detection value acquired after contact. At this time, since the positional relationship deriving part 23 does not know the contact timing, the positional relationship deriving part 23 specifies the first time-series data and the second time-series data based on the following criteria.

As shown in FIG. 5, the rotation controller 21 starts to rotate the spindle at the time t1, and as shown in FIG. 4, the movement controller 22 starts to feed the cutting tool 11 at the time t2. Therefore, between the time t1 and the time t2, the spindle is rotating, and the cutting tool 11 is surely in non-contact with the workpiece W. Accordingly, the positional relationship deriving part 23 specifies the time-series data of the torque detection value calculated between the time t1 and the time t2 as the first time-series data acquired before contact. Note that, a torque detection value acquired in a time period in which it is ensured that contact has not been made even after the start of feed of the cutting tool 11, that is, after the time t2, may be contained in the first time-series data.

The positional relationship deriving part 23 calculates an average value $M_1$ and standard deviation $\sigma_1$ of the first time-series data thus specified. In this experiment, $M_1 = 0.1045$, and $\sigma_1 = 0.0043$ are calculated.

In FIG. 10, a line L1 represents the torque average value $M_1$ acquired before contact, a line L2 represents an average value $M_1 + 2\sigma_1$, and a line L3 represents $M_1 - 2\sigma_1$.

Next, the positional relationship deriving part 23 specifies the second time-series data of the torque detection value acquired after contact. The positional relationship deriving part 23 may specify time-series data of a torque detection value greater than a predetermined threshold as the second time-series data. The positional relationship deriving part 23 may set the predetermined threshold based on the first time-series data. For example, the positional relationship deriving part 23 sets the predetermined threshold to $(M_1 + 3\sigma_1)$ and specifies continuous time-series data of the torque detection value greater than the threshold as the second time-series data. Note that when specifying the second time-series data, a time period in which the torque detection value less than the threshold is contained at a predetermined rate (for example, 2%) or less may be regarded as a time period in which the torque detection value substantially exceeds the threshold, and the torque detection value may be contained in the second time-series data. The positional relationship deriving part 23 specifies, as the second time-series data, the torque detection value from the time t3 back to a time when the torque detection value is equal to or less than $(M_1 + 3\sigma_1)$.

The positional relationship deriving part 23 calculates timing at which the cutting edge 11a comes into contact with the workpiece W from a regression equation obtained by regression analysis of the second time-series data and the average value of the first time-series data. A suitable regression analysis method may be used. For example, the positional relationship deriving part 23 derives the regression equation, using the least squares method, and standard deviation $\sigma_2$ of the second time-series data and finds an intersection point of the regression equation and the torque average value $M_1$. In this experiment, LINEAR APPROXIMATION LINE $Y = 0.3068 \times X - 2.4155$ $\sigma_2 = 0.0031$ is calculated. The X axis represents time, and the Y axis represents torque output. Note that the regression equation may be expressed by a quadratic or higher approximation curve. In FIG. 10, a line L4 represents a regression equation that is a linear approximation line, and line L2 and line L3 represent lines shifted from the regression equation by $2\sigma_2$ and $-2\sigma_2$ in the Y-axis direction, respectively.

In FIG. 10, a point denoted by a circle is an intersection point of the line L1 and the line L4. Therefore, a timing $p_2$ at which it is estimated that the cutting edge 11a comes into contact with the workpiece W is calculated from:

$M_1 = 0.3068 \times p_2 - 2.4155$

When a maximum error is estimated with a confidence interval of 95% ($2\sigma$), a point denoted by a triangle is an intersection point of the line L3 and a line L5, and a point denoted by a square is an intersection point of the line L2 and the line L6. Therefore, contact timing $p_1$ and contact timing $p_3$ containing the maximum time error are calculated from:

$$M_1 - 2\sigma_1 = 0.3068 \times p_1 - 2.4155 + 2\sigma_2$$

and $$M_1 + 2\sigma_1 = 0.3068 \times p_3 - 2.4155 - 2\sigma_2$$

As a result, a maximum error $e_p$ of the contact position in the experiment is determined to be 0.019 mm.

As described above, the positional relationship deriving part 23 calculates the contact timing from the time-series data of the detection value related to the drive motor. Compared to a case where timing when a detection amount exceeds the predetermined threshold is simply determined to be the contact timing, this method uses a regression equation derived from the history of the detection amount, so that accurate contact timing before the detection amount reaches the threshold can be determined.

In this method, the cutting tool 11 and the workpiece W are brought close to each other while the cutting tool 11 or the workpiece W is rotating or reversely rotating to perform minute cutting or burnishing (smoothing by pushing), so that minute cutting marks or indentations are left on the surface of the workpiece W. For this reason, it is not desirable to apply this method after final finishing work, but if this method is applied before the final finishing work, such minute cutting marks/indentations left due to the application of this method will cause no problem.

In a case of continuous turning, as shown in FIG. 10, a detection value that gradually increases as the cutting edge 11a is gradually cut in the workpiece W is acquired. On the other hand, in a case of intermittent cutting such as milling, cutting force or burnishing force is generated intermittently when the cutting edge 11a is brought into contact with the workpiece W while the cutting tool 11 or the workpiece W is rotating. When a current value of a rotary spindle motor corresponding to such intermittent force, time-series data in which an average value or maximum value of values measured over each rotation period and each cutting edge passing period is used as the detection value may be used. As described above, this method allows an increase in resolution by machining the workpiece W to some extent to increase the contact area and eliminates the need for specifying the rotation position even with a rotary tool, allowing practical contact detection.

The cutting apparatus 1 according to the embodiment acquires the history of the detection value related to the drive motor after contact between the cutting tool 11 and the workpiece W and analyzes the detection value including detection values acquired before contact, so that the contact timing between the cutting tool 11 and the workpiece W can be accurately derived, and the contact position can be determined. In the above experiment, the torque output value estimated by the function installed in the cutting apparatus was used as the detection value related to the drive motor, but a cutting apparatus having no torque estimation function may perform the contact detection using time-series data of a current detection value of a spindle rotary motor or a current detection value of a feed-axis rotary motor, time-series data of a detection value acquired by an encoder, or the like.

As described above, the controller 20 has a capability of controlling the feed mechanism 7 to relatively move the cutting tool 11 and acquiring the coordinate value when the cutting edge 11a comes into contact with a contact target object such as the to-be-cut object 6. Note that the cutting apparatus 1 may include a contact sensor, and the controller 20 may detect contact from sensing data acquired from the contact sensor to acquire the coordinate value when the contact is made. A description will be given below of a method for determining a relative positional relationship between the cutting tool 11 and the target object in the cutting apparatus 1 on the condition that the cutting apparatus 1 has the contact detection capability. Note that, in a first example, the rotation center of the to-be-cut object 6 coincides with the rotation center of the spindle 2a.

First Example

Figure 11:
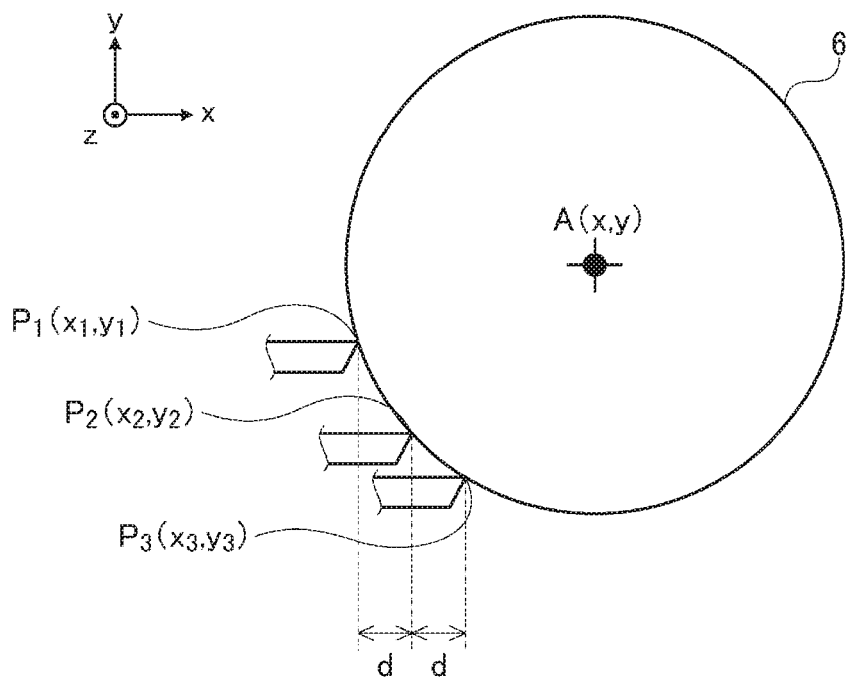
FIG. 11 is a diagram for describing a method for determining a relative positional relationship between a cutting tool and a rotation center of a to-be-cut object.

FIG. 11 is a diagram for describing a method for determining a relative positional relationship between the cutting tool and the rotation center of the to-be-cut object. A description will be given below of a method for calculating a rotation axis center A (x, y) of the to-be-cut object 6. In this example, the to-be-cut object 6 has been turned once. The to-be-cut object 6 is preferably rotated by the spindle 2a from the viewpoint of preventing a sharp tool cutting edge from being damaged, but the to-be-cut object 6 need not be rotated.

First, the movement controller 22 slowly moves the tool cutting edge from below to above (Y-axis positive direction) to bring the tool cutting edge into contact with the to-be-cut object 6 subjected to turning work at the point $P_1$. Note that a coordinate $x_1$ of the point $P_1$ in the X-axis direction is preset, and a coordinate in the Y-axis direction is variable. The contact detection may be performed by the positional relationship deriving part 23 in accordance with the above-described method, but may be performed using the sensing data of the contact sensor. The above contact detection method causes the positional relationship deriving part 23 to generate a regression line from changes in detection value after contact to specify the contact position afterward. Therefore, at the moment when the movement controller 22 brings the tool cutting edge into contact with the point $P_1$, the positional relationship deriving part 23 has not yet specified the contact position, and although the tool cutting edge is actually in contact with the point $P_1$, the movement controller 22 needs to move the tool cutting edge slightly upward from the point $P_1$ (cutting is performed accordingly).

When the positional relationship deriving part 23 derives the contact timing using the regression line, the movement controller 22 passes, to the positional relationship deriving part 23, the coordinates at the contact timing, that is, the coordinates $(x_1, y_1)$ of the point $P_1$. Strictly speaking, the movement controller 22 does not manage the coordinates of the cutting edge 11a of the cutting tool 11, but manages the coordinates of the cutting tool 11. However, the coordinates of the cutting edge and the coordinates of the cutting tool have a one-to-one relation, and thus the following description will be given based on the coordinates of the cutting edge.

Note that, as described above, the to-be-cut object 6 that has been already turned is used. This aims at detecting the coordinates of the point $P_1$, and coordinates of the point $P_2$ and coordinates of the point $P_3$ to be described later on a circle having a uniform diameter centered on the rotation axis of the to-be-cut object 6, that is, the rotation axis of the spindle 2a. For this reason, the positional relationship deriving part 23 brings the tool cutting edge into contact with the to-be-cut object 6 subjected to turning work at the point $P_1$, but coordinate values on the X axis and the Y axis during turning work performed as pre-machining work can be used as the point $P_1$.

Subsequently, the movement controller 22 moves the tool cutting edge downward (Y-axis negative direction in FIG. 11) by a sufficient distance and then moves the tool cutting edge forward in the X-axis positive direction by a known distance d. Thereafter, the movement controller 22 slowly moves the tool cutting edge upward (Y-axis positive direction) to bring the tool cutting edge into contact with the to-be-cut object 6 at the point $P_2$. When the positional relationship deriving part 23 detects the contact and derives the contact timing, the movement controller 22 passes, to the positional relationship deriving part 23, the coordinates at the contact timing, that is, the coordinates $(x_2, y_2)$ of the point $P_2$.

Subsequently, the movement controller 22 moves the tool cutting edge downward (Y-axis negative direction) by a sufficient distance and then moves the tool cutting edge forward in the X-axis positive direction by the known distance d. Note that the distance by which the tool cutting edge is moved forward may be a known distance and may be different from an X-axis direction distance (d) between the coordinate of the point $P_1$ and the coordinate of the point $P_2$. Thereafter, the movement controller 22 slowly moves the tool cutting edge upward (Y-axis positive direction) to bring the tool cutting edge into contact with the to-be-cut object 6 at the point $P_3$. When the positional relationship deriving part 23 detects the contact and derives the contact timing, the movement controller 22 passes, to the positional relationship deriving part 23, the coordinates at the contact timing, that is, the coordinates $(x_3, y_3)$ of the point $P_3$. Note that when the contact detection is performed while the spindle 2a is rotating, cutting is slightly made at the time of contact to reduce a radius, so that the contact detection at the points $P_1$, $P_2$, and $P_3$ is preferably performed at different positions in the Z-axis direction.

The positional relationship deriving part 23 determines the relative positional relationship between the cutting tool 11 and the rotation center of the to-be-cut object 6 based on coordinate values when the cutting tool 11 comes into contact with the to-be-cut object 6 at least at two positions different from a rotation angle position of the cutting tool 11 during the turning work. For example, when the coordinate values on the X axis and Y axis during turning work performed as pre-machining work are set as the point $P_1$, the positional relationship deriving part 23 determines the relative positional relationship between the cutting tool 11 and the rotation center of the to-be-cut object 6 based on the coordinate values of the point $P_2$ and $P_3$ that are rotation angle positions different from the point $P_1$. Note that, in the first example, the positional relationship deriving part 23 determines the relative positional relationship between the cutting tool 11 and the rotation center of the to-be-cut object 6 based on the coordinate values of three contact points that are different rotation angle positions, that is, the points $P_1$, $P_2$, and $P_3$. The positional relationship deriving part 23 calculates coordinates (x, y) of a point A serving as the rotation center of the to-be-cut object 6 and a radius R of the to-be-cut object 6 by using a fact that the three points are located on the same circle.

Figure 12A:
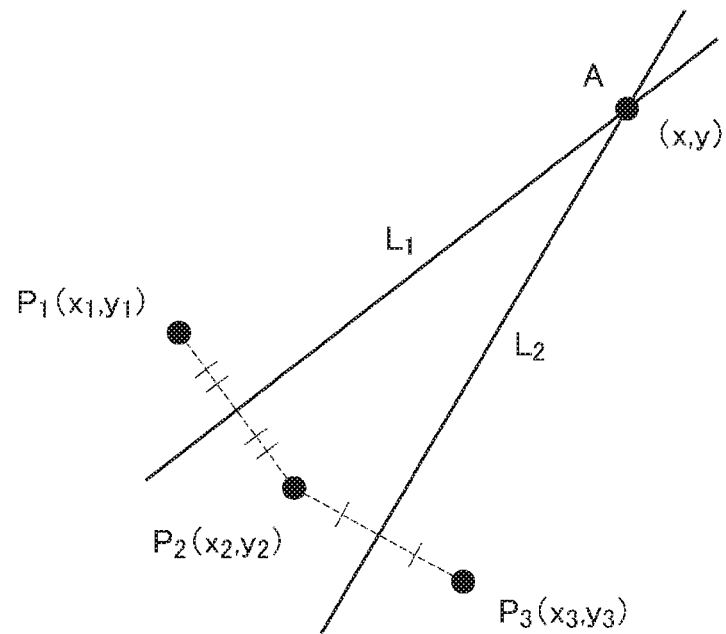
FIGS. 12A and 12B are diagrams showing a method for deriving coordinates of a point A.
Figure 12B:
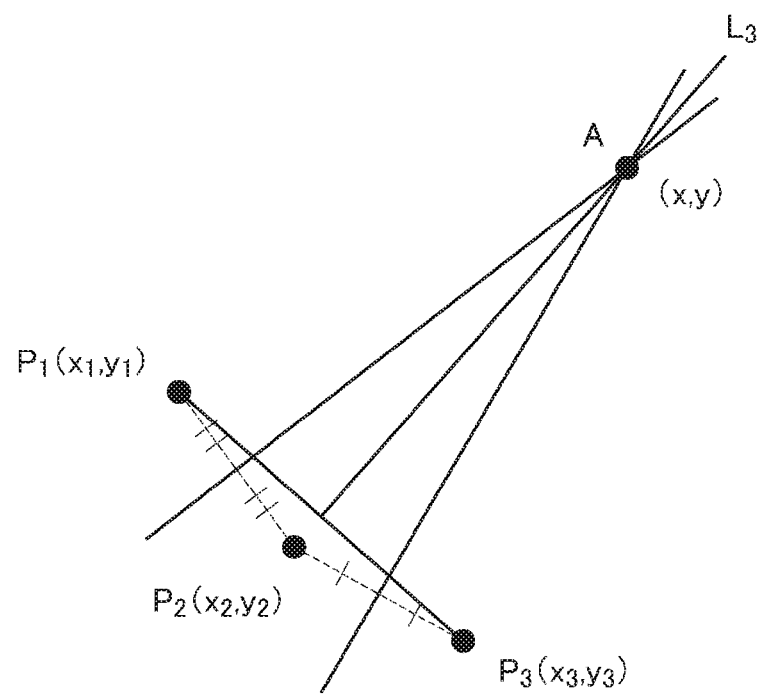

FIGS. 12A and 12B show a method for deriving the coordinates of the point A. As shown in FIG. 12A, coordinates A can be determined by calculating an intersection point of a line L1 and a line L2. The lines L1 and L2 are represented by the following (equation 5) and (equation 6), respectively:

$$L_1: y = -\frac{x_1 - x_2}{y_1 - y_2}\left(x - \frac{x_1 + x_2}{2}\right) + \frac{y_1 + y_2}{2} \quad \text{(EQUATION 5)}$$

$$L_2: y = -\frac{x_2 - x_3}{y_2 - y_3}\left(x - \frac{x_2 + x_3}{2}\right) + \frac{y_2 + y_3}{2} \quad \text{(EQUATION 6)}$$

(equation 7) is derived from (equation 5) and (equation 6):

$$\left(\frac{x_2 - x_3}{y_2 - y_3} - \frac{x_1 - x_2}{y_1 - y_2}\right)x = \quad \text{(EQUATION 7)}$$
$$\frac{y_3 - y_1}{2} + \frac{x_2^2 - x_3^2}{2(y_2 - y_3)} - \frac{x_1^2 - x_2^2}{2(y_1 - y_2)}$$

where $x_1 - x_2 = -d$ and $x_2 - x_3 = -d$ are satisfied, and when the coordinates $(x_2, y_2)$ of the point $P_2$ is defined as (0,0), an x coordinate of the point A is derived as follows:

$$x = \frac{y_1 - y_3}{2(y_1 + y_3)}\left(d - \frac{y_1 y_3}{d}\right) \quad \text{(EQUATION 8)}$$

A line L3 shown in FIG. 12B is represented by the following (equation 9):

$$L_3: y = -\frac{x_1 - x_3}{y_1 - y_3}\left(x - \frac{x_1 + x_3}{2}\right) + \frac{y_1 + y_3}{2} \quad \text{(EQUATION 9)}$$

When the x determined from (equation 8) is substituted into (equation 9), a y coordinate of the point A is derived as follows:

$$y = \frac{y_1^2 + y_3^2 + 2d^2}{2(y_1 + y_3)}. \quad \text{(EQUATION 10)}$$

Note that a rotation radius of the to-be-cut object 6 is determined as follows.

$$R = \sqrt{x^2 + y^2} \quad \text{(EQUATION 11)}$$

As described above, the positional relationship deriving part 23 derives the coordinates of the point A with the coordinates $(x_2, y_2)$ of the point $P_2$ set to (0, 0). Accordingly, the positional relationship deriving part 23 determines the relative positional relationship between the cutting tool 11 and the rotation center of the to-be-cut object 6 based on the coordinate values of the three contact positions.

A consideration will be given below of the calculation accuracy of the coordinates of the point A and the radius R. With respect to FIG. 10, although a contact position detection error $e_p$ in the contact detection is calculated, an examination will be given below of the influence of the detection error $e_p$ on the accuracy of the coordinates of the point A and the radius R.

An error in the x coordinate is denoted by $e_x$, an error in the y coordinate is denoted by $e_y$, and an error in the radius R is denoted by $e_R$.

That is, the errors will be examined based on:

$$\tilde{x} = x + e_x, \tilde{y} = y + e_y, \tilde{R} = R + e_R$$

When the errors are examined in this way, the x coordinate value of the point A represented by (equation 8), the y coordinate value of the point A represented by (equation 10), and the radius R represented by (equation 11) are represented as follows:

$$\tilde{x} = \frac{\tilde{y}_1 - \tilde{y}_3}{2(\tilde{y}_1 + \tilde{y}_3)}\left(d - \frac{\tilde{y}_1\tilde{y}_3}{d}\right), \tilde{y} = \frac{\tilde{y}_1^2 + \tilde{y}_3^2 + 2d^2}{2(\tilde{y}_1 + \tilde{y}_3)}$$

$$\tilde{R} = \sqrt{\tilde{x}^2 + \tilde{y}^2}$$

When the error $e_x$ is determined as follows:

$$e_x = \frac{y_1 + e_{p1} - y_3 - e_{p3}}{2(y_1 + e_{p1} + y_3 + e_{p1})}\left(d - \frac{(y_1 + e_{p1})(y_3 + e_{p3})}{d}\right) - \frac{y_1 - y_3}{2(y_1 + y_3)}\left(d - \frac{y_1 y_3}{d}\right) =$$
$$\frac{y_1 - y_3}{2d(y_1 + y_3)}(y_1 y_3 - (y_1 + e_{p1})(y_3 + e_{p3}))$$

wherein approximation can be made as follows:

$$\frac{e_{p1} + e_{p3}}{y_1 + y_3} \approx 0 \ \& \ e_p = e_{p1} = e_{p3} \ \& \ \frac{e_{p1}}{y_1 + y_3} \approx 0,$$

and
therefore, the error $e_x$ is derived as follows:

$$e_x \approx \frac{y_1 - y_3}{2d} e_p.$$

Similarly, when the error $c_y$ is determined as follows:

$$e_y = \frac{1}{2(y_1 + y_3)}\left\{\frac{\{(y_1 + e_{p1})^2 + (y_3 + e_{p3})^2 + 2d^2\}}{1 + \frac{e_{p1} + e_{p3}}{2(y_1 + y_3)}} - \{y_1^2 + y_3^2 + 2d^2\}\right\} =$$
$$\frac{1}{2(y_1 + y_3)}\{2y_1 e_{p1} + 2y_2 e_{p3} + e_{p1}^2 + e_{p2}^2\},$$

wherein approximation can be made as follows:

$$\frac{e_{p1} + e_{p3}}{2(y_1 + y_3)} \approx 0 \ \& \ \frac{e_{p1}^2 + e_{p3}^2}{2(y_1 + y_3)} \approx 0 \ \& \ e_p = e_{p1} = e_{p3},$$

and
therefore, the error $e_y$ is derived from $$e_y \approx e_p$$

The error $e_R$ is represented as follows:

$$e_R \approx \sqrt{e_x^2 + e_y^2}$$

As described above, the error $e_x$ in the x coordinate, the error $e_y$ in the y coordinate, and the error $e_R$ in the radius R can all be represented by the contact position detection error $e_p$, and it was confirmed that a reduction in contact position detection error $e_p$ allows an increase in machining accuracy.

As described in the first example, when the relative position between the cutting tool 11 and the rotation center of the to-be-cut object 6 (center of the spindle) is successfully specified, a cylindrical surface of the to-be-cut object 6 can be finished to have an accurate diameter, and a so-called navel for preventing a center height of the tool cutting edge from being misaligned is not left at the time of machining of an end surface, making it possible to achieve high accuracy in machining of a spherical or aspherical surface.

Second Example

In a second example, the positional relationship deriving part 23 detects contact between the cutting tool 11 and a reference surface defined on a component to which the to-be-cut object 6 is attached and determines a relative position of the cutting tool 11 with respect to the component reference surface. Examples of the component may include the spindle 2a that supports the to-be-cut object 6, for example, and the positional relationship deriving part 23 may determine a contact position between the cutting tool 11 and the spindle 2a by bringing the cutting tool 11 into contact with the reference surface defined on an end surface or peripheral surface of the spindle 2a and derive a relative positional relationship between the cutting tool 11 and an attachment surface, rotation center, or the like of the to-be-cut object 6.

Figure 13:
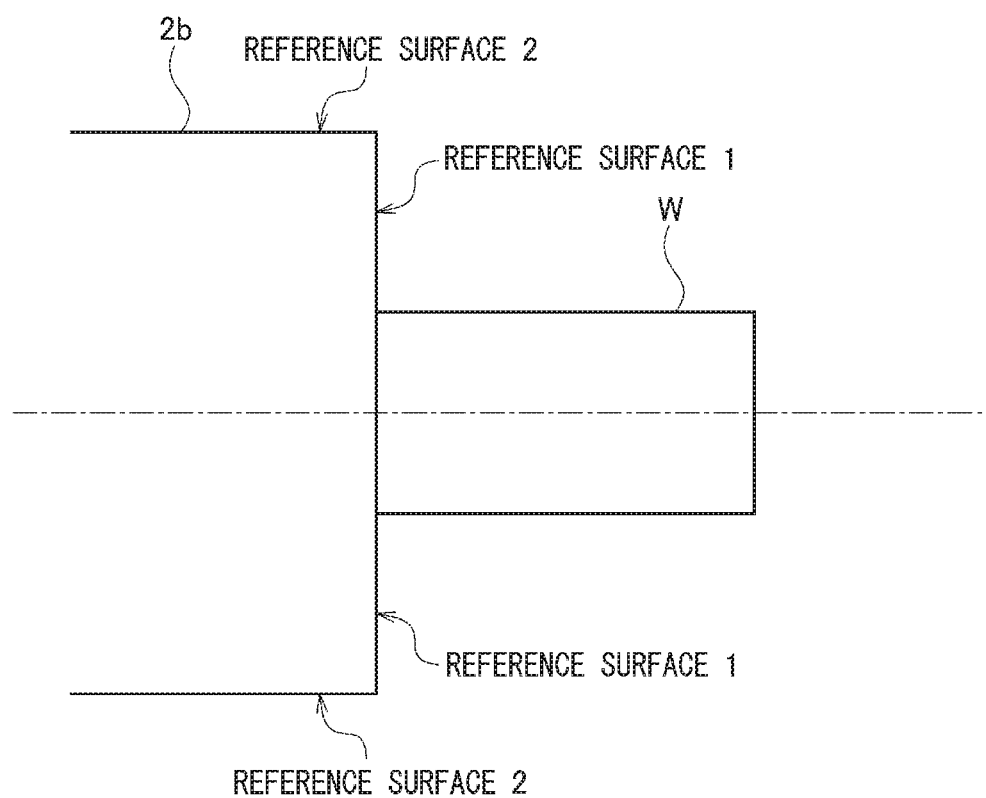
FIG. 13 is a diagram for describing a reference surface.

FIG. 13 is a diagram for describing the reference surface. Set as the reference surface is a surface whose relative positional relationship with the attachment surface, rotation center, or the like of the workpiece W is known. In the present example, in the cutting apparatus that rotate the workpiece W about the center axis and subjects the workpiece W to turning work, an end surface of a spindle 2b to which the workpiece W is fixed is defined as a reference surface 1, and a peripheral surface of the spindle 2b is defined as a reference surface 2. That is, the reference surface 1 is a surface orthogonal to a spindle rotation axis, and the reference surface 2 is a cylindrical surface centered on the spindle rotation center. The positional relationship deriving part 23 determines the relative positional relationship between the cutting tool and the attachment surface, rotation center, or the like of workpiece W based on a coordinate value of the contact position on the reference surface whose relative positional relationship with the attachment surface, rotation center, or the like of the workpiece W is known.

As described above, the positional relationship deriving part 23 can detect the contact between the cutting tool 11 and the spindle 2b serving as a component to specify the contact position.

Herein, the positional relationship deriving part 23 detects the contact of the tool cutting edge with the reference surface 1 to find out an accurate origin of the tool cutting edge (relative position of the tool cutting edge with respect to the attachment surface of the workpiece W, that is, a left-end surface of the workpiece W) in a longitudinal direction of the workpiece W (left-right direction in FIG. 13). This in turn allows, at the time of machining of the end surface of the workpiece W (right-end surface in FIG. 13), the workpiece W to be finished to have an accurate length (length in the left-right direction). Further, the positional relationship deriving part 23 detects the contact of the tool cutting edge with the reference surface 2 at three points (or two points if the diameter is known) that are different from each other in Y-axis position as in the first example to find out an accurate origin of the tool cutting edge in the radial direction of the workpiece W (relative position of the tool cutting edge with respect to the rotation center of the workpiece W). This in turn allows, at the time of machining of the cylindrical surface of the workpiece W, the workpiece W to be finished to have an accurate diameter.

The reference surface may be defined on part of the workpiece W. For example, in FIG. 13, when the reference surface 1 is part of the workpiece W, the workpiece W can be accurately finished by length from the surface to the right-end surface of the workpiece W. Note that FIG. 13 shows an example of turning work, but, in a case of planing work, contact detection made at three points on the reference surface (accurate flat surface) can specify the flat surface, allowing a surface parallel to the reference surface to be finished to have an accurate height. Further, when the reference surface is a surface accurately orthogonal to the Z axis, contact detection made only at one point allows a surface parallel to a bottom surface (surface of the workpiece W that is in contact with the reference surface) to be finished to have an accurate height.

In the following third to thirteenth examples, a description will be given of techniques based on the three-point contact detection mainly described in the first example. In the drawings to be referenced for the description, the A axis denotes a rotation axis centered on the X axis, the B axis denotes a rotation axis centered on the Y axis, and the C axis denotes a rotation axis centered on the Z axis. Further, in this specification and the drawings, regarding a symbol with a caret (hat), for example, when the symbol is "y", it should be noted that, due to restriction on representation, the symbol is represented as follows:

$$\hat{y} = y\hat{}$$

That is, the symbol y having a caret (hat) attached thereon and the symbol y having a caret attached to a side thereof indicate the same variable. In the examples, a symbol with a caret means a variable to be obtained. Note that the symbol having a caret attached thereon is used in mathematical expressions, and the symbol having a caret attached to a side thereof is used in sentences. It should also be noted that symbols used in the drawings of different examples are used for the understanding of each example.

Third Example

In the first example, the controller 20 specifies the relative positional relationship between the cutting tool 11 and the rotation center of the to-be-cut object 6 based on the coordinate values of the three points on the to-be-cut object 6 subjected to turning work, in other words, pre-machining work. In the third example, the controller 20 determines the relative positional relationship between the cutting tool 11 and an object that has a known shape and has been machined with high accuracy for the origin setting of the cutting edge to specify information on the cutting edge of the cutting tool 11. Hereinafter, an object used for specifying information on the cutting edge of the cutting tool 11 is referred to as a "reference block". In order to identify the cutting edge position by bringing the cutting edge of the cutting tool 11 into contact with the reference block, the controller 20 grasps, as a precondition, at least a shape of the reference block serving as a contact target.

Figure 14A:
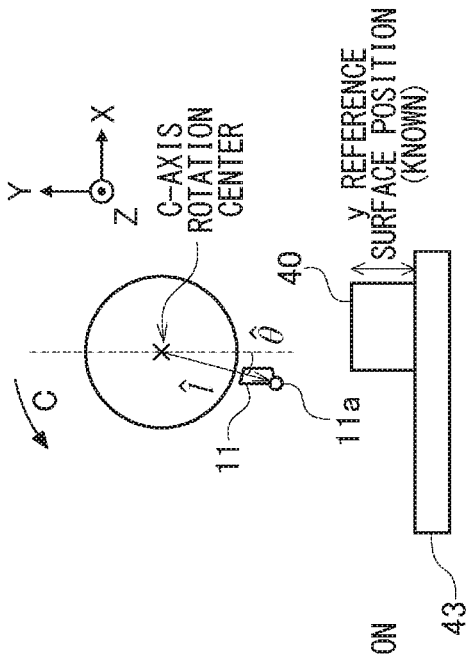
FIGS. 14A and 14B are diagrams showing an example of the cutting apparatus in which a cutting tool is attached rotatable about a C axis.
Figure 14B:
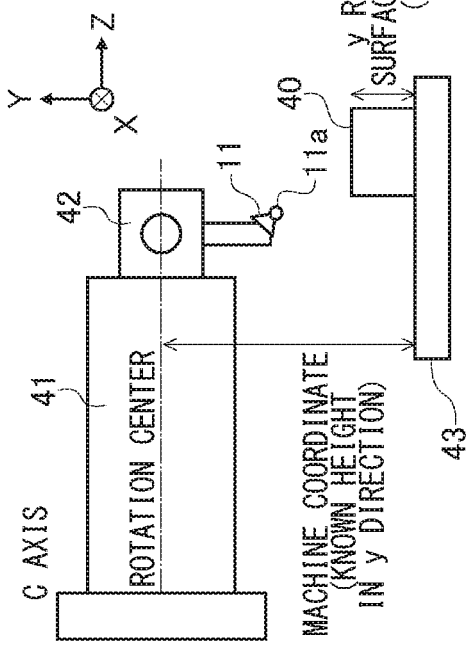

FIGS. 14A and 14B show an example of the cutting apparatus 1 in which the cutting tool 11 is attached rotatable around the C axis. FIG. 14A shows the cutting apparatus 1 viewed from the X-axis direction, and FIG. 14B shows the cutting apparatus 1 viewed from the Z-axis direction. The cutting tool 11 is supported by a support device 42, and the support device 42 is fixed to an attachment spindle 41 so as to be rotatable about the C axis.

A reference block 40 serving as the object having a known shape is placed on a B-axis table 43. In the third example, in order to specify the cutting edge position of the cutting tool 11, the controller 20 brings the cutting edge into contact with the reference block 40 at least three times and uses the position coordinates of the contact points to specify information on the attachment position of the cutting tool 11. In the third example, the feed mechanism 7 has a capability of moving the B-axis table 43, and the movement controller 22 moves the B-axis table 43 to bring the cutting edge 11a of the cutting tool 11 and a portion having the known shape of the reference block 40 into contact with each other at a plurality of points. The reference block 40 is made of a material that is high in hardness to be less prone to damage from the contact of the cutting edge 11a. In the third example, a nose radius of the cutting edge 11a, center coordinates of a round portion of the cutting edge, and an error in shape of the cutting edge are unknown, and a description will be given of a method for specifying these pieces of information. Hereinafter, it is assumed that the tip of the cutting edge 11a has a certain curvature (nose radius), and the center of the round portion of the cutting edge is sometimes referred to as "tool center".

In the YZ plane shown in FIG. 14A, the nose radius $\hat{R}$ and the tool center $(\hat{z}, \hat{y})$ in the YZ plane are determined.

Figure 15:
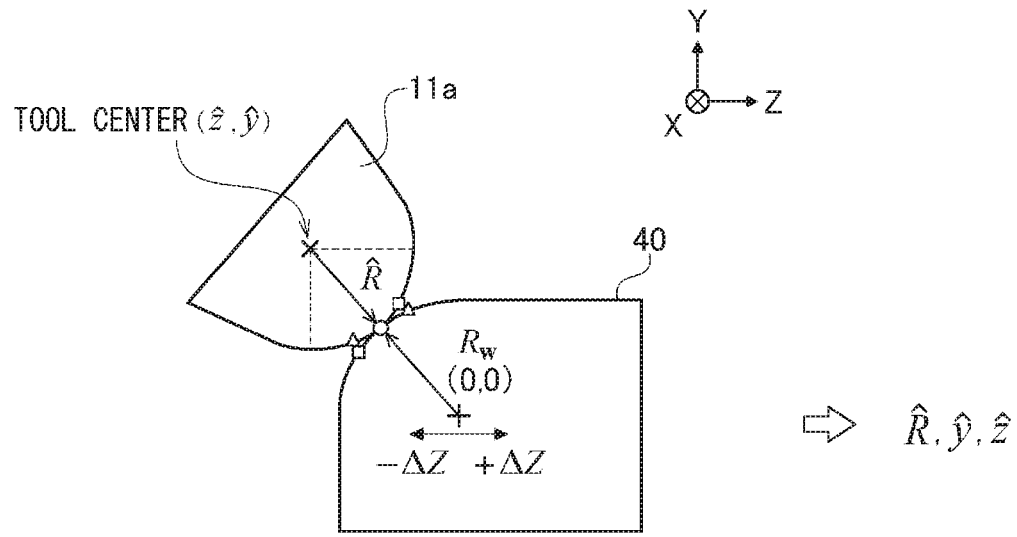
FIG. 15 is a diagram showing a state where the cutting edge and a portion having a known shape of a reference block come into contact with each other.

FIG. 15 shows a state where the cutting edge 11a and the portion having the known shape of the reference block 40 are in contact with each other at one point. As described above, the cutting edge 11a has an arc surface having a certain curvature and the nose radius $\hat{R}$. Note that the nose radius $\hat{R}$ is unknown. On the other hand, the reference block 40 comes into contact with the cutting edge 11a using the portion whose shape is known. That a shape is known in the third example means that the positional relationship deriving part 23 recognizes a shape of a portion where the cutting edge 11a may come into contact with.

The reference block 40 needs to have at least a portion with a known shape that comes into contact with the cutting edge 11a, and the positional relationship deriving part 23 need not recognize a shape of a portion that is less likely to come into contact with the cutting edge 11a. In the example shown in FIG. 15, the reference block 40 has an arc surface having a radius Rw centered on a position denoted by "+", and the positional relationship deriving part 23 recognizes that the cutting edge 11a comes into contact with the arc surface when the origin of the cutting edge 11a is set. In other words, when the origin is set, the movement controller 22 controls the feed mechanism 7 to move the B-axis table 43 such that the cutting edge 11a is brought into contact with the arc surface having the known shape of the reference block 40. Shape data of the arc surface may be stored in a memory (not shown).

The movement controller 22 slowly moves the B-axis table 43 from below to above (Y-axis positive direction) toward the cutting edge 11a of the cutting tool 11. In FIG. 15, the cutting edge 11a and the reference block 40 are in contact with each other at a contact point denoted by a circle. At this time, the positional relationship deriving part 23 defines coordinates of the rotation center position "+" of the arc of the reference block 40 as (0, 0).

Thereafter, the movement controller 22 brings the reference block 40 into contact with the cutting edge 11a at a position that results from shifting the initial contact position serving as a reference by +ΔZ and −ΔZ in the Z-axis direction. In any of the above cases, the position of the reference block 40 that comes into contact with the cutting edge 11a is located on the arc surface having the radius Rw. Specifically, from the state shown in FIG. 15, the movement controller 22 lowers the reference block 40 by a sufficient distance in the Y-axis negative direction, moves the reference block 40 by ΔZ in the Z-axis negative direction, and then slowly moves the reference block 40 in the Y-axis positive direction to bring the arc surface of the reference block 40 into contact with the cutting edge 11a. A contact point at this time is denoted by a triangle in FIG. 15. Subsequently, the movement controller 22 lowers the reference block 40 by a sufficient distance in the Y-axis negative direction, moves the reference block 40 by 2ΔZ in the Z-axis positive direction, and then slowly moves the reference block 40 in the Y-axis positive direction to bring the arc surface of the reference block 40 into contact with the cutting edge 11a. A contact point at this time is denoted by a square in FIG. 15. Note that, in the second movement, the movement in the Y-axis negative direction may be omitted.

As described above, the movement controller 22 brings the cutting edge 11a of the cutting tool 11 and the portion having the known shape of the reference block 40 into contact with each other at least at three points and passes, to the positional relationship deriving part 23, the coordinate values of the contact positions. The positional relationship deriving part 23 specifies the information on the attachment position of the cutting tool 11 based on the respective coordinate values of the contact positions.

Figure 16:
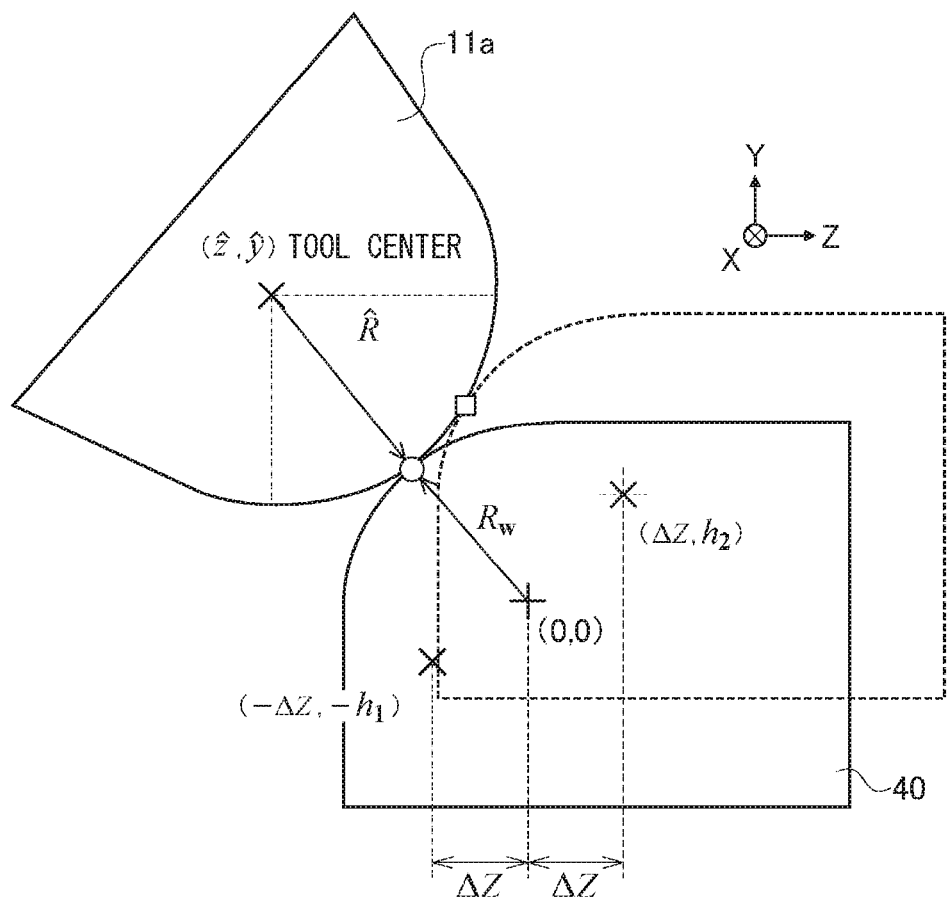
FIG. 16 is a diagram showing a positional relationship between the cutting edge and the reference block.

FIG. 16 shows a positional relationship between the cutting edge 11a and the reference block 40. When contact is made at the contact point denoted by a square shown in FIG. 15, coordinates of a center of the known arc become $(\Delta Z, h_2)$. $h_2$ denotes a value detected by the movement controller 22. Further, when contact is made at the contact point denoted by a triangle shown in FIG. 15, the coordinates of the center of the known arc become $(-\Delta Z, -h_1)$. $h_1$ also denotes a value detected by the movement controller 22.

As shown in FIG. 16, defining the radius center of the arc surface of the reference block 40 at the time of the first contact as (0,0) and the tool center as $(\hat{z}, \hat{y})$ results in:

$$\hat{z}^2 + \hat{y}^2 = (\hat{R} + R_w)^2$$

$$(\hat{z} + \Delta Z)^2 + (\hat{y} + h_1)^2 = (\hat{R} + R_w)^2$$

$$(\hat{z} - \Delta Z)^2 + (\hat{y} - h_2)^2 = (\hat{R} + R_w)^2$$

and
simultaneously satisfying the equations results in:

$$\hat{y} = \frac{2\Delta Z^2 + h_1^2 + h_2^2}{2(h_2 - h_1)}$$

$$\hat{z} = -\frac{(\Delta Z^2 + h_1 h_2)(h_1 + h_2)}{2\Delta Z(h_2 - h_1)}.$$

$\hat{R}$ is determined based on $\hat{z}$ and $\hat{y}$ obtained from the above equations.

$$\hat{R} = \sqrt{\hat{z}^2 + \hat{y}^2} - R_w$$

As described above, the positional relationship deriving part 23 specifies the information on the attachment position of the cutting tool 11 based on the coordinate values of the three contact positions. Specifically, the positional relationship deriving part 23 determines the nose radius R of the cutting edge and the tool center coordinates (z, y) as the information on the attachment position.

Note that when the reference block 40 having the known arc shape comes into contact with at least one point on the arc other than the above three contact positions, a deviation from the contact position estimated from the nose radius R and the tool center coordinates (z, y) determined as described above is determined as a deviation (error) from the arc having the nose radius R of the cutting edge.

Next, the positional relationship deriving part 23 calculates a distance $\hat{l}$ from the C-axis rotation center to the tip of the cutting edge 11a and an initial attachment angle $\hat{\theta}$ in the XY plane shown in FIG. 14B. For example, for machining a complicated free-curved surface, cutting feed performed by simultaneously controlling the XYC axes and pick feed in the Z-axis direction may be repeated. Thus, when the C axis is included in the cutting feed movement, errors in the distance $\hat{l}$ from the C-axis rotation center to the tip of the cutting edge 11a and the initial attachment angle $\hat{\theta}$ leads to a reduction in machining accuracy. Therefore, the positional relationship deriving part 23 specifies the information on the attachment position of the cutting tool 11 based on the contact coordinate values of at least three points where the cutting edge 11a comes into contact with the portion having the known shape of the reference block 40 when the cutting edge 11a is moved in the XY plane.

Figure 17:
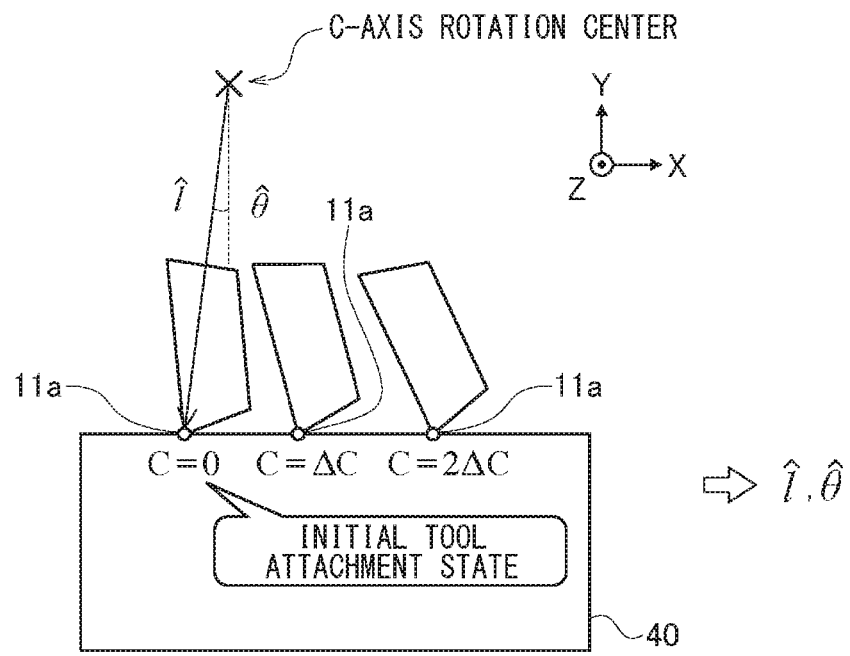
FIG. 17 is a diagram schematically showing a state where the cutting tool is inclined when the cutting tool is brought into contact with an upper surface of the reference block.

FIG. 17 schematically shows a state where the cutting tool 11 is inclined when the cutting tool 11 is rotated counterclockwise to bring the cutting edge 11a into contact with an upper surface (y reference surface) of the reference block 40. The movement controller 22 controls the feed mechanism 7 to rotate the cutting tool 11 around the C axis. The upper surface of the reference block 40 is parallel to a plane orthogonal to the Y axis, and a position of the upper surface of the reference block 40 is known as shown in FIG. 14B.

The movement controller 22 slowly moves the B-axis table 43 from below to above (Y-axis positive direction) toward the cutting edge 11a of the cutting tool 11 to bring the upper surface of the reference block 40 into contact with the cutting edge 11a. Thereafter, the movement controller 22 lowers the reference block 40 by a sufficient distance in the Y-axis negative direction, rotates the cutting tool 11 counterclockwise by ΔC, and then slowly moves the reference block 40 in the Y-axis positive direction to bring the upper surface of the reference block 40 into contact with the cutting edge 11a. Subsequently, the movement controller 22 lowers the reference block 40 by a sufficient distance in the Y-axis negative direction, further rotates the cutting tool 11 counterclockwise by AC, and then slowly moves the reference block 40 in the Y-axis positive direction to bring the upper surface of the reference block 40 into contact with the cutting edge 11a. This causes the positional relationship deriving part 23 to acquire heights in the Y-axis direction (y positions) at the three contact positions.

Figure 18:
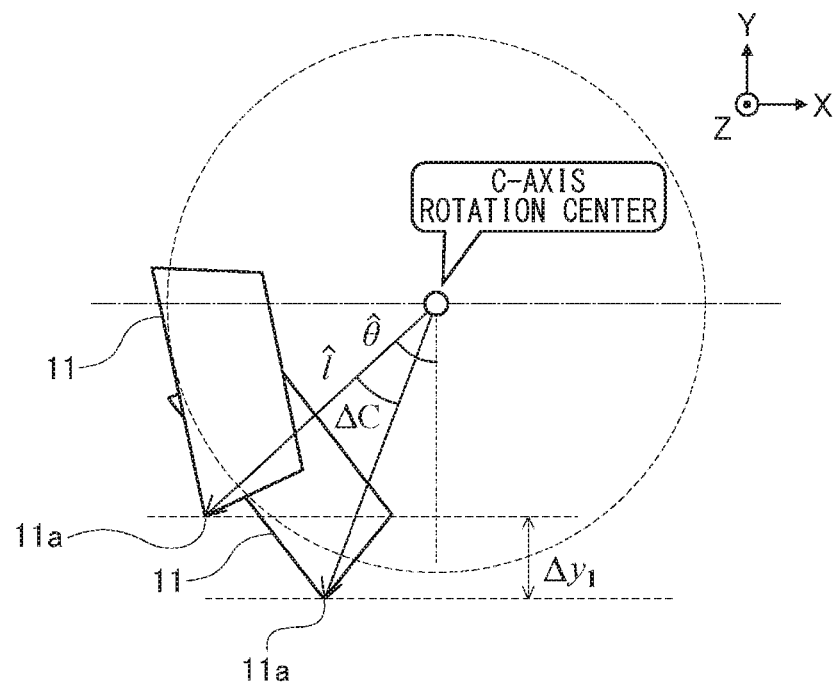
FIG. 18 is a diagram showing changes in height of a contact position.

FIG. 18 shows a change in height $\Delta y_1$ of the contact position when rotation is made by AC from the initial contact position (initial y position). With the first contact position set as a reference, a change in height of the contact position when rotation is further made by AC is denoted by $\Delta y_2$. At this time, the following equations are satisfied for $\Delta y_1$ and $\Delta y_2$.

$$\Delta y_1 = \hat{l} \cos(\hat{\theta} - \Delta C) - \hat{l} \cos \hat{\theta}$$

$$\Delta y_2 = \hat{l} \cos(\hat{\theta} - 2\Delta C) - \hat{l} \cos \hat{\theta}$$

Simultaneously satisfying both the equations to remove $\hat{l}$ results in $$\Delta y_1 / \Delta y_2 = \frac{\cos(\hat{\theta} - \Delta C) - \cos\hat{\theta}}{\cos(\hat{\theta} - 2\Delta C) - \cos\hat{\theta}}$$

$$\hat{\theta} = \tan^{-1}\left(\frac{\Delta y_2(1 - \cos\Delta C) - \Delta y_1(1 - \cos 2\Delta C)}{\Delta y_1 \sin 2\Delta C + \Delta y_2 \sin \Delta C}\right).$$

and $\hat{l}$ is determined using obtained $\hat{\theta}$ as follows:

$$\hat{l} = \frac{\Delta y_1}{\cos(\hat{\theta} - \Delta C) - \cos\hat{\theta}}.$$

As described above, the positional relationship deriving part 23 acquires the information on the initial attachment position of the cutting tool 11 based on the coordinate values of the three contact positions for the rotation about the C axis. Specifically, the positional relationship deriving part 23 derives the distance 1 from the C-axis rotation center to the cutting edge 11a and the initial attachment angle θ as the information on the attachment position. As described above, in the third example, the use of the reference block 40 allows the positional relationship deriving part 23 to specify the information on the attachment position with high accuracy.

Fourth Example

In a fourth example as well, the controller 20 determines, using an object (reference block 40) with a known shape that has been machined with high accuracy for the origin setting of the cutting edge, the relative positional relationship between the cutting tool 11 and the reference block 40 to specify the information on the attachment position of the cutting tool 11.

Figure 19A:
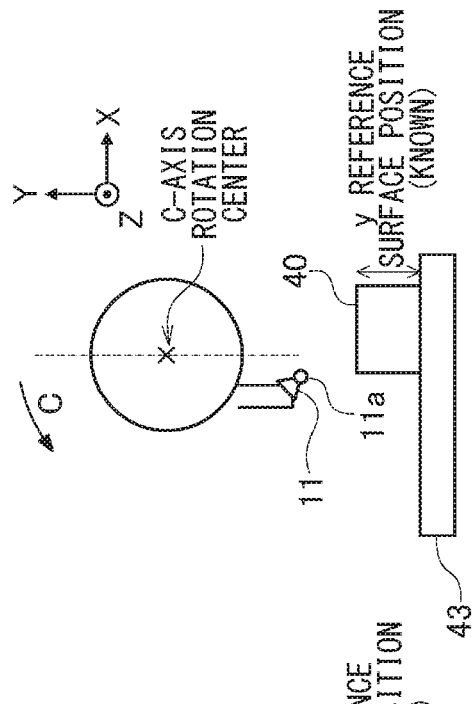
FIGS. 19A and 19B are diagrams showing another example of the cutting apparatus in which a cutting tool is attached rotatable about a C axis.
Figure 19B:
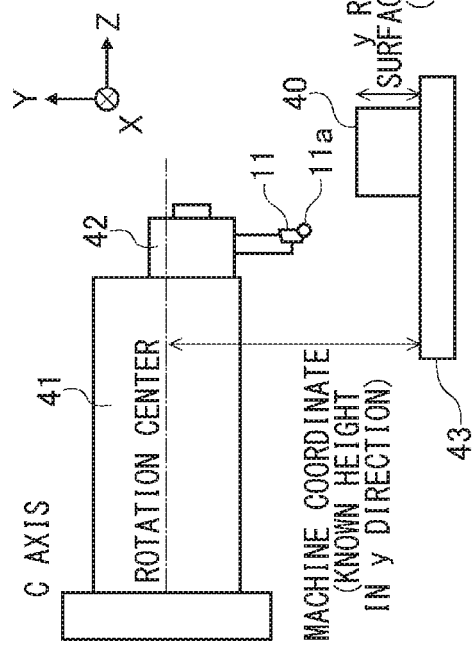

FIGS. 19A and 19B show another example of the cutting apparatus 1 in which the cutting tool 11 is attached rotatable around the C axis. FIG. 19A shows the cutting apparatus 1 viewed from the X-axis direction, and FIG. 19B shows the cutting apparatus 1 viewed from the Z-axis direction. The cutting tool 11 is supported by the support device 42, and the support device 42 is fixed to the attachment spindle 41 so as to be rotatable about the C axis.

The reference block 40 serving as the object having a known shape is placed on the B-axis table 43. In the fourth example as well, in order to specify the cutting edge position of the cutting tool 11, the controller 20 brings the cutting edge into contact with the reference block 40 at least three times and uses the position coordinates of the contact points to specify the information on the attachment position of the cutting tool 11. In the fourth example, as in the third example, the movement controller 22 moves the B-axis table 43 to bring the cutting edge 11a of the cutting tool 11 and the portion having the known shape of the reference block 40 into contact with each other at a plurality of points.

First, a description will be given of a method for determining the nose radius R^ and the tool center (x^, y^) in the XY plane.

Figure 20:
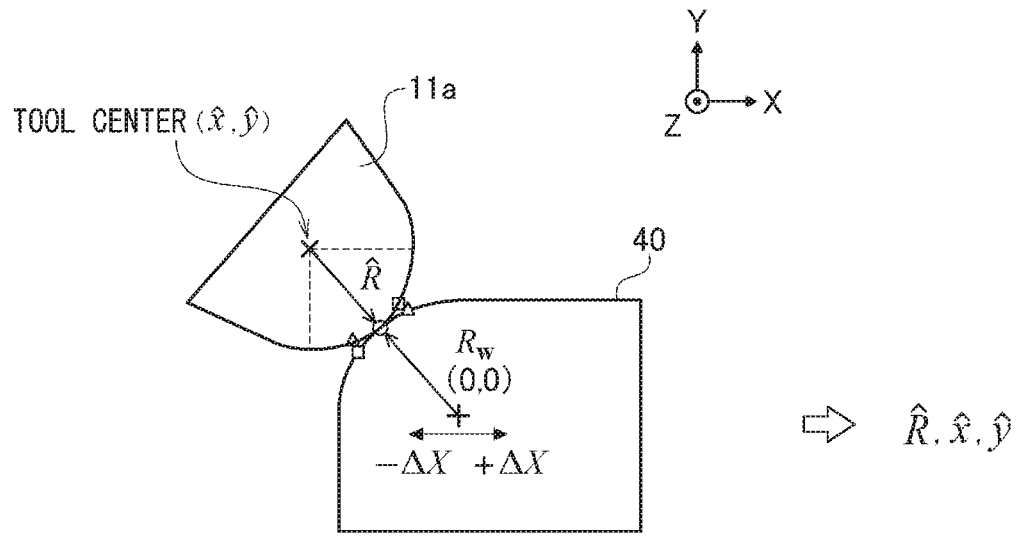
FIG. 20 is a diagram showing a state where a cutting edge and a portion having a known shape of a reference block come into contact with each other.

FIG. 20 shows a state where the cutting edge 11a and the portion having the known shape of the reference block 40 are in contact with each other at one point. The cutting edge 11a has an arc surface having a certain curvature and the nose radius R^. The nose radius R^ is unknown. The reference block 40 comes into contact with the cutting edge 11a using the portion whose shape is known. That a shape is known means that the positional relationship deriving part 23 recognizes a shape of a portion where the cutting edge 11a may come into contact with.

In the example shown in FIG. 20, the reference block 40 has an arc surface having a radius Rw centered on a position denoted by "+", and the positional relationship deriving part 23 recognizes that the cutting edge 11a comes into contact with the arc surface when the origin of the cutting edge 11a is set. In other words, when the origin is set, the movement controller 22 controls the feed mechanism 7 to move the B-axis table 43 such that the cutting edge 11a is brought into contact with the arc surface having the known shape of the reference block 40. Shape data of the arc surface may be stored in a memory (not shown).

The movement controller 22 slowly moves the B-axis table 43 from below to above (Y-axis positive direction) toward the cutting edge 11a of the cutting tool 11. In FIG. 20, the cutting edge 11a and the reference block 40 are in contact with each other at a contact point denoted by a circle. At this time, the positional relationship deriving part 23 defines coordinates of the rotation center position "+" of the arc of the reference block 40 as (0, 0).

Thereafter, the movement controller 22 brings the reference block 40 into contact with the cutting edge 11a at a position that results from shifting the initial contact position serving as a reference by +ΔX and −ΔX in the X-axis direction. In any of the above cases, the position of the reference block 40 that comes into contact with the cutting edge 11a is located on the arc surface having the radius Rw. Specifically, from the state shown in FIG. 20, the movement controller 22 lowers the reference block 40 by a sufficient distance in the Y-axis negative direction, moves the reference block 40 by ΔX in the X-axis negative direction, and then slowly moves the reference block 40 in the Y-axis positive direction to bring the arc surface of the reference block 40 into contact with the cutting edge 11a. A contact point at this time is denoted by a triangle in FIG. 20. Subsequently, the movement controller 22 lowers the reference block 40 by a sufficient distance in the Y-axis negative direction, moves the reference block 40 by 2ΔX in the X-axis positive direction, and then slowly moves the reference block 40 in the Y-axis positive direction to bring the arc surface of the reference block 40 into contact with the cutting edge 11a. A contact point at this time is denoted by a square in FIG. 20. Note that, in the second movement, the movement in the Y-axis negative direction may be omitted.

As described above, the movement controller 22 brings the cutting edge 11a of the cutting tool 11 and the portion having the known shape of the reference block 40 into contact with each other at least at three points and passes, to the positional relationship deriving part 23, the coordinate values of the contact positions. The positional relationship deriving part 23 specifies the information on the attachment position of the cutting tool 11 based on the respective coordinate values of the contact positions.

Figure 21:
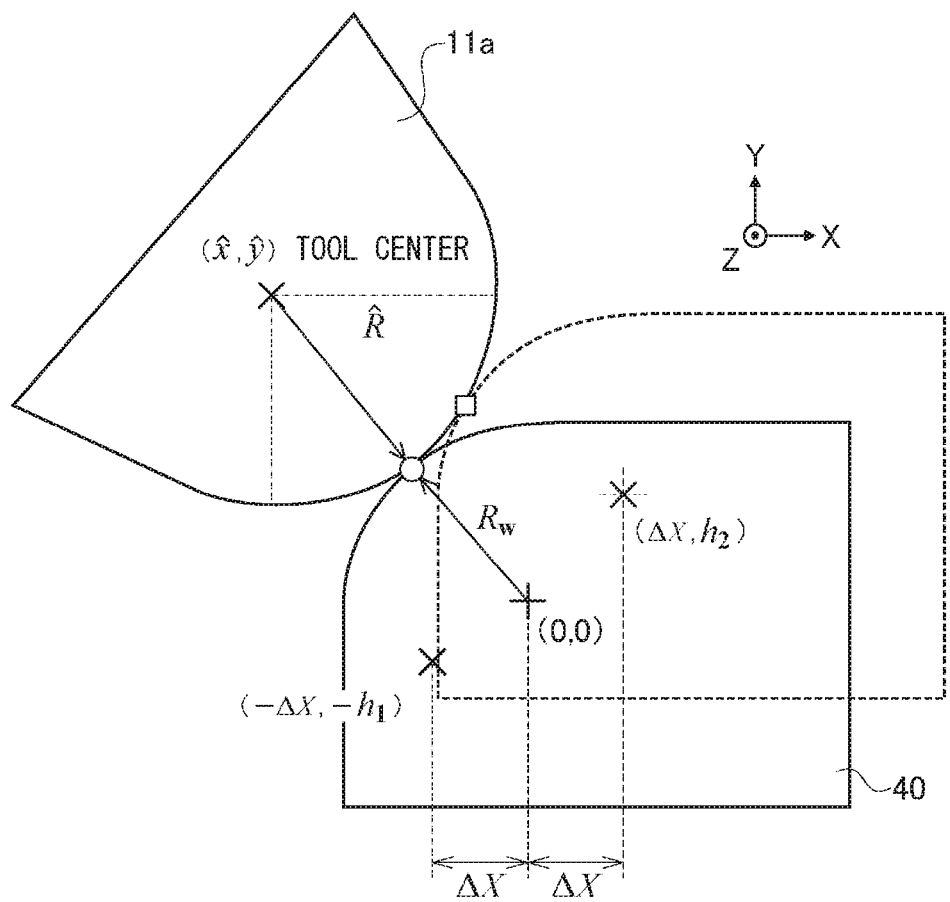
FIG. 21 is a diagram showing a positional relationship between the cutting edge and the reference block.

FIG. 21 shows the positional relationship between the cutting edge 11a and the reference block 40. When contact is made at the contact point denoted by a square shown in FIG. 20, coordinates of a center of the known arc become (ΔX, $h_2$). $h_2$ denotes a value detected by the movement controller 22. Further, when contact is made at the contact point denoted by a triangle shown in FIG. 20, the coordinates of the center of the known arc become (−ΔX, −$h_1$). $h_1$ also denotes a value detected by the movement controller 22.

As shown in FIG. 21, defining the radius center of the arc surface of the reference block 40 at the first contact as (0, 0) and the tool center as (x̂, ŷ) results in:

$$\hat{x}^2+\hat{y}^2=(\hat{R}+R_w)^2$$

$$(\hat{x}+\Delta X)^2+(\hat{y}+h_1)^2=(\hat{R}+R_w)^2$$

$$(\hat{x}-\Delta X)^2+(\hat{y}-h_2)^2=(\hat{R}+R_w)^2$$

and
simultaneously satisfying the equations results in:

$$\hat{y}=\frac{2\Delta X^2+h_1^2+h_2^2}{2(h_2-h_1)}$$

$$\hat{x}=-\frac{(\Delta X^2+h_1 h_2)(h_1+h_2)}{2\Delta X(h_2-h_1)}.$$

R̂ is determined based on x̂ and ŷ determined from the above equations.

$$\hat{R}=\sqrt{\hat{x}^2+\hat{y}^2}-R_w$$

As described above, the positional relationship deriving part 23 specifies the information on the attachment position of the cutting tool 11 based on the coordinate values of the three contact positions. Specifically, the positional relationship deriving part 23 determines the nose radius R of the cutting edge and the tool center coordinates (x, y) as the information on the attachment position.

Next, the positional relationship deriving part 23 determines a z coordinate of the cutting edge 11a.

Figure 22:
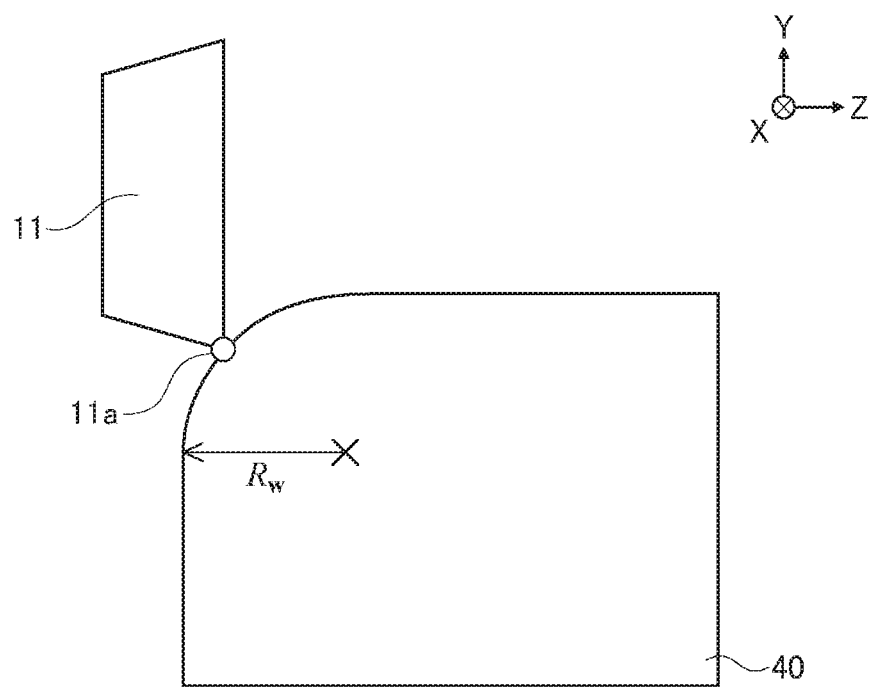
FIG. 22 is a diagram showing a state where the portion having a known shape of the reference block is brought into contact with the cutting edge.

FIG. 22 shows a state where the portion having the known shape of the reference block 40 is brought into contact with the cutting edge 11a of the cutting tool 11. The positional relationship deriving part 23 acquires a z coordinate value at this time to specify a tip point of the cutting edge.

Note that the movement controller 22 needs to move the reference block 40 to bring the known arc surface of the reference block 40 and the cutting edge 11a into contact with each other. For example, when the reference block 40 is moved, the arc surface of the reference block 40 may come into contact with a rake face of the cutting tool 11 before coming into contact with the cutting edge 11a. In the illustrated example, when an angle of the rake face in the initial attachment state is less than 90 degrees with respect to the Z axis, depending on the position of the reference block 40 in the Z-axis direction, the arc surface of the reference block 40 and the rake face of the cutting tool 11 may come into contact with each other to prevent the arc surface of the reference block 40 from coming into contact with the cutting edge 11a. At this time, it is preferable that the movement controller 22 shift the reference block 40 in the Y-axis negative direction to allow the cutting edge 11a to come into contact with an upper side of the known arc surface.

As described above, in the fourth example, the use of the reference block 40 allows the positional relationship deriving part 23 to specify the information on the attachment position with high accuracy.

Fifth Example

When an error is present in the attachment of the cutting tool 11, the to-be-cut object 6 subjected to cutting work has a shape different from an originally designed shape. For this reason, in a fifth example, a difference between a machined surface of the to-be-cut object 6 subjected to actual turning work and a machined surface of the to-be-cut object 6 subjected to ideal turning work (that is, a machined surface as designed) is used to specify an attachment error ($\Delta\hat{x}$, $\Delta\hat{y}$, $\Delta\hat{z}$) in the tool center. Once the attachment error can be specified, a feed path of the cutting tool 11 whose attachment error thus specified has been corrected can be calculated. In the fifth example, the movement controller 22 moves the cutting tool 11 relative to the to-be-cut object 6 subjected to cutting work using the feed capability of the feed mechanism 7 in a movement direction not used for the cutting work and specifies the attachment error in the tool cutting edge based on coordinate values of at least two positions where the cutting tool 11 comes into contact with the to-be-cut object 6.

Hereinafter, the machined surface of the to-be-cut object 6 that has been subjected to turning work to derive an error may be referred to as a "pre-machined surface" or "already machined surface". Note that making the pre-machined surface thicker than a final finished surface allows finishing work for obtaining the final finished surface to be made along the corrected feed path. In other words, it is only necessary that, after semi-finishing work before the final finishing work, the attachment error is specified using the machined surface.

The controller 20 determines the attachment error of the cutting tool 11 based on the coordinate values of at least three points on the pre-machined surface of the to-be-cut object 6. When the coordinate value of one point acquired during cutting work on the pre-machined surface is used, the controller 20 may acquire the coordinate values of at least two points where the cutting tool 11 is brought into contact with the pre-machined surface at positions different from the rotation angle position of the cutting tool 11 during turning work to determine the attachment error in the cutting tool 11. That is, the controller 20 may acquire the coordinate values of the at least two points where the cutting tool 11 is brought into contact with the pre-machined surface at different y positions to determine the attachment error in the cutting tool 11.

With a consideration given to the possibility that the accuracy of the coordinate value acquired during pre-machining work and the accuracy of the coordinate value acquired at the time of contact with the pre-machined surface may be slightly different from each other, the controller 20 may use, rather than the coordinate value acquired during pre-machining work, the coordinate values of at least three points where the cutting tool 11 is brought into contact with the pre-machined surface at different y positions to determine the attachment error in the cutting tool 11.

Note that, as described in the first example, when the coordinate value of the contact point is acquired, the to-be-cut object 6 may be rotated from the viewpoint of preventing the cutting edge 11a from being damaged. In this case, since the contact point is slightly grooved, it is preferable to slightly shift the z position within a range where the z position can be regarded as being substantially uniform when acquiring the coordinate value of the next contact point. An example where the controller 20 determines the attachment error using the coordinate values of three points will be given below, but, in order to increase the detection accuracy of the attachment error, coordinate values of four or more points may be used.

Figure 23A:
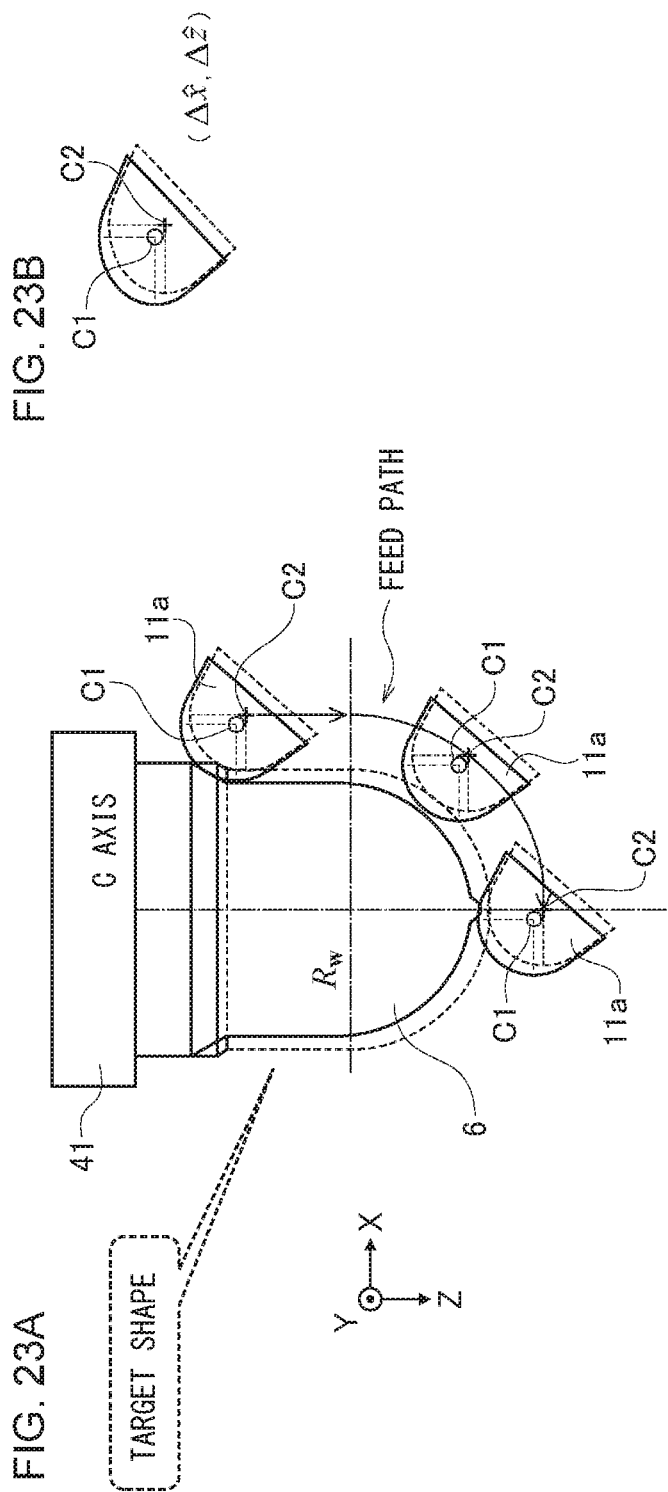
FIGS. 23A, 23B and 23C are diagrams showing a state where a to-be-cut object is machined.

FIG. 23A shows a state where the to-be-cut object 6 is machined into a shape having a cylindrical surface and a hemispherical surface. The to-be-cut object 6 is rotatably supported on the attachment spindle 41. In the fifth example, the cutting tool 11 is attached to the cutting apparatus 1 with an attachment error ($\Delta\hat{x}, \Delta\hat{y}, \Delta\hat{z}$).

Figure 23B:
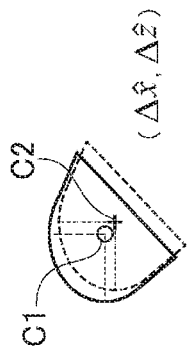
Figure 23C:
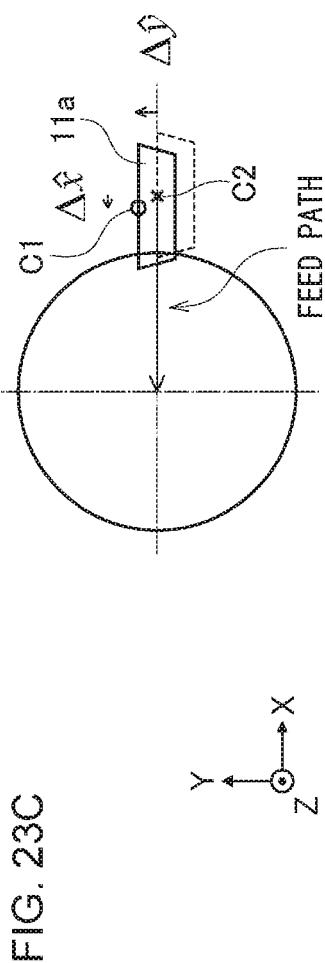

FIG. 23B shows an attachment error ($\Delta\hat{x}, \Delta\hat{z}$) in the ZX plane. C2 denotes an ideal tool center position, and C1 denotes a tool center position containing an error. FIG. 23C shows an attachment error ($\Delta\hat{x}, \Delta\hat{y}$) in the XY plane.

In FIG. 23A, a feed path represented by an arrow is a path through which the ideal center C2 passes. In the NC machine tool, the feed path is calculated on the assumption that the tool center is located at C2. The movement controller 22 uses the feed capability of the feed mechanism 7 in a Z-axis translation direction and a C-axis rotation direction to subject the to-be-cut object 6 to machining work using the cutting tool 11. In FIG. 23A, the dotted line represents an ideal machined surface when the tool center is located at C2. For this turning work, it is predetermined as a design value that machining work is performed to form the cylindrical surface having the radius Rw.

However, in a case where the actual tool center is located at C1 containing an attachment error, when the movement controller 22 moves the cutting tool 11 along the calculated feed path, a machined surface represented by a solid line is formed.

Figure 24A:
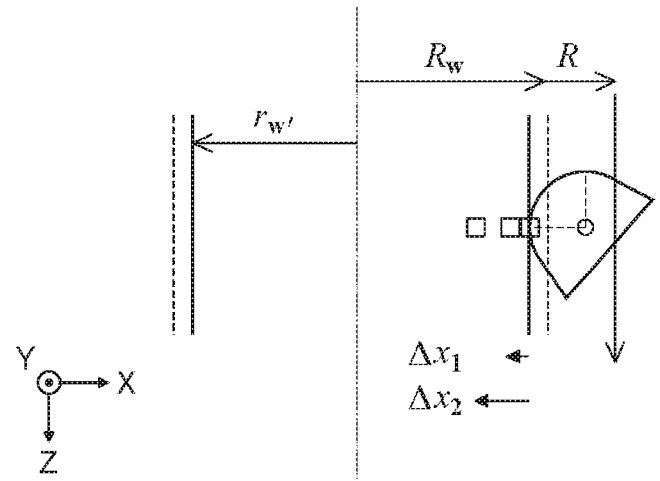
FIGS. 24A and 24B are diagrams for describing a method for deriving an attachment error in tool center.
Figure 24B:
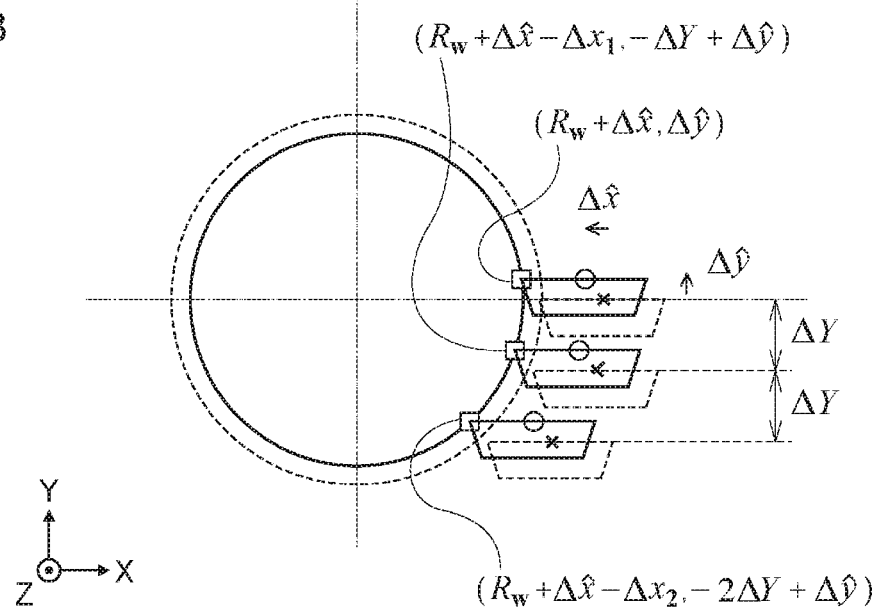

FIGS. 24A and 24B are diagrams for describing a method for deriving an attachment error ($\Delta\hat{x}, \Delta\hat{y}$) in the tool center. Due to the attachment error ($\Delta\hat{x}, \Delta\hat{y}$) in the XY plane, the radius Rw of the cylindrical surface become rw' rather than Rw. The movement controller 22 moves the cutting tool 11 relative to the to-be-cut object 6 subjected to cutting work using the feed capability of the feed mechanism 7 in a movement direction not used for the cutting work and acquires the coordinate values of at least two positions where the cutting tool 11 comes into contact with the to-be-cut object 6. In the fifth example, the movement controller 22 uses the feed capability of the feed mechanism 7 in an X-axis translation direction and Y-axis translation direction to acquire a plurality of contact coordinate values.

Even when the cutting tool 11 is brought into contact with the pre-machined surface by using the feed capability of the feed mechanism 7 in the same movement direction as for the pre-machining work, the contact is theoretically made at the same coordinate position as during the machining work. Therefore, in the fifth example, in order to derive the attachment error in the tool center by the contact between the pre-machined surface and the cutting tool 11, a feed capability of the feed mechanism 7 that is different in movement direction from the feed capability used for the pre-machining work is used to bring the cutting tool 11 into contact with the pre-machined surface. In other words, the contact position of the cutting tool 11 is derived using a feed capability other than the feed capability in the movement direction required for the pre-machining work. As described above, the movement controller 22 uses a feed capability along a ZC axis for the pre-machining work to acquire the coordinates of the contact point, but uses a feed capability along an XY axis for attachment error estimation process.

As described in the first example, the positional relationship deriving part 23 acquires the coordinate values of three points on the cylindrical surface.

In FIGS. 24A and 24B, squares denote points on the cylindrical surface, and the points are represented as follows:

Point 1: $(R_w+\Delta\hat{x}, \Delta\hat{y})$,
Point 2: $(R_w+\Delta\hat{x}-\Delta x_1, -\Delta Y+\Delta\hat{y})$, and
Point 3: $(R_w+\Delta\hat{x}-\Delta x_2, -2\Delta Y+\Delta\hat{y})$. $\Delta x_1$ and $\Delta x_2$ are values detected by the movement controller 22.

Note that the coordinate value represented as the point 1 in this example is based on coordinates acquired during pre-machining work, but the movement controller 22 may bring the cutting edge 11a into contact with the cylindrical surface at three points to acquire the coordinate values of the three points. At this time, from the viewpoint of preventing the cutting edge 11a from being damaged, when the to-be-cut object 6 is rotated, it is preferable that the movement controller 22 bring the cutting edge 11a into contact with different z positions on the cylindrical surface to acquire the contact coordinate values of the three points.

The positional relationship deriving part 23 performs the following calculations:

$(R_w+\Delta\hat{x})^2+(0+\Delta\hat{y})^2=r_{w'}^2$      [EQUATION-1]

$(R_w+\Delta\hat{x}-\Delta x_1)^2+(-\Delta Y+\Delta\hat{y})^2=r_{w'}^2$      [EQUATION-2]

$(R_w+\Delta\hat{x}-\Delta x_1)^2+(-2\Delta Y+\Delta\hat{y})^2=r_{w'}^2$      [EQUATION-3]

WHEN [EQUATION-1] AND [EQUATION-2] ARE SIMULTANEOUSLY SATISFIED.

$2(R_w+\Delta\hat{x})\Delta x_1 - \Delta x_1^2 = \Delta Y^2 - 2\Delta Y\Delta\hat{y}$

FROM [EQUATION-2] AND [EQUATION-3].

$2(R_w+\Delta\hat{x})(\Delta x_2-\Delta x_1)+\Delta x_1^2-\Delta x_2^2=3\Delta Y^2-2\Delta Y\Delta\hat{y}$ WHEN BOTH EQUATIONS ARE SIMULTANEOUSLY SATISFIED WITH RESPECT TO $\Delta\hat{y}$ $$\Delta\hat{x} = \frac{2\Delta x_1^2 - \Delta x_2^2 - 2\Delta Y^2}{4\Delta x_1 - 2x_2} - R_w$$

$$\Delta\hat{y} = \frac{\Delta Y}{2} - \frac{\frac{2\Delta x_1^2 - \Delta x_2^2 - 2\Delta Y^2}{4\Delta x_1 - 2x_2}\Delta x_1}{\Delta Y} + \frac{\Delta x_1^2}{2\Delta Y}$$

As described above, the positional relationship deriving part 23 can derive ($\Delta\hat{x}, \Delta\hat{y}$).

The attachment error $\Delta\hat{z}$ in the Z-axis direction may be derived by the positional relationship deriving part 23 by using, for example, the reference surface of the attachment spindle 41 as described in the second example. As a result, the attachment error ($\Delta\hat{x}, \Delta\hat{y}, \Delta\hat{z}$) in the tool center is specified. As described above, in the fifth example, a difference between the pre-machined surface and the target surface machined as designed is used to specify the attachment error ($\Delta\hat{x}, \Delta\hat{y}, \Delta\hat{z}$) in the tool center, and the movement controller 22 can recalculate a feed path with the attachment error corrected accordingly.

Sixth Example

In a sixth example, a description will be given of a method for measuring deformation of the cutting edge 11a.

As described in the third example, the cutting edge 11a may have irregularities. Therefore, in the following, a method for measuring irregularities on the pre-machined surface to which a shape of the cutting edge is transferred and specifying an error in shape of the tool cutting edge from the irregularities on the machined surface will be described. In the sixth example, when an error in shape due to a shape error factor other than deformation of the cutting edge can be estimated, the shape of the pre-machined surface is measured using one cutting edge point on the assumption that feed motion, made by the feed mechanism 7, in a movement direction not used for the cutting work is accurate, and thus the error in shape of the tool cutting edge is specified based on a difference between each estimated position on the pre-machined surface and a corresponding detected position on the pre-machined surface. In the sixth example, the movement controller 22 moves the cutting tool 11 relative to the to-be-cut object 6 subjected to cutting work using the feed capability of the feed mechanism 7 in a movement direction not used for the cutting work and specifies the attachment error of the tool cutting edge based on the coordinate values of at least two positions where the cutting tool 11 comes into contact with the to-be-cut object 6.

Figure 25C:
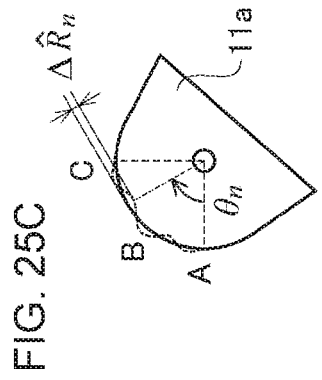
FIGS. 25A, 25B, 25C, and 25D are diagrams for describing a method for specifying an error in shape of a tool cutting edge.
Figure 25A:
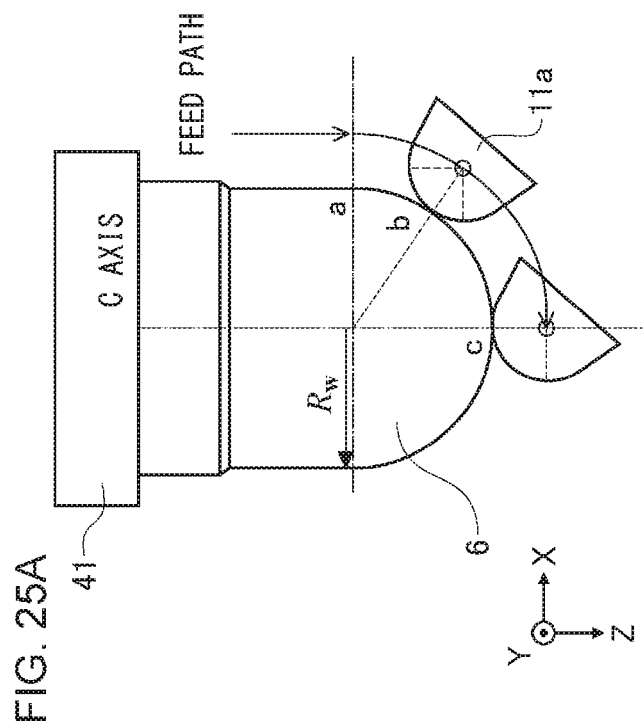

FIG. 25A shows how the hemisphere surface is machined. The movement controller 22 uses the feed capability of the feed mechanism 7 in the X-axis and Z-axis translation directions and the C-axis rotation direction to subject the to-be-cut object 6 to machining work using the cutting tool 11. FIG. 25A shows a state where machining work is performed along an ideal feed path with no attachment error in the tool center. Note that when the attachment error in the tool center is present, it is preferable that the attachment error ($\Delta \hat{x}$, $\Delta \hat{y}$, $\Delta \hat{z}$) be measured before estimating the error in shape of the tool cutting edge, as described in the fifth example. In the following, the positional relationship deriving part 23 estimates the error in shape of the cutting edge from a deviation from an ideal hemispherical shape of the pre-machined surface.

As shown in FIG. 25A, during this spherical machining work, turning work is performed in which the cutting tool 11 is not rotated around the B axis. Referring to FIGS. 25A and 25C, a shape of a point A of the cutting edge 11a is transferred to a shape of a point a of the to-be-cut object 6, a shape of a point B of the cutting edge 11a is transferred to a shape of a point b of the to-be-cut object 6, and a shape of a point C of the cutting edge 11a is transferred to a shape of a point c of the to-be-cut object 6. As described above, the shapes from A to C of the cutting edge 11a are transferred to the pre-machined surface from a to c of the to-be-cut object 6.

At this time, when the shapes from A to C each have an ideal arc shape, a cross section of the spherical surface thus machined has an ideal arc shape accordingly. However, as shown in FIG. 25C, when the cutting edge 11a has irregularities, the irregularities are transferred to the machined surface of the to-be-cut object 6.

Figure 25D:
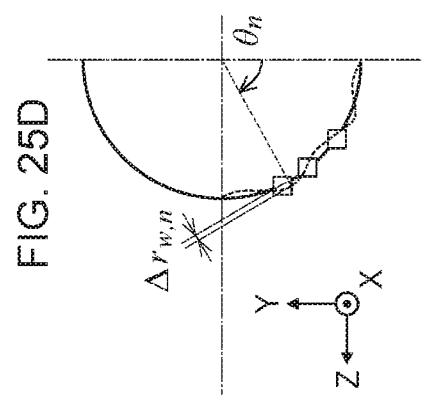
Figure 25B:
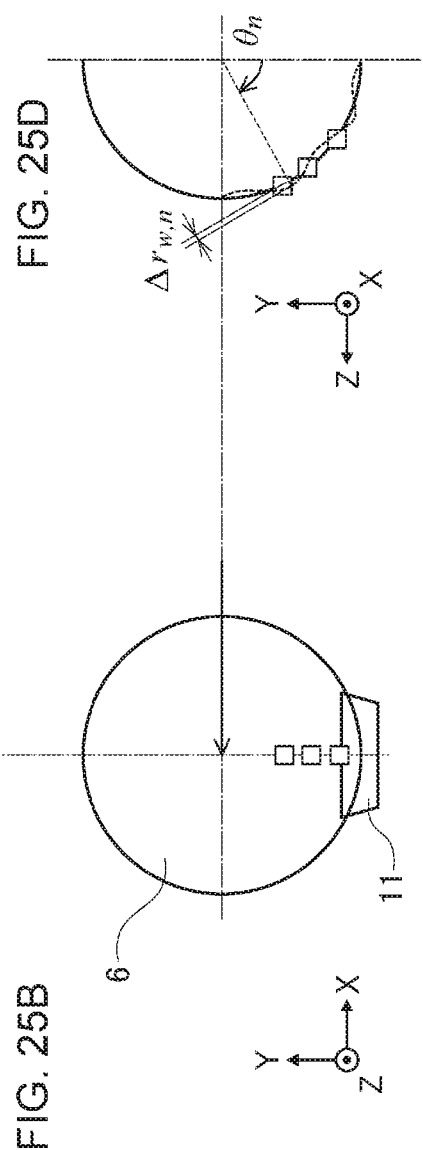

FIG. 25B shows how the spherical shape of the to-be-cut object 6 is measured. The movement controller 22 uses the feed capability of the feed mechanism 7 in the Y-axis and Z-axis translation directions to acquire a plurality of contact coordinate values. After aligning the tool center with the C-axis rotation center, the movement controller 22 moves the cutting edge 11a toward the origin of the hemispherical surface while shifting the cutting edge 11a by θn without changing the x position of the cutting edge 11a (x=0). The smaller the shift amount of θn, the larger the number of contact points can be taken. The positional relationship deriving part 23 acquires the coordinates of the plurality of contact points to specify the shape of the arc on the spherical surface with x=0. The positional relationship deriving part 23 can acquire the actual spherical shape of the to-be-cut object 6 to acquire an amount of deviation from the estimated spherical shape, and can thus derive the deformation of the cutting edge 11a. FIG. 25D shows that a detection value of an amount of deviation in spherical surface at θn is $\Delta r_{w,n}$, but, at this time, deformation in the radial direction of the cutting edge 11a becomes $\Delta \hat{Rn}$ ($=-\Delta r_{w,n}$) (see FIG. 25C). As described above, the positional relationship deriving part 23 can measure the shape of the cutting edge.

According to the sixth example, the movement controller 22 can use, with respect to the to-be-cut object 6 subjected to cutting work, the feed capability in the Y-axis translation direction not used for the cutting work to allow the positional relationship deriving part 23 to specify a profile of the shape of the cutting edge based on an amount of deviation from a position where the cutting edge 11a should come into with the to-be-cut object 6 if the cutting edge 11a has the ideal shape. The positional relationship deriving part 23 specifies the profile of the shape of the cutting edge to allow the movement controller 22 to calculate a feed path by taking into account the profile of the shape of the cutting edge. Alternatively, when it is estimated that other machining error factors are small, it is possible to directly correct a tool movement path by the amount of the error in shape measured in the sixth example, and then perform the final finishing work.

Seventh Example

In the fifth example, the description has been given of the method for, when an attachment error of the cutting tool 11 is present, deriving the attachment error ($\Delta \hat{x}$, $\Delta \hat{y}$, $\Delta \hat{z}$) in the tool center. In the seventh example, a description will be given of a method for, when not only an attachment error of the cutting tool 11 is present but also an error in the feed direction of the tool is present, deriving these errors.

In the seventh example as well, the movement controller 22 moves the cutting tool 11 relative to the to-be-cut object 6 subjected to cutting work using the feed capability of the feed mechanism 7 in a movement direction not used for the cutting work and specifies the attachment error in the tool cutting edge based on the coordinate values of at least two positions where the cutting tool 11 comes into contact with the to-be-cut object 6.

Figure 26B:
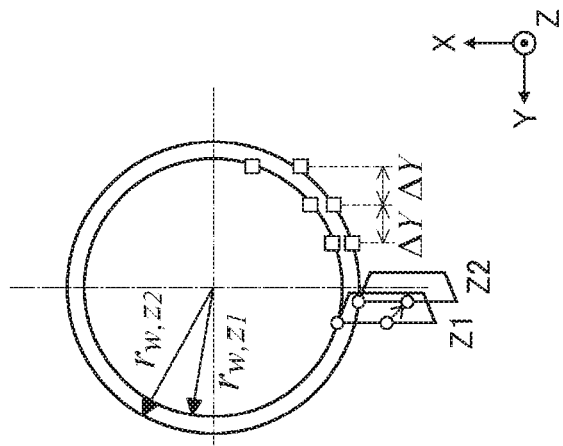
FIGS. 26A and 26B are diagram for describing a method for specifying parallelism between a rotation axis of a to-be-cut object and a tool linear motion axis.
Figure 26A:
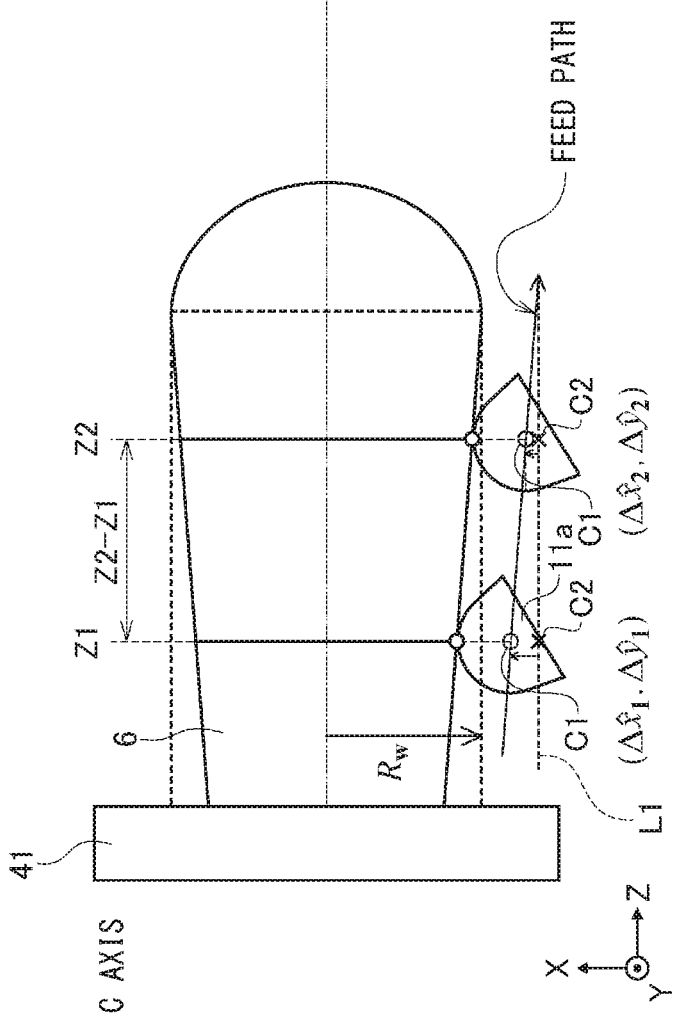

FIG. 26A shows a state when the cutting tool 11 is moved in the Z-axis direction to perform pre-machining work. The movement controller 22 uses the feed capability of the feed mechanism 7 in the Z-axis translation direction and the C-axis rotation direction to subject the to-be-cut object 6 to machining work using the cutting tool 11. In this turning work, when the cutting tool 11 is fed along a line L1 parallel to the Z axis, an attachment error is present in the tool center described in the fifth example, and the Z axis and the C-axis rotation center are not parallel to each other, causing a machining error in a target cylindrical surface. To more specifically describe the line L1, in the NC machine tool, the line L1 extends along the Z axis, and therefore the feed path of the cutting tool 11 is calculated on the assumption that the line L1 is parallel to the C-axis rotation center, but the Z axis and the C-axis rotation center are not actually parallel to each other, so that the movement controller 22 moves the cutting edge 11a along a path represented by the solid arrow as the feed path. This forms a pre-machined surface having a shape different from the target shape.

Note that, this parallelism error factor includes, in addition to an assembly error during the manufacture of the machine tool, deformation due to changes in weight distribution during installation, movement of the feed mechanism, or attachment of the to-be-cut object, deformation due to machining force, thermal deformation due to temperature and machining heat and the like. Among these, when considering deformation due to machining force, it is desirable to set machining conditions such that the machining force is approximately the same during the pre-machining work and the final finishing work.

In an error deriving process, the movement controller 22 uses the feed capability of the feed mechanism 7 in the X-axis, Y-axis, and Z-axis translation directions to acquire a plurality of contact coordinate values. The movement controller 22 derives the contact coordinate values of the cutting edge 11a when the y position is changed at each of z positions Z1 and Z2 and moved in the x direction three times. Deriving the contact coordinate values of the three points causes, as described in the fifth example, an amount of positional deviation $(\Delta\hat{x}_1, \Delta\hat{y}_1), (\Delta\hat{x}_2, \Delta\hat{y}_2)$ from the ideal tool center position to be derived.

The positional relationship deriving part 23 can calculate a locus of the feed path by deriving $(\Delta\hat{x}_1, \Delta\hat{y}_1, Z1), (\Delta\hat{x}_2, \Delta\hat{y}_2, Z2)$. Here, for any z, when a position error expected to be present relative to the C-axis rotation center is denoted by $(\Delta\hat{x}, \Delta\hat{y})$, it results in:

$$\frac{\Delta\hat{x} - \Delta\hat{x}_1}{\Delta\hat{x}_2 - \Delta\hat{x}_1} = \frac{\Delta\hat{y} - \Delta\hat{y}_1}{\Delta\hat{y}_2 - \Delta\hat{y}_1} = \frac{z - Z1}{Z2 - Z1},$$

and in turn results in:

$$(\Delta\hat{x}, \Delta\hat{y}) = \left(\Delta\hat{x}_1 + \frac{(\Delta\hat{x}_2 - \Delta\hat{x}_1)(z - Z1)}{Z2 - Z1}, \Delta\hat{y}_1 + \frac{(\Delta\hat{y}_2 - \Delta\hat{y}_1)(z - Z1)}{Z2 - Z1}\right).$$

Note that the positional deviation between the two Z positions is linearly interpolated, but a positional deviation among three or more Z positions may be measured to make the degree of interpolation higher.

As described above, according to the seventh example, the movement controller 22 can use, with respect to the to-be-cut object 6 subjected to cutting work, the feed capability in the X-axis and Y-axis translation directions not used for the cutting work to allow the positional relationship deriving part 23 to specify a parallelism in the feed direction of the cutting tool 11 along the C axis based on the amount of deviation from a position where the cutting tool 11 should come into with the to-be-cut object 6 if the to-be-cut object 6 has the ideal shape. In the seventh example, the positional relationship deriving part 23 can estimate the parallelism in the feed direction of the cutting tool 11 with respect to the C axis to specify a deviation in movement direction of the cutting tool 11 relative to the to-be-cut object 6. When the position error at any z is determined as represented by the above equation, the movement controller 22 can calculate a feed path with the position error corrected.

Eighth Example

Figure 27:
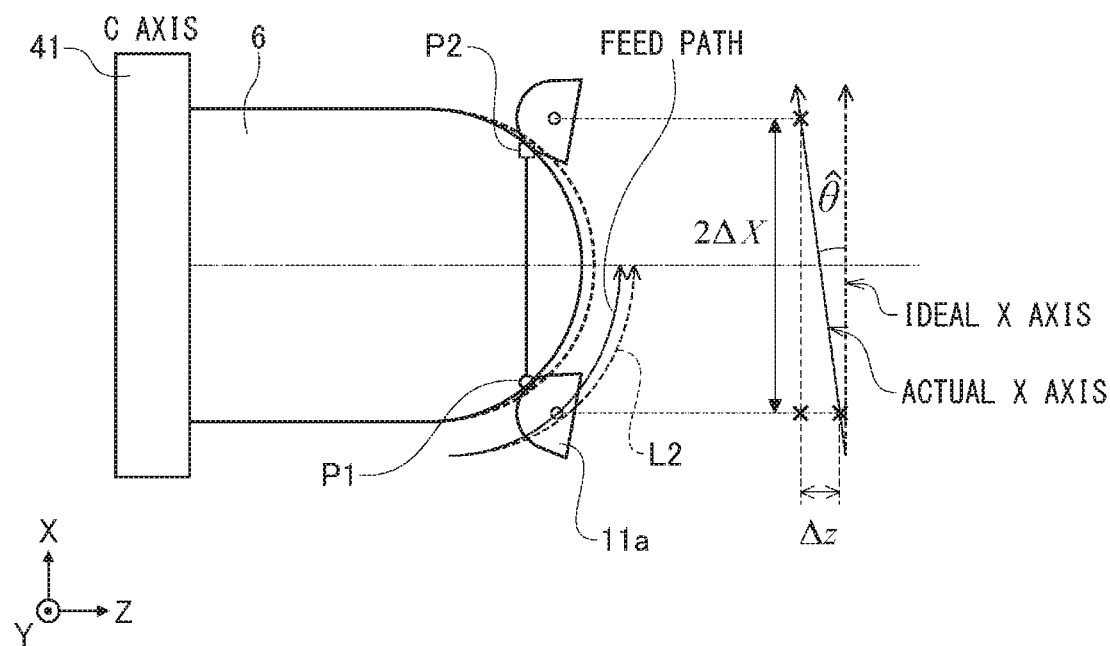
FIG. 27 is a diagram for describing a method for specifying orthogonality between the rotation axis of the to-be-cut object and the tool linear motion axis.

FIG. 27 shows a state where the cutting tool 11 is moved in the X-axis direction and the Z-axis direction to pre-machine a spherical surface. In this turning work, the X axis should be orthogonal to the C axis, but the orthogonality is broken, causing a machining error in the spherical surface. In the NC machine tool, a feed path that is a line L2 for machining the spherical surface is calculated using the X axis as a reference, but the orthogonality between the X axis for tool control and the C axis that is the rotation axis of the to-be-cut object 6 is broken, causing the movement controller 22 to move the cutting edge 11a along a path represented by the solid arrow as the feed path.

In an error deriving process, the movement controller 22 brings the cutting edge 11a into contact with a certain machining point $P_1$ and a point $P_2$ that is located symmetrical about the C axis. At this time, from a difference between a movement distance $(2\Delta X)$ in the X direction and a Y-direction detection value $(\Delta z)$, $\hat{\theta}$ denoting the orthogonality between the C axis and the X axis is determined from the following equation:

$$\hat{\theta} = a\tan(\Delta z / 2\Delta X)$$

As described above, when $\hat{\theta}$ denoting the orthogonality is determined, the movement controller 22 calculates a feed path of the tool in which $\hat{\theta}$ is set to zero and makes a correction.

Note that this method is also applicable to surfaces other than spherical surfaces (including flat surfaces and aspherical surfaces).

In the eighth example as well, the movement controller 22 moves the cutting tool 11 relative to the to-be-cut object 6 subjected to cutting work using the feed capability of the feed mechanism 7 in a movement direction not used for the cutting work and specifies the attachment error in the tool cutting edge based on the coordinate values of at least two positions where the cutting tool 11 comes into contact with the to-be-cut object 6.

As described above, in the eighth example, the positional relationship deriving part 23 can estimate the orthogonality of the X axis to the C axis to specify the amount of deviation in movement direction of the cutting tool 11 relative to the to-be-cut object 6.

Ninth Example

In the fifth example, the attachment error $(\Delta\hat{x}, \Delta\hat{y}, \Delta\hat{z})$ in the tool center is estimated using the coordinate value when the cutting edge 11a is brought into contact with the cylindrical surface. In a ninth example, the attachment error $(\Delta\hat{x}, \Delta\hat{y}, \Delta\hat{z})$ in the tool center is estimated using a coordinate value when the cutting edge 11a is brought into contact with a pre-machined spherical surface. For example, the pre-machined spherical surface may be a surface resulting from removing the cylindrical surface from the to-be-cut object 6 shown in FIGS. 23A to 23C. The movement controller 22 uses the feed capability of the feed mechanism 7 in the X-axis and Z-axis translation directions and the C-axis rotation direction to subject the to-be-cut object 6 to pre-machining work using the cutting tool 11.

In the method shown in the ninth example, movement control is performed to bring the cutting edge 11a into contact with three points on the same Z position. In an error deriving process, the movement controller 22 uses the feed capability of the feed mechanism 7 in the X-axis, Y-axis, and Z-axis translation directions to acquire a plurality of contact coordinate values.

Figure 28A:
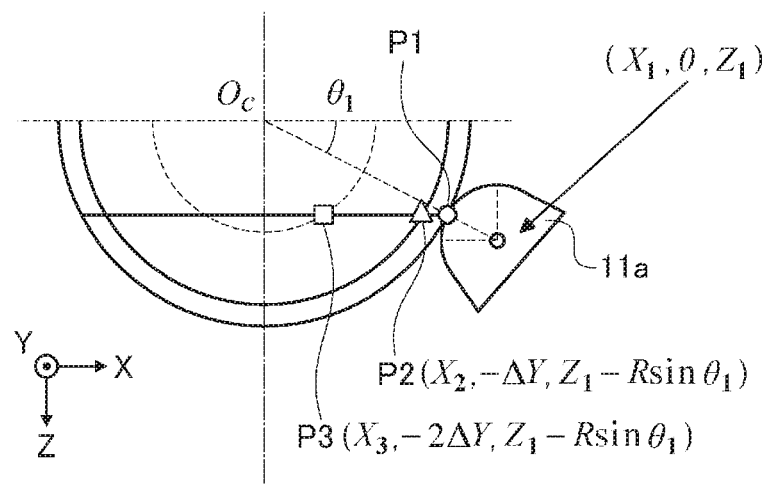
FIGS. 28A and 28B are diagrams for describing a method for estimating an attachment error in tool center.
Figure 28B:
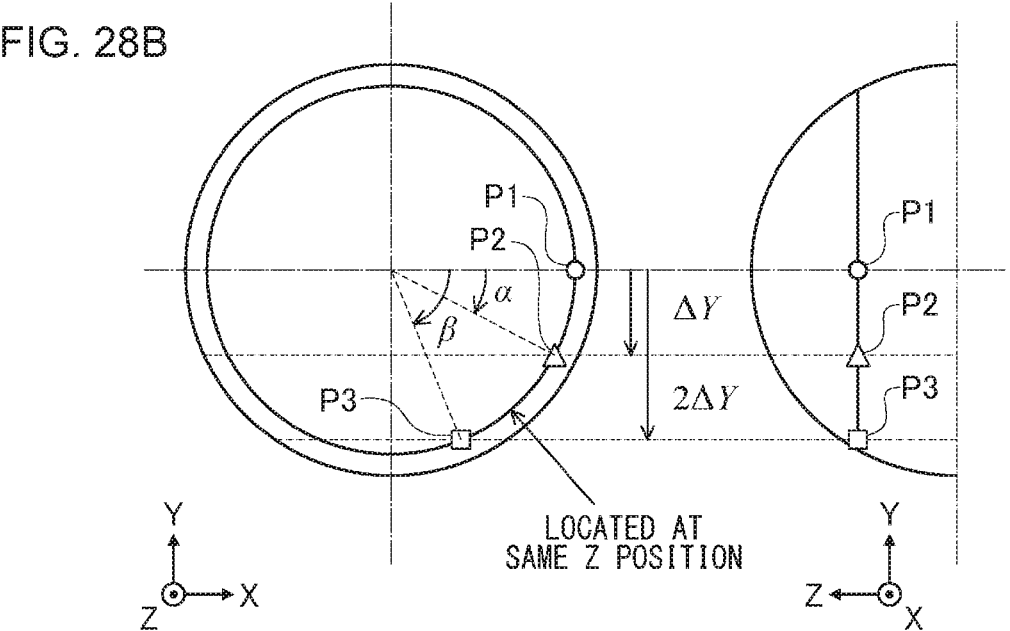

FIG. 28A shows a state where P1 is machined by the cutting edge 11a. The tool center coordinates on the NC machine tool are known and are $(X_1, 0, Z_1)$. An angle of a line segment connecting a workpiece center $O_c$ and P1 with respect to the XY plane is $\theta_1$. When the nose radius of the cutting edge 11a is denoted by R, the coordinates of P1 serving as a machining point becomes P1: $(X_1 - R\cos\theta_1, 0, Z_1 - R\sin\theta_1)$ Once the coordinates of P1 are determined, P2, P3 to be touched are defined on the same z position $(Z_1 - R\sin\theta_1)$ as P1 (see FIG. 28B) and at positions (see FIG. 28B) shifted by $\Delta Y$, $2\Delta Y$ from P1 in the Y-axis negative direction. Further, in the XY plane, an angle between a line segment connecting the C-axis rotation center and P1 and a line segment connecting the C-axis rotation center and P2 is denoted by a, and an angle between a line segment connecting the C-axis rotation center and P1 and a line segment connecting the C-axis rotation center and P3 is denoted by Q (see FIG. 28B).

Figure 29:
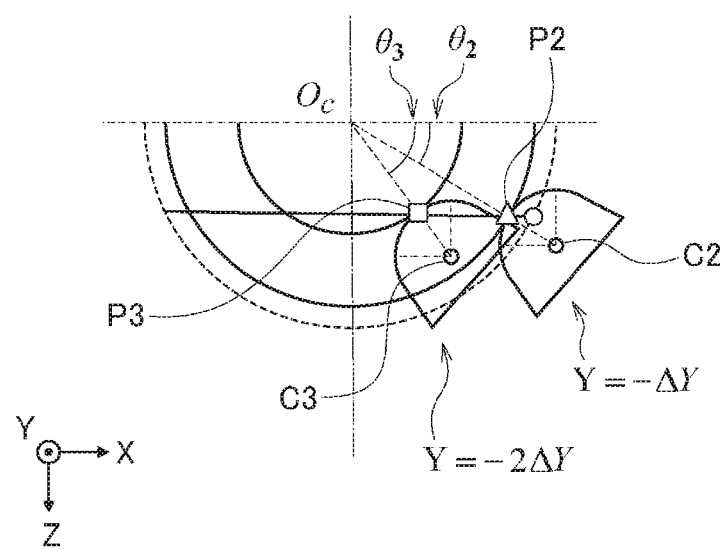
FIG. 29 is a diagram for describing the method for estimating an attachment error in tool center.

FIG. 29 shows an angle of a line segment connecting the workpiece center $O_c$ and a contact point in the XY plane. Herein, an angle of a line segment extending to P2 is denoted by $\theta_2$, and an angle of a line segment extending to P3 is denoted by $\theta_3$.

Therefore, the tool center coordinates (C2) for making contact with P2 and the tool center coordinates (C3) for making contact with P3 are calculated as follows.

C2: $(X_2 + R \cos \theta_2, -\Delta Y, Z_1 - R \sin \theta_1 + R \sin \theta_2)$
C3: $(X_3 + R \cos \theta_3, -2\Delta Y, Z_1 - R \sin \theta_1 + R \sin \theta_3)$ The positional relationship deriving part 23 calculates $X_2$, $X_3$, $\alpha$, $\beta$, $\theta_1$, $\theta_2$, and $\theta_3$ from the following geometric relational expressions:

*GEOMETRIC RELATIONAL EXPRESSION $$(X_1 - R\cos\theta_1)^2 = X_2^2 + (-\Delta Y)^2 =$$

$$X_3^2 + (-2\Delta Y)^2 = \text{(RADIUS OF CIRCLE PASSING}$$
$$\text{THROUGH THREE CONTACT POINTS)}^2$$

$$\alpha = \operatorname{atan}\left(\frac{\Delta Y}{X_2}\right)$$

$$\beta = \operatorname{atan}\left(\frac{2\Delta Y}{X_3}\right)$$

$$\theta_1 = \operatorname{atan}\left(\frac{Z_1}{X_1}\right)$$

$$\theta_2 = \operatorname{atan}\left(\frac{Z_1 - R\sin\theta_1}{X_2}\right)$$

$$\theta_3 = \operatorname{atan}\left(\frac{Z_1 - R\sin\theta_1}{X_3}\right)$$

The origin of each coordinate value is $O_c$, $O_c$ is a point that is located on the C-axis rotation center line and is identical in z coordinate value to a center (when a tool installation error is present, displaced from the C-axis rotation center line accordingly) of a locus of a machined point (arc in a plane parallel to the XZ plane).

The movement controller 22 brings the cutting edge 11a into contact with P2 and P3. At this time, the movement controller 22 adjusts (y, z) of the center coordinates of the cutting edge 11a to the coordinate values of C2 and C3, and then moves the cutting edge 11a in the X direction to bring the cutting edge 11a into contact with the spherical surface. At this time, when contact is made with the same x coordinate value as the calculated value, it is determined that no attachment error is present in the center coordinate. On the other hand, when contact is made at the x position of the tool center on the NC machine tool different from the calculated value, the amount of movement in the X direction is detected as an error.

Detection C2: $(X_2 + \Delta x_2 + R \cos Z_2, -\Delta Y, Z_1 - R \sin \theta_1 + R \sin \theta_2)$
Detection C3: $(X_3 + \Delta x_3 + R \cos \theta_3, -2\Delta Y, Z_1 - R \sin \theta_1 + R \sin \theta_3)$ $\Delta x_2$ and $\Delta x_3$ are detection values.

From the detection values, P2 and P3 can be approximately derived as follows:

$(X_2 + \Delta x_2, -\Delta Y, Z_1 - R \sin \theta_1)$     Detection P2:

$(X_3 + \Delta x_3, -2\Delta Y, Z_1 - R \sin \theta_1)$     Detection P3:

Note that, regarding the error in the z position, the nose radius of the tool is generally smaller than the radius of the machined surface, and even when the attachment error is present, a locus shape of the machined point (in a plane parallel to the XZ plane) has a correct curvature viewed in the Y direction (an error is present in the curvature when the XY cross section is viewed in the Z direction) because the locus shape is merely translated by the amount of attachment error; and therefore, a deviation in the z position is smaller than a deviation in the x position. Therefore, the deviation in the z position can be ignored.

Figure 30B:
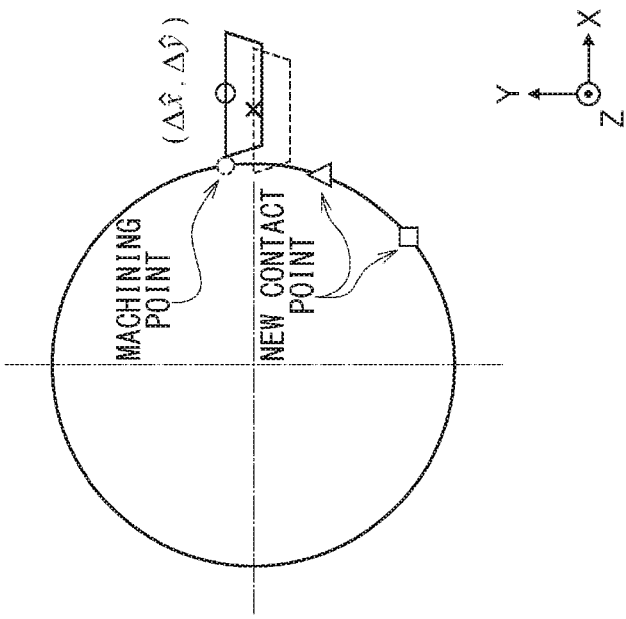
FIGS. 30A and 30B are diagrams for describing the method for estimating an attachment error in tool center.
Figure 30A:
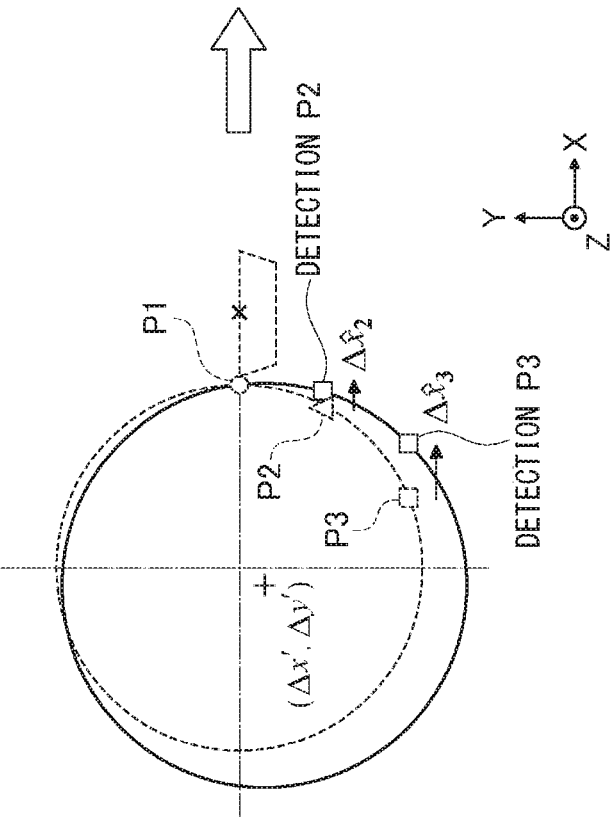

FIG. 30A shows a relationship between an initial circle formed by P1, P2, and P3 and a virtual circle formed by using errors $(\Delta x_2, \Delta x_3)$ derived from the initial circle. The virtual circle passes through P1, detection P2, and detection P3. $(\Delta x', \Delta y')$ is the center of the virtual circle.

FIG. 30B shows a coordinate system in which the center coordinates of the virtual circle are returned to the origin. At this time, the tool attachment error $(\Delta \hat{x}, \Delta \hat{y})$ is estimated by the following equation:

$$(\Delta \hat{x}, \Delta \hat{y}) = (-\Delta x', -\Delta y').$$

The positional relationship deriving part 23 uses the estimated tool attachment error $(\Delta \hat{x}, \Delta y')$ to calculate $X_2$, $X_3$, $\alpha$, $\beta$, $\theta_1$ (the first contact point remains the same as during machining work and does not change from the first contact, and therefore, similar to $X_1$ and $Z_1$, $\theta_1$ does not change and need not necessarily be recalculated), $\theta_2$, and $\theta_3$ again from the following geometric relational expressions:

*GEOMETRIC RELATIONAL EXPRESSION $$(X_1 + \Delta \hat{x} - R\cos\theta_1)^2 + (\Delta \hat{y})^2 = X_2^2 + (\Delta \hat{y} - \Delta Y)^2 =$$

$$X_3^2 + (\Delta \hat{y} - 2\Delta Y)^2 = \text{(RADIUS OF CIRCLE PASSING}$$
$$\text{THROUGH THREE CONTACT POINTS)}^2$$

$$\alpha = \operatorname{atan}\left(\frac{\Delta \hat{y}}{X_1 + \Delta \hat{x} - R\cos\theta_1}\right) - \operatorname{atan}\left(\frac{\Delta \hat{y} - \Delta Y}{X_2}\right)$$

$$\beta = \operatorname{atan}\left(\frac{\Delta \hat{y}}{X_1 + \Delta \hat{x} - R\cos\theta_1}\right) - \operatorname{atan}\left(\frac{\Delta \hat{y} - 2\Delta Y}{X_3}\right)$$

$$\theta_1 = \operatorname{atan}\left(\frac{Z_1}{X_1}\right)$$

$$\theta_2 = \operatorname{atan}\left(\frac{Z_1 - R\sin\theta_1}{X_2 - (\Delta \hat{x}\cos\alpha + \Delta \hat{y}\sin\alpha)}\right)$$

$$\theta_3 = \operatorname{atan}\left(\frac{Z_1 - R\sin\theta_1}{X_3 - (\Delta \hat{x}\cos\beta + \Delta \hat{y}\sin\beta)}\right)$$

Accordingly,
C2: $(X_2 - \Delta \hat{x} + R \cos \theta_2, -\Delta Y, Z_1 - R \sin \theta_1 + R \sin \theta_2)$ and
C3: $(X_2 - \Delta \hat{x} + R \cos \theta_3, -2\Delta Y, Z_1 - R \sin \theta_1 + R \sin \theta_3)$ are derived.

The movement controller 22 uses C2 and C3 thus derived to bring the cutting edge 11a into contact with new P2 and P3. The movement controller 22 adjusts (y, z) of the center coordinates of the cutting edge 11a to the coordinate values of C2 and C3, and then moves the cutting edge 11a in the X direction to bring the cutting edge 11a into contact with the spherical surface. At this time, when contact is made with the same center coordinates as the calculated values, it is determined that no estimation error is present in the estimated value of attachment error of the center coordinates. Repeating this process allows the cutting edge 11a to come into contact with the spherical surface of the to-be-cut object 6 with the center coordinates that can be regarded as being the same as the calculated values, that is, the estimation error is sufficiently small, and the accurate attachment error is determined.

In the ninth example as well, the movement controller 22 moves the cutting tool 11 relative to the to-be-cut object 6 subjected to cutting work using the feed capability of the feed mechanism 7 in a movement direction not used for the cutting work and specifies the attachment error in the tool cutting edge based on the coordinate values of at least two positions where the cutting tool 11 comes into contact with the to-be-cut object 6.

As described above, in the ninth example, the difference between the pre-machined spherical surface and the target surface machined as designed is reduced by repeated calculation, and the attachment error ($\Delta x\hat{}$, $\Delta y\hat{}$, $\Delta z\hat{}$) in the tool center is specified accordingly.

Tenth Example

In the fifth to ninth examples, the turning work during which the cutting tool 11 is not rotated about the B axis has been described, but in a tenth example, a description will be given of machining work during the cutting tool 11 is rotated about the B axis, and only one point of the cutting edge 11a is used.

Figure 31A:
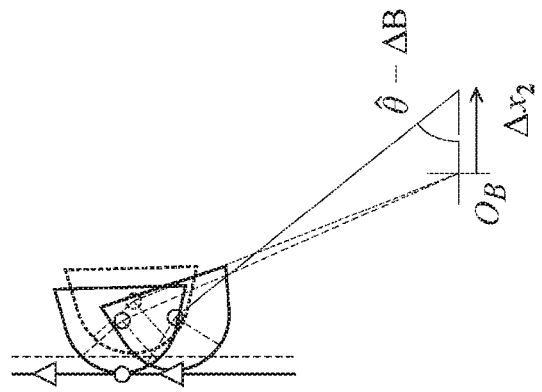
FIGS. 31A and 31B are diagrams for describing a method for deriving a B-axis rotation center.

FIG. 31A shows a state where one point of the cutting edge 11a is used for cutting during machining work. In such machining work, when an error is present in attachment position of the tool center C relative to a B-axis center $O_B$, a machining error occurs.

Figure 31B:
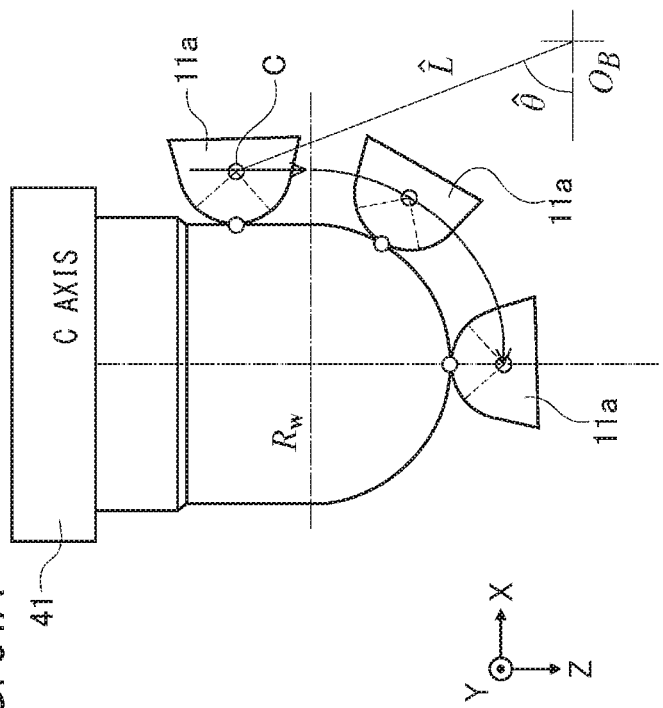

FIG. 31B is a diagram for describing determination of a distance $L\hat{}$ between the B-axis center $O_B$ and the tool center C and an initial attachment angle $\theta\hat{}$. As shown in FIGS. 31A and 32B, the movement controller 22 changes the attachment angle by $+\Delta B$ and $-\Delta B$ with a predetermined y coordinate and z coordinate, detects increments $\Delta x_1$ and $\Delta x_2$ in the x coordinate at the contact point of the cutting edge 11a, and performs calculations using the increments as follows:

$$\hat{L}\cos(\hat{\theta}+\Delta B)=\hat{L}\cos\hat{\theta}+\Delta x_1 \quad \text{[EQUATION-1]}$$

$$\hat{L}\cos(\hat{\theta}-\Delta B)=\hat{L}\cos\hat{\theta}+\Delta x_2 \quad \text{[EQUATION-2]}$$

WHEN [EQUATION-1] AND [EQUATION-2] ARE REARRANGED FOR $\hat{L}$ WITH RESPECT TO $\hat{\theta}$ $$\hat{L}(\cos(\hat{\theta}+\Delta B)-\cos(\hat{\theta}-\Delta B))=\Delta x_1 - \Delta x_2$$

$$\hat{L}=\frac{\Delta x_2 - \Delta x_1}{2\sin\Delta B \times \sin\hat{\theta}}$$

WHEN $\hat{L}$ IS SUBSTITUTED INTO [EQUATION-1]

$$\hat{\theta}=\mathrm{atan}\left(\frac{(1-\cos\Delta B)(\Delta x_1 - \Delta x_2)}{\sin\Delta B(\Delta x_1 + \Delta x_2)}\right)$$

As described above, the distance $L\hat{}$ and the angle $\theta\hat{}$ that correspond to the attachment position of the tool center C relative to the B-axis rotation center are determined.

Eleventh Example

In an eleventh example, an error in the C-axis rotation center is first identified using a surface pre-machined by scanning-line machining work. In the eleventh example as well, the error in relative C-axis rotation center position viewed from the tool center is identified by bringing the cutting edge 11a into contact with the pre-machined surface at a plurality of points and deriving a difference from an ideal profile.

Figure 32:
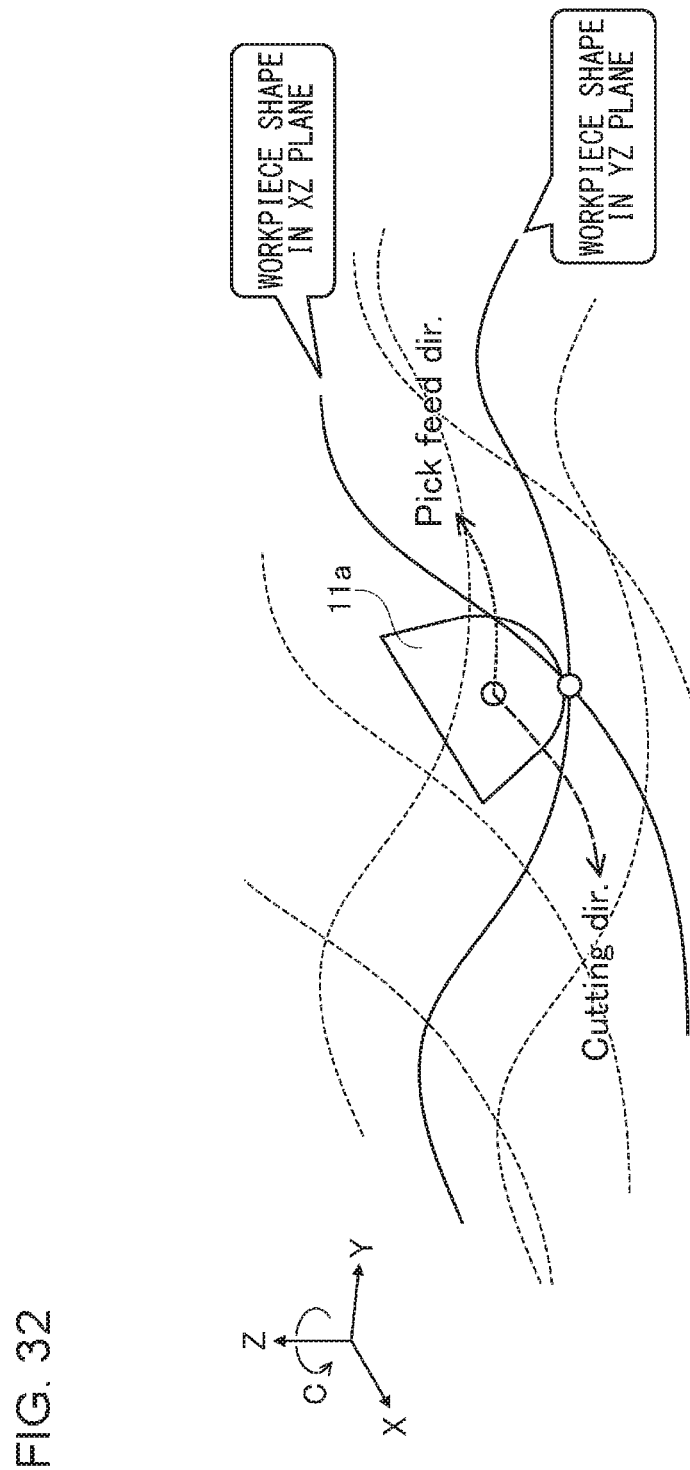
FIG. 32 is a diagram conceptually showing a cutting feed direction and a pick feed direction during scanning-line machining work.

FIG. 32 conceptually shows a cutting feed direction in the XZ plane and a pick feed direction in the YZ plane during the scanning-line machining work. In order to identify the error in the C-axis rotation center, a workpiece shape in the YZ plane and a workpiece shape in the XZ plane can be used.

Use of Workpiece Shape in YZ Plane

Figure 33A:
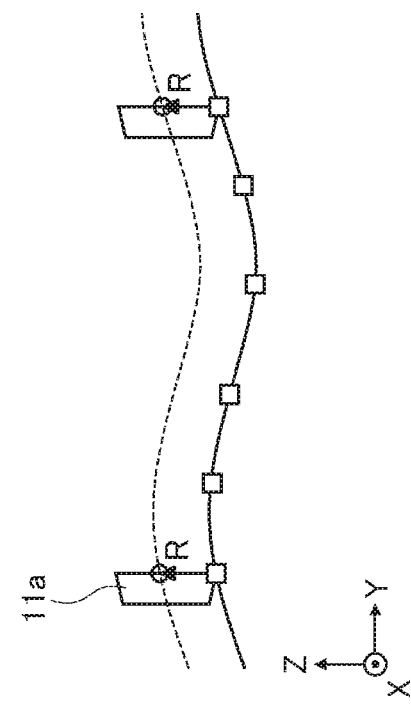
FIGS. 33A and 33B are diagrams for describing the method for estimating an attachment error in tool center.

FIG. 33A shows the cutting edge 11a during machining work. In FIG. 33A, the dotted line represents a cutting motion profile of the tool center during machining work, and the solid line represents a pre-machined surface profile. An ideal cutting motion profile of the tool center and pre-machined surface profile are known.

Figure 33B:
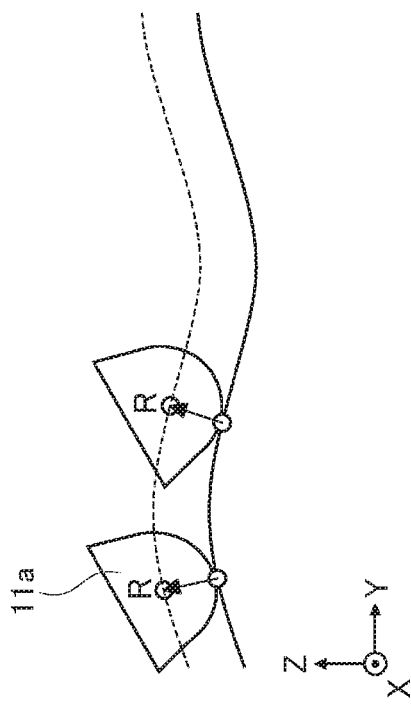

FIG. 33B shows a state where the C-axis (here, the C-axis is applied to the tool side) is rotated 90 degrees from a position during machining work, and then the cutting edge 11a is brought into contact with the pre-machined surface at a plurality of points. In FIG. 33B, the solid line represents a contact surface profile connecting the contact points.

The positional relationship deriving part 23 identifies a Y-direction error in the C-axis rotation center (X-direction error after and before the C-axis rotation) by numerical analysis such that the contact surface profile and the pre-machined surface profile fit each other best. Specifically, the positional relationship deriving part 23 estimates each contact position from the pre-machined surface profile, derives differences from detected positions where actual contact is made, and identifies the C-axis rotation center coordinates such that the sum of the differences is as small as possible.

Use of Workpiece Shape in XZ Plane

Figure 34A:
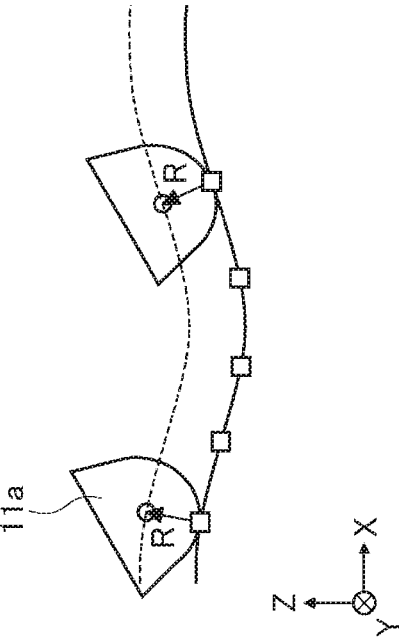
FIGS. 34A and 34B are diagrams for describing the method for estimating an attachment error in tool center.

FIG. 34A shows the cutting edge 11a during machining work. In FIG. 34A, the dotted line represents a cutting motion profile of the tool center during machining work, and the solid line represents a pre-machined surface profile. An ideal cutting motion profile of the tool center and pre-machined surface profile are known.

Figure 34B:
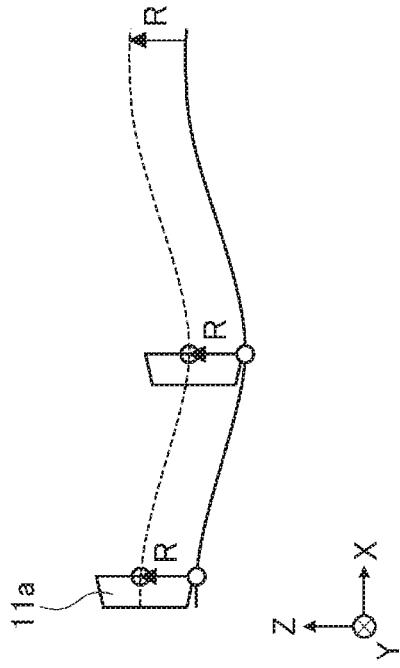

FIG. 34B shows a state where the C axis is rotated 90 degrees from a position for machining work, and then the cutting edge 11a is brought into contact with the pre-machined surface at a plurality of points. In FIG. 34B, the solid line represents a contact surface profile connecting the contact points.

The positional relationship deriving part 23 identifies an X-direction error in the C-axis rotation center (Y-direction error after and before the C-axis rotation) by numerical analysis such that the contact surface profile and the pre-machined surface profile fit each other best. Specifically, the positional relationship deriving part 23 estimates each contact position from the pre-machined surface profile, derives differences from detected positions where actual contact is made, and identifies the C-axis rotation center coordinates such that the sum of the differences is as small as possible.

As shown in FIG. 33B or FIG. 34B, the relative C-axis rotation center position viewed from the tool center is identified. The identification of the C-axis rotation center position allows an error in shape of the cutting edge 11a to be measured.

FIG. 35 shows a technique for measuring an error in shape of the cutting edge. The movement controller 22 rotates the C axis 90 degrees from a position for machining work and brings the cutting edge 11a into contact with the pre-machined surface at a plurality of points along a curve such that the same cutting edge position is brought into contact with the pre-machined surface. FIG. 35 shows a state where the lowest point of the cutting edge in the Z direction comes into contact with the pre-machined surface along a ridge represented by the broken line. The positional relationship deriving part 23 measures deformation in shape of the cutting edge as in the sixth example based on an amount of deviation between the calculated contact position and the detected contact position at each contact point.

Twelfth Example

In a twelfth example, an error in the C-axis rotation center is identified using a surface pre-machined by contour-line machining work. In this case, the positional relationship deriving part 23 does not change the positions of the C axis and the Z axis as described in the ninth example, but can use the coordinate values of two or more points where the cutting edge 11a comes into contact by changing the XY position to identify an xy relative position between the C-axis rotation center and the cutting edge 11a.

Further, making contact at multiple points on a curve where the same cutting edge position comes into contact in a position 90 degrees different in C-axis rotation position from a position during pre-machining work makes it possible to measure an error in shape of the tool cutting edge. Further, as described in the seventh example, changing the Z position and making contact at two or more points in a position 90 degrees different in C-axis rotation position from a position during pre-machining work makes it possible to identify the parallelism (inclination) between the C-axis rotation center and the Z axis.

Thirteenth Example

In a thirteenth example, a description will be given of a method for identifying a tool attachment angle and a B-axis rotation center position using a machined surface to which a straight cutting edge is transferred.

Figure 36:
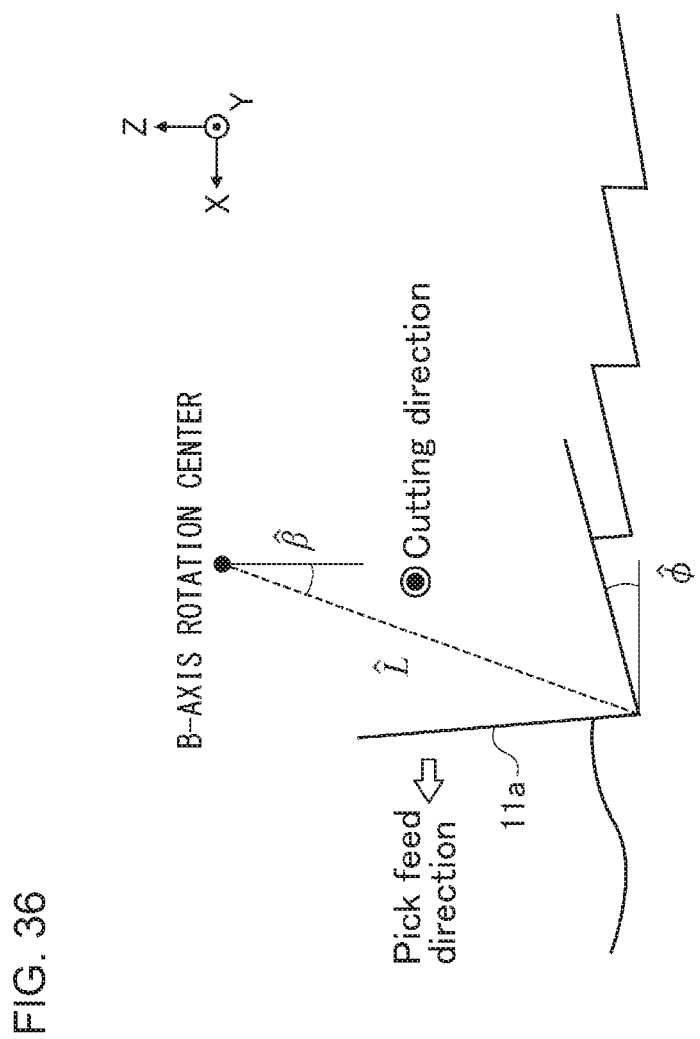
FIG. 36 is a diagram showing a state of machining work with a straight cutting edge.

FIG. 36 shows a state where machining work is performed with the cutting edge 11a that is a straight cutting edge. A description will be given below of a method for identifying an inclination φ^ of a main inclined surface of a fine groove of an already machined surface determined by the attachment angle of the tool, L^ that is a distance between the B-axis rotation center and the tip of the cutting edge, and P^ that is an inclination with respect to the Z axis. The inclination φ^ is an angle with the counterclockwise direction from the −X axis serving as a positive direction, and the inclination β^ is an angle from the −Z axis.

Figure 37:
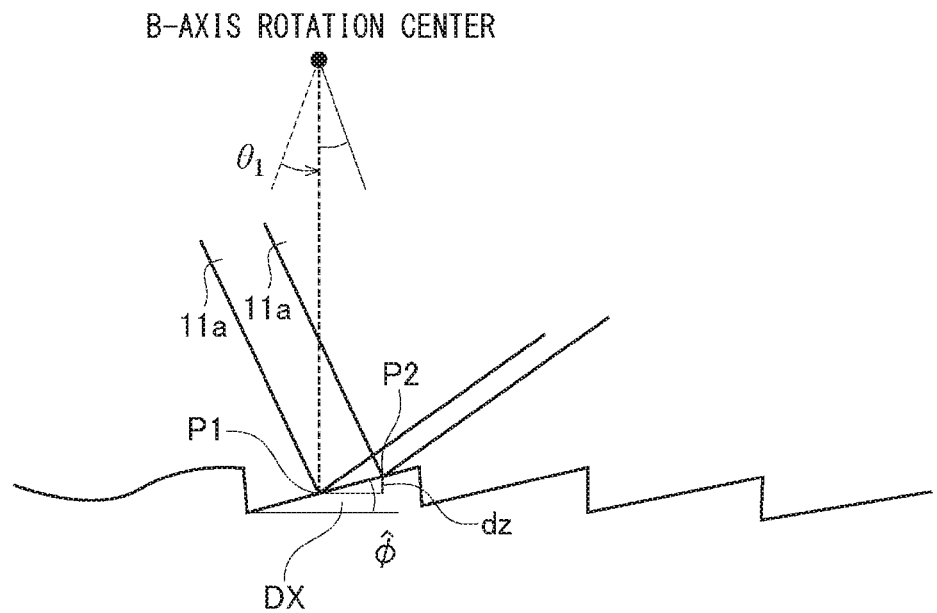
FIG. 37 is a diagram for describing an identification method.

FIG. 37 is a diagram for describing the identification method. The movement controller 22 brings the cutting edge 11a into contact with the pre-machined surface at P1 at any angle $\theta_1$ to detect $z_1$ that is the z position of P1. With the position kept unchanged, the movement controller 22 brings the cutting edge 11a into contact with the pre-machined surface at P2 shifted by DX to detect $z_2$ that is the z position of P2.

Thus, when $dz = z_2 - z_1$,

φ^=a tan(dz/|DX|) is calculated. When this inclination angle is different from an inclination angle of the target shape, correcting the difference with the B axis allows machining work by which fine grooves having more accurate inclined surfaces are formed to be performed in the final finishing work.

Figure 38:
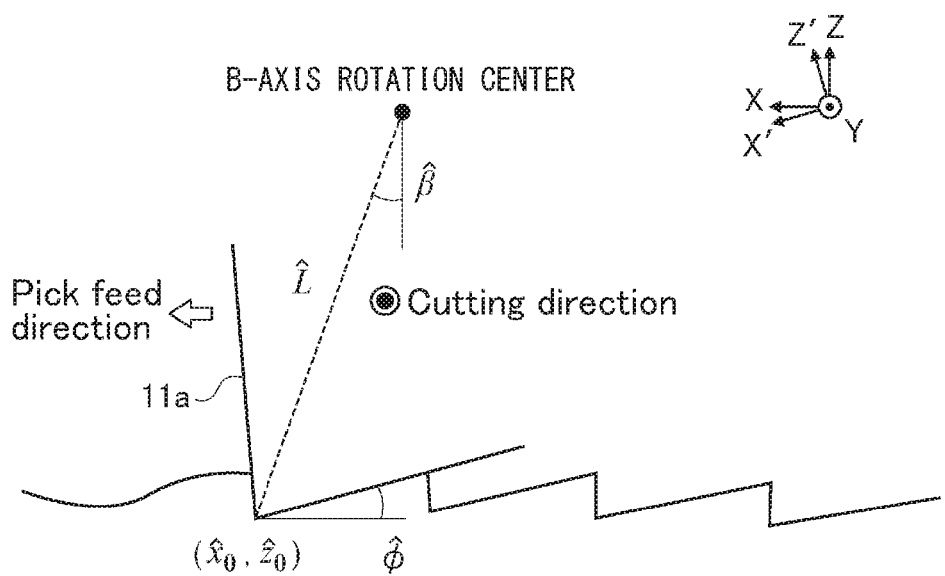
FIG. 38 is a diagram for describing coordinate conversion.

FIG. 38 is a diagram for describing a coordinate conversion.

A relative relationship between the cutting edge tip point and the B-axis rotation center is represented as follows:

$$\left\{ \begin{matrix} \widehat{x_0} \\ \widehat{z_0} \end{matrix} \right\} = \left\{ \begin{matrix} -\hat{L} \sin \hat{\beta} \\ -\hat{L} \cos \hat{\beta} \end{matrix} \right\}$$

When the coordinate system is converted using p to make the z coordinate at the cutting position equal to zero, it results in $$\left\{ \begin{matrix} \widehat{z_n} \\ \widehat{x_n} \end{matrix} \right\} = \left[ \begin{matrix} \cos\phi & \sin\phi \\ -\sin\phi & \cos\phi \end{matrix} \right] \left\{ \begin{matrix} \widehat{z_0} \\ \widehat{x_0} \end{matrix} \right\}.$$

Figure 39A:
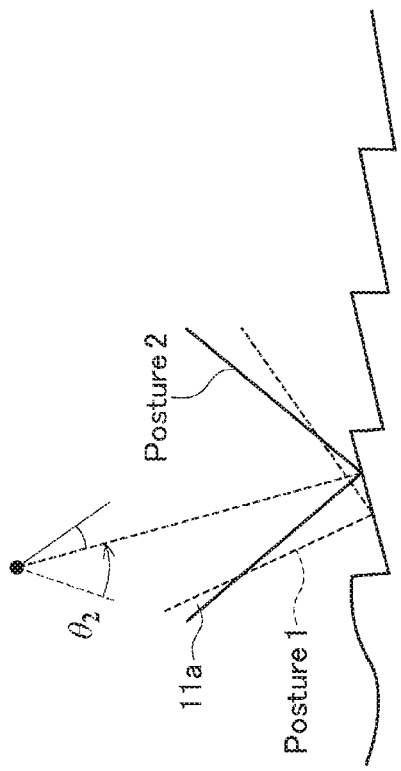
FIGS. 39A and 39B are diagrams showing a state where the cutting edge is brought into contact with a machining surface.
Figure 39B:
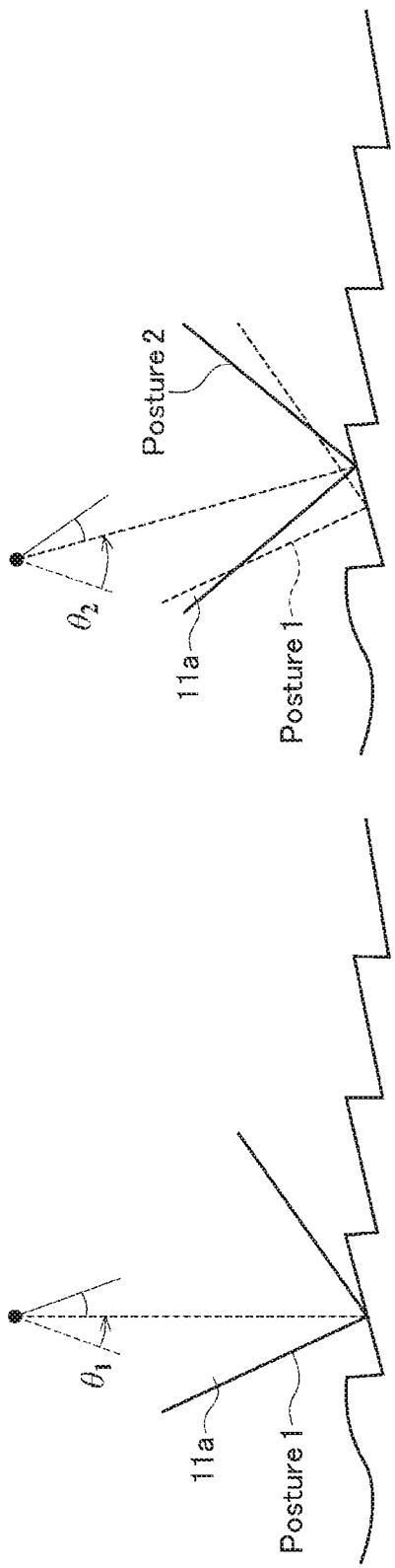

FIGS. 39A and 39B show states where the position of the cutting edge 11a is changed and brought into contact with the pre-machined surface.

FIG. 39A shows a state where, with the B axis rotated by $\theta_1$, the cutting edge 11a is moved in a direction orthogonal to the inclination c (parallel to the Z' axis) to come into contact with the pre-machined surface. FIG. 39B shows a state where, with the B axis rotated by $\theta_2$, the cutting edge 11a is moved in the direction orthogonal to the inclination φ (parallel to the Z' axis) to come into contact with the pre-machined surface. For $\theta_1$ and $\theta_2$, the counterclockwise direction is a positive direction. At this time, $z'_1$ and $z'_2$ are detected as z values.

Therefore, the following relationships are satisfied:

$$\left\{ \begin{matrix} z'_1 \\ x'_1 \end{matrix} \right\} = \left[ \begin{matrix} \cos\theta_1 & -\sin\theta_1 \\ \sin\theta_1 & \cos\theta_1 \end{matrix} \right] \left\{ \begin{matrix} \widehat{z_n} \\ \widehat{x_n} \end{matrix} \right\} + \left\{ \begin{matrix} 0 \\ x'_{1+} \end{matrix} \right\}$$

$$\left\{ \begin{matrix} z'_2 \\ x'_2 \end{matrix} \right\} = \left[ \begin{matrix} \cos\theta_2 & -\sin\theta_2 \\ \sin\theta_2 & \cos\theta_2 \end{matrix} \right] \left\{ \begin{matrix} \widehat{z_n} \\ \widehat{x_n} \end{matrix} \right\} + \left\{ \begin{matrix} 0 \\ x'_{2+} \end{matrix} \right\}$$

where $x'_{1+}$ and $x'_{2+}$ denote any shift amounts, and a shift need not be made.

The z' coordinates at the two contact points described above are determined as follows:

$$dz'_1 = z'_1 - z'_0 = \widehat{x_n} \sin \theta_1 + (\cos \theta_1 - 1)\widehat{z_n} \quad (1)$$

$$dz'_2 = z'_2 - z'_0 = \widehat{x_n} \sin \theta_2 + (\cos \theta_2 - 1)\widehat{z_n} \quad (2)$$

When the equations are solved simultaneously, it results in:

$$\widehat{x_n} = \frac{\widehat{z_n}(\cos\theta_1 - 1) - dz'_1}{\sin\theta_1}. \quad (3)$$

Therefore, $$dz'_2 = -\sin\theta_2 \frac{\widehat{z_n}(\cos\theta_1 - 1) - dx'_1}{\sin\theta_1} + (\cos\theta_2 - 1)\widehat{z_n}$$

$$= \frac{\sin\theta_2}{\sin\theta_1} dz'_1 + \left( (\cos\theta_2 - 1) - \frac{\sin\theta_2(\cos\theta_1 - 1)}{\sin\theta_1} \right) \widehat{z_n}$$

-continued $$\widehat{z_0'} = \frac{dz_2' - \frac{\sin\theta_2}{\sin\theta_1}dz_1'}{(\cos\theta_2 - 1) - \frac{\sin\theta_2(\cos\theta_1 - 1)}{\sin\theta_1}}, \quad (4)$$

④ IS SUBSTITUTED INTO ③:

$$\widehat{x_0'} = \frac{(\cos\theta_1 - 1)}{\sin\theta_1} z_0' - \frac{dz_1'}{\sin\theta_1}$$

Therefore, $$\left\{\begin{array}{c}\widehat{x_0}\\ \widehat{z_0}\end{array}\right\} = \left[\begin{array}{cc}\cos\phi & -\sin\phi\\ \sin\phi & \cos\phi\end{array}\right]\left\{\begin{array}{c}\widehat{x_0'}\\ \widehat{z_0'}\end{array}\right\}$$

$$\widehat{x_0} = -\widehat{L}\sin\hat\beta, \widehat{z_0} = -\hat L\cos\hat\beta \text{ より}.$$

$$\Rightarrow \hat\beta = \operatorname{atan}\left(\frac{\widehat{x_0}}{\widehat{z_0}}\right)$$

$$\Rightarrow \hat L = \frac{-\widehat{x_0}}{\sin\hat\beta}$$

FROM
is calculated.

As described above, according to the thirteenth example, bringing the cutting edge 11a into contact with a plurality of points on the machined surface to which the straight cutting edge has been transferred makes it possible to derive the B-axis rotation center. When it is necessary to perform machining work while rotating the B axis because, in a complicated shape such as fine grooves formed on a free-curved surface, an angle of inclined surfaces of the fine grooves varies, grasping the accurate B-axis rotation center as described above makes it possible to prevent a reduction in machining accuracy due to a deviation in the xy position of the tool cutting edge (when an error is present in the B-axis rotation center position relative to the tool cutting edge position, an error in xy position of the tool cutting edge is caused by the B-axis rotation)

In the following fourteenth to eighteenth examples, a description will be given of a process of specifying an amount of deviation in the cutting tool 11 that is a rotary tool. In the fourteenth to eighteenth examples, the movement controller 22 moves the cutting tool 11 relative to the to-be-cut object subjected to cutting work using the feed capability of the feed mechanism 7 in a movement direction not used for the cutting work, and the positional relationship deriving part 23 specifies the amount of deviation in the cutting tool 11 based on the coordinate values of at least two positions where the cutting tool 11 comes into contact with the to-be-cut object. In any of the examples, an amount of deviation in a ball end mill, as a typical example of a rotary tool, having a hemispherical ball portion provided at a tip of the ball end mill is determined, but an amount of deviation in any other type of rotary tool such as a radius end mill can be specified in a similar manner.

Fourteenth Example

In a fourteenth example, a description will be given of a method for specifying an error in shape of a cutting edge of a ball end mill.

Figure 40:
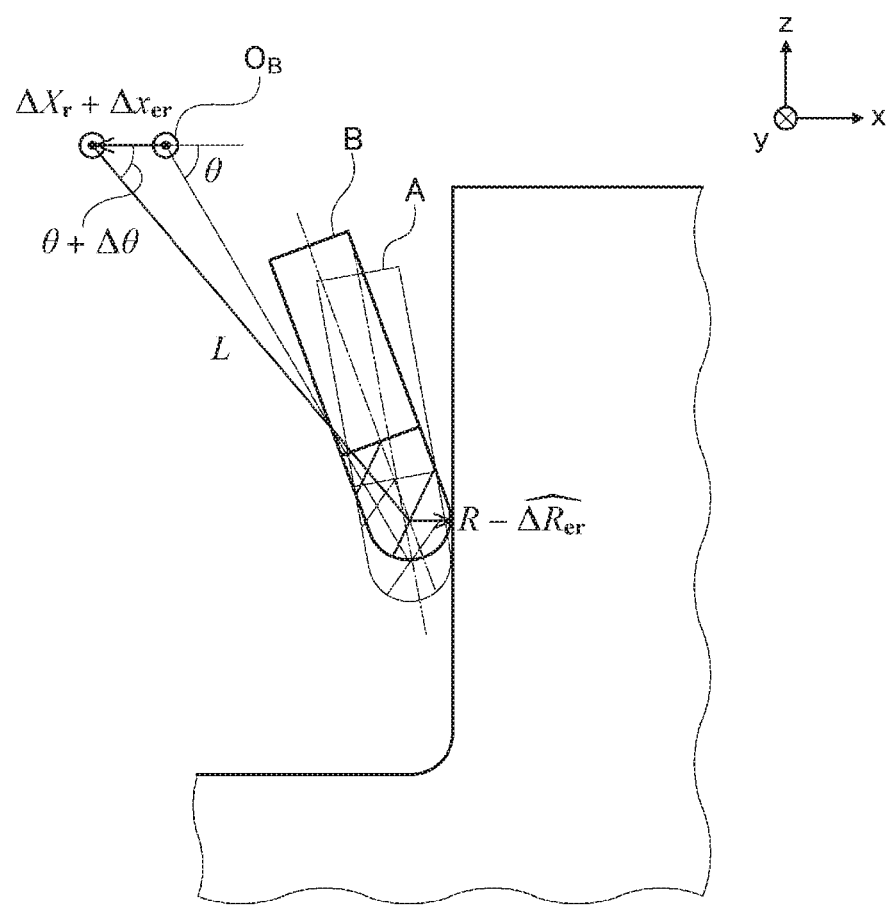
FIG. 40 is a diagram showing two different positions of a ball end mill.

FIG. 40 shows two different positions A and B of the ball end mill that is in contact with the pre-machined surface of the to-be-cut object 6. In the two positions A and B, cutting edges at different angle positions viewed from a center of a ball portion come into contact with the pre-machined surface. The position A may be a position at the time of forming the pre-machined surface, for example. In the fourteenth example, it is assumed that values other than deformation of a radius R of the cutting edge are known.

In FIG. 40, a distance L from the center of the ball portion to a B-axis center $O_B$, an angle $\theta$ in the position A, an angle $(\delta+\Delta\theta)$ in the position B, and an among of ideal movement $\Delta X_z$ of the B-axis center $O_B$ when transitioning from the position A to the position B are known. At this time, the amount of movement of the B-axis center $O_B$ is measured, and when the amount of movement is $(\Delta X, +\Delta x_{er})$, a degree of deformation of the ball shape $\Delta R_{er}{}^\wedge$ is determined as follows:

Degree of deformation of ball shape $\Delta R_{er}{}^\wedge$=among of movement deviation $\Delta x_{er}$.

As described above, bringing the ball end mill into contact with the pre-machined surface in two different positions allows shape deformation of the cutting edge (error in shape) to be measured.

Fifteenth Example

In a fifteenth example, a description will be given of a method for specifying an error in spindle attachment (tool runout amount $\Delta R^\wedge$) of a ball end mill.

Figure 41:
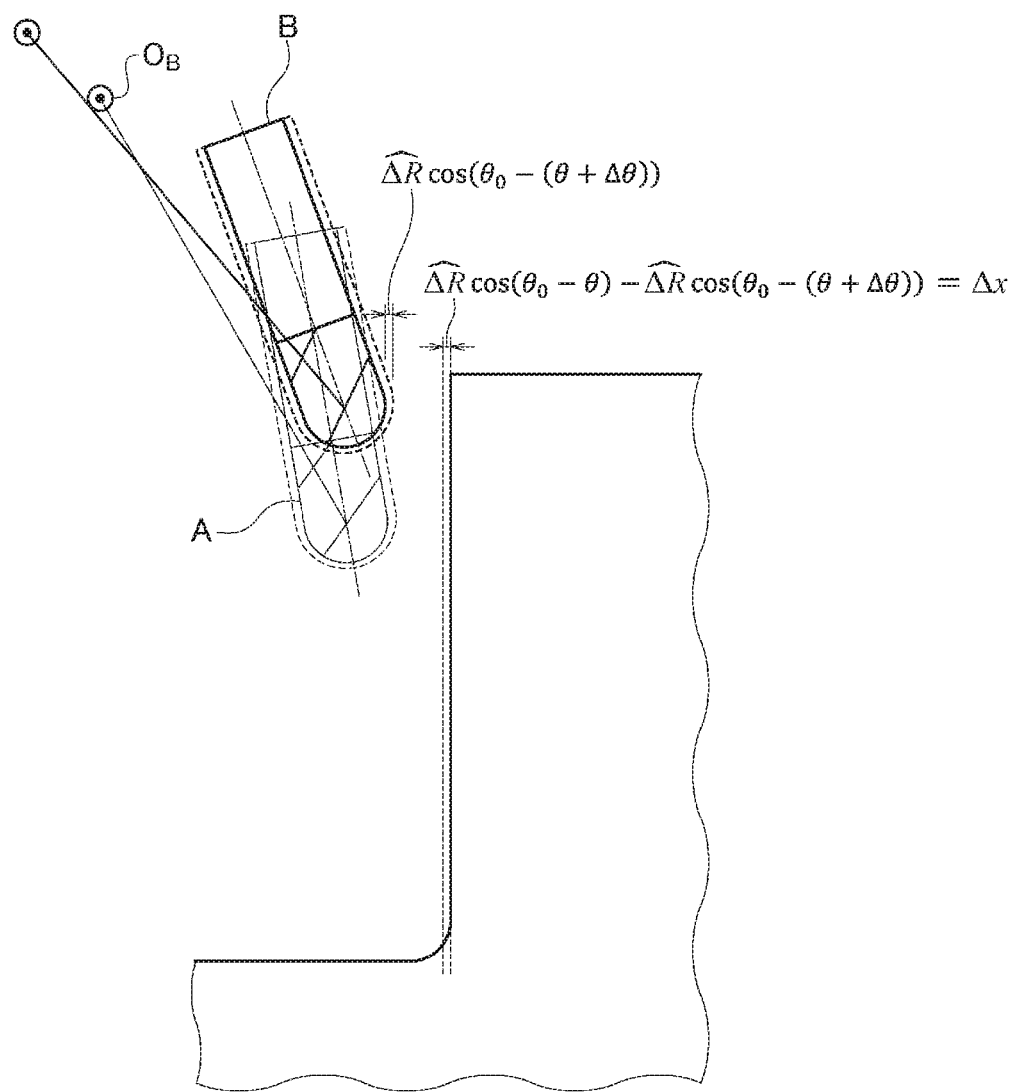
FIG. 41 is a diagram for describing a method for specifying a misalignment amount.

FIG. 41 is a diagram for describing a method for specifying a misalignment amount between the ball end mill and the spindle. In FIG. 41, a ball end mill represented by the solid line indicates a contour shape of a ball end mill that is not misaligned, and a ball end mill represented by the dotted line indicates a contour shape of a ball end mill that is misaligned. As shown in FIG. 41, when the ball end mill is misaligned, cutting is performed on an outer periphery larger than an ideal value due to axial runout. In the fifteenth example, it is assumed that values other than the tool runout amount $\Delta R^\wedge$ are known. The movement controller 22 brings the ball end mill into contact with the pre-machined surface in two positions A and B.

A B-axis rotation phase $\theta_0$ in which the spindle and the Z axis are parallel to each other, an angle $\theta$ in the position A, and an angle $(\delta+\Delta\theta)$ in the position B are known, and it is assumed that s runout amount $\Delta x$ that varies depending on the rotation $\Delta\theta$ between the position A and the position B. At this time, the tool runout amount $\Delta R^\wedge$ is determined as follows:

$$\widehat{\Delta R} = \frac{\Delta x}{\cos(\theta_0 - \theta) - \cos(\theta_0 - (\theta + \Delta\theta))}.$$

Sixteenth Example

In a sixteenth example, a description will be given of a method for specifying an error in a B-axis center $O_B$.

Figure 42:
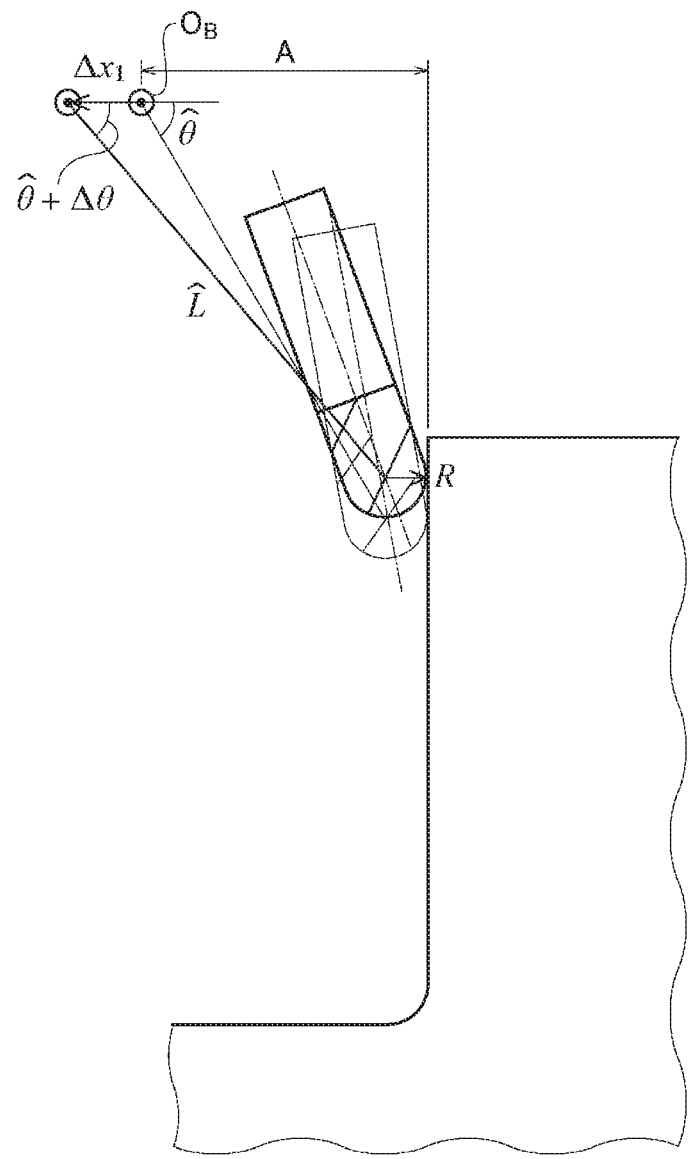
FIG. 42 is a diagram for describing a method for specifying an amount of deviation in a B-axis rotation center.

FIG. 42 is a diagram for describing a method for specifying an amount of deviation in the B-axis rotation center. In the sixteenth example, a distance $L^\wedge$ from the center of the ball portion to the B-axis center $O_B$, an angle $\theta^\wedge$ in any position are unknown, and other values are known. The movement controller 22 brings the ball end mill into contact with the pre-machined surface at an angle $\theta^\wedge$ in any position, and then moves the ball end mill back and forth by a known $\Delta\theta$ twice and brings the ball end mill into contact with the pre-machined surface. In the sixteenth example, the movement controller 22 brought the ball end mill into contact at an angle (θ^+Δθ) and an angle (δ^−Δθ), and the positional relationship deriving part 23 measured movement amounts $\Delta x_1$ and $\Delta x_2$ in the X-axis direction at that time. At this time, L^ and θ^ are determined by the following equations:

$$\hat{L}\cos\hat{\theta} + R = A \quad (1)$$

$$\hat{L}\cos(\hat{\theta} + \Delta\theta) + R + \Delta x_1 = A \quad (2)$$

$$\hat{L}\cos(\hat{\theta} - \Delta\theta) + R + \Delta x_2 = A \quad (3)$$

FROM (2) AND (3) (4) $\hat{L} = \dfrac{\Delta x_2 - \Delta x_1}{-2\sin\Delta\theta\sin\hat{\theta}}$ FROM (1), (2), AND (4) ➡ $\hat{\theta} = \operatorname{atan}\left(\dfrac{1-\cos\Delta\theta}{\sin\Delta\theta}\dfrac{\Delta x_1 - \Delta x_2}{\Delta x_1 + \Delta x_2}\right)$ As described above, contact in three different positions allows unknown L^ and θ^ to be derived.

Seventeenth Example

In a seventeenth example, an index $\theta_{xs}{}^\wedge$ related to orthogonality between the X axis and the Z axis is specified. The index $\theta_{xz}{}^\wedge$ is an amount of deviation from the right angle formed between the X axis and the Z axis.

Figure 43:
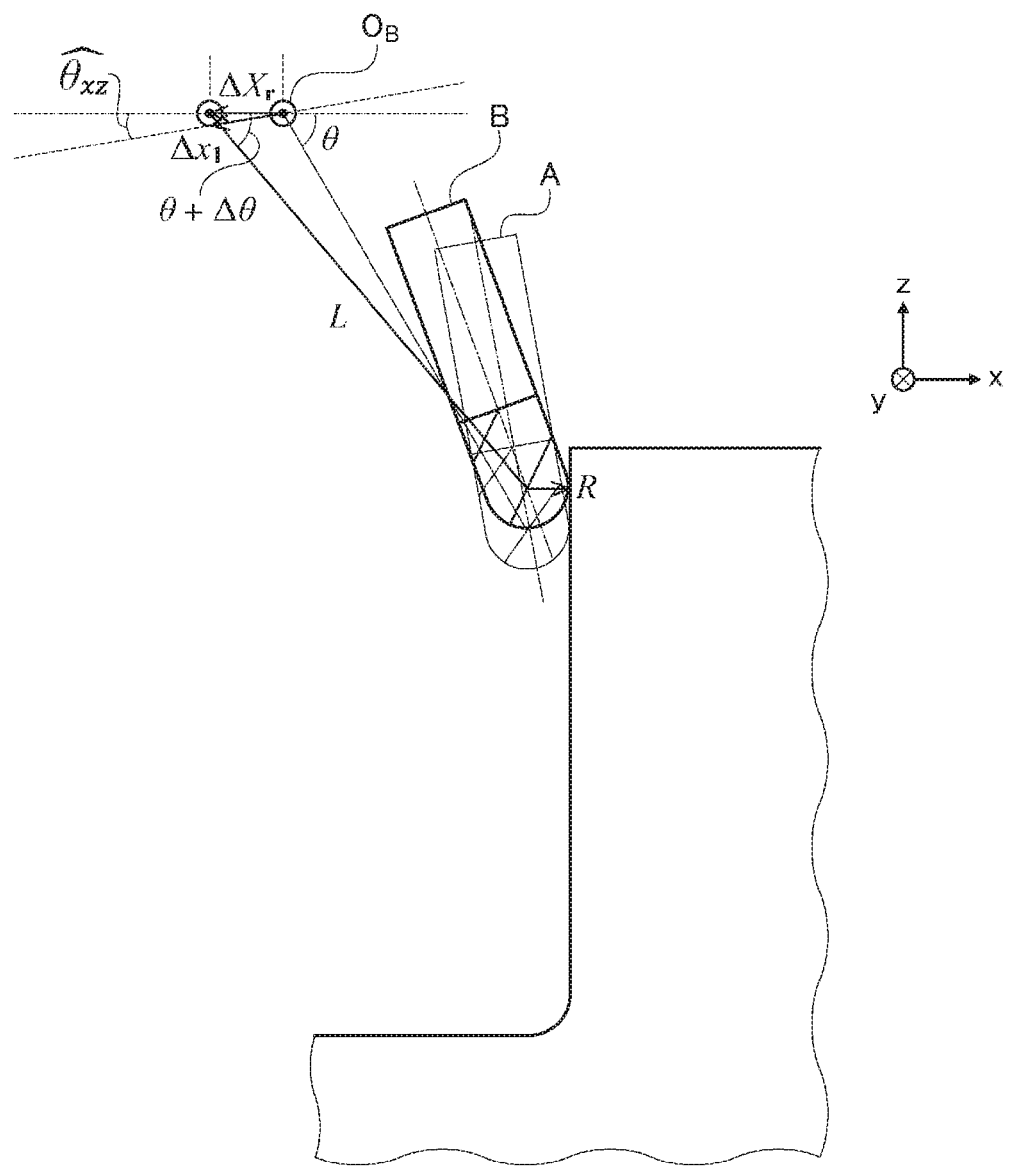
FIG. 43 is a diagram for describing a method for specifying an amount of deviation from a right angle formed between an X axis and a Z axis.

FIG. 43 is a diagram for describing a method for specifying an amount of deviation from the right angle between the X axis and the Z axis. A distance L from the center of the ball portion to the B-axis center $O_B$, an angle θ in the position A, an angle (θ+Δθ) in the position B, an amount of ideal movement ΔX, (movement amount when the X axis is orthogonal to the Z axis) of the B-axis center $O_B$ when transitioning from the position A to the position B, and a radius R of the cutting edge of the ball portion are known. When transitioning from the position A to the position B, the index $\theta_{xz}{}^\wedge$ related to orthogonality between the X axis and the Z axis is determined from an actual movement amount $\Delta x_1$ until the cutting edge comes into contact with the pre-machined surface as follows:

$\widehat{\theta_{xz}} = a\cos(\Delta X_t/\Delta x_1)$

The seventeenth example shows a method for deriving an index related to orthogonality between the X axis and the Z axis, but as described with respect to the seventh example, bringing the rotary tool into contact with the to-be-cut object 6 subjected to pre-machining work allows parallelism in the feed direction of the rotary tool with respect to the C axis to be estimated.

Eighteenth Example

In an eighteenth example, an error in the C-axis rotation center is first identified using the surface pre-machined by scanning-line machining work. In the eighteenth example as well, the error in relative C-axis rotation center position viewed from the tool center is identified by bringing the cutting edge of the cutting tool 11 into contact with the pre-machined surface at a plurality of points and deriving a difference from an ideal profile.

Figure 44:
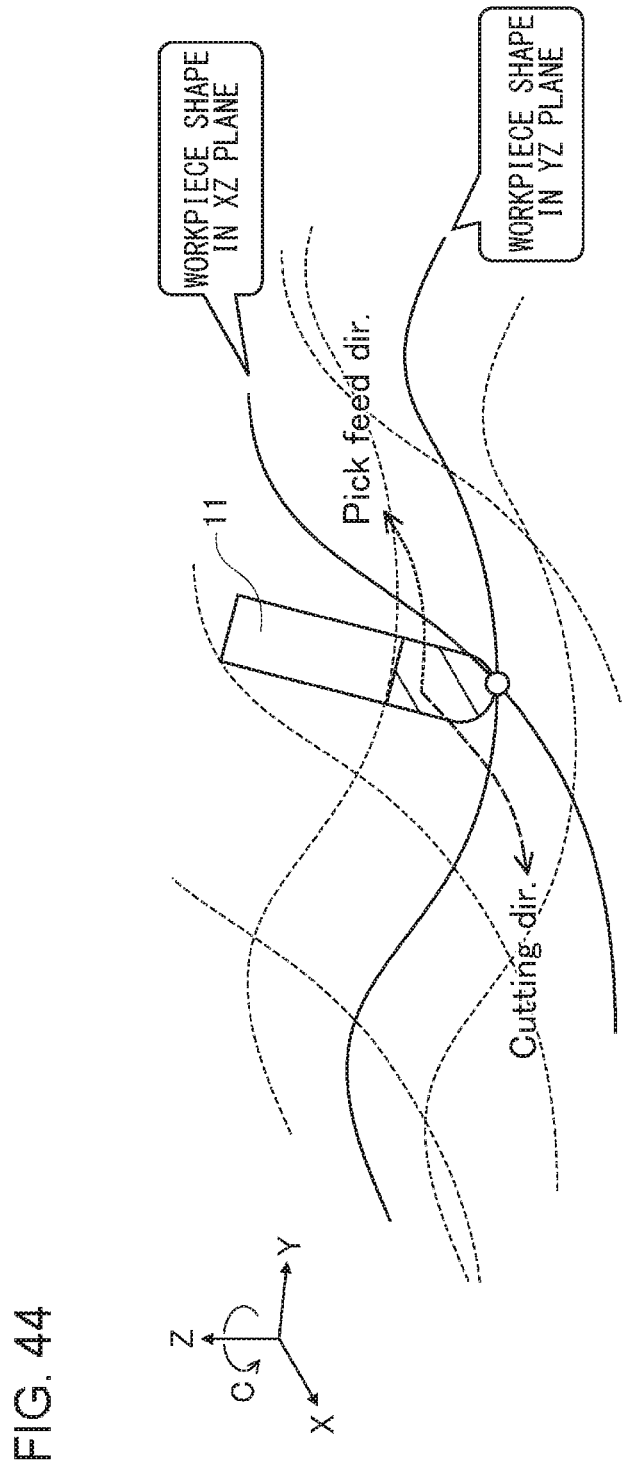
FIG. 44 is a diagram conceptually showing a cutting feed direction and a pick feed direction during scanning-line machining work.

FIG. 44 conceptually shows a cutting feed direction in the XZ plane and a pick feed direction in the YZ plane during the scanning-line machining work. In order to identify the error in the C-axis rotation center, a workpiece shape in the YZ plane and a workpiece shape in the XZ plane can be used.

Use of Workpiece Shape in YZ Plane

Figure 45A:
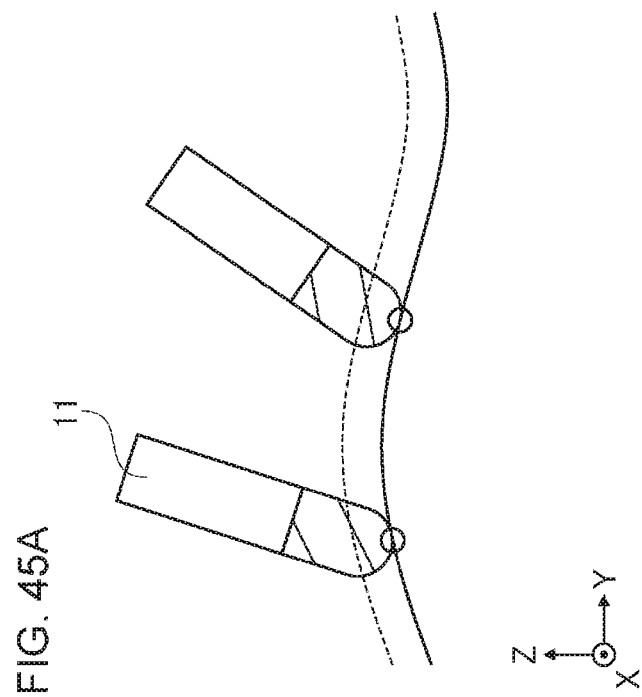
FIGS. 45A and 45B are diagrams for describing a method for estimating an attachment error in tool center.

FIG. 45A shows the cutting edge during machining work. In FIG. 45A, the dotted line represents a cutting motion profile of the center of the ball portion during machining work, and the solid line represents a pre-machined surface profile. Ideal cutting motion profile of the center of the ball portion and pre-machined surface profile are known.

Figure 45B:
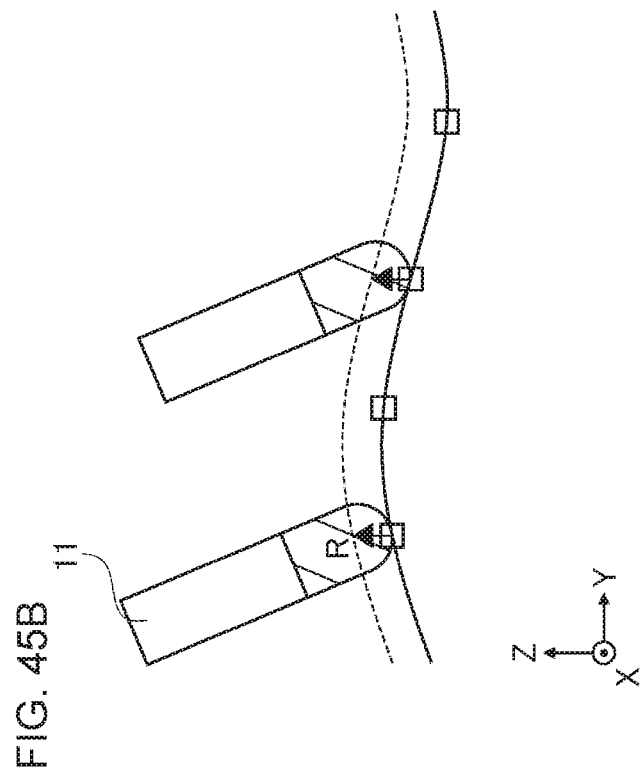

FIG. 45B shows a state where the workpiece is rotated 90 degrees about the C axis, and then the cutting edge is brought into contact with the pre-machined surface at a plurality of points. In FIG. 45B, the solid line represents a contact surface profile connecting the contact points.

The positional relationship deriving part 23 identifies a Y-direction error in the C-axis rotation center (X-direction error after and before the C-axis rotation) by numerical analysis such that the contact surface profile and the pre-machined surface profile fit each other best. Specifically, the positional relationship deriving part 23 estimates each contact position from the pre-machined surface profile, derives differences from detected positions where actual contact is made, and identifies the C-axis rotation center coordinates such that the sum of the differences is as small as possible.

Use of Workpiece Shape in XZ Plane

Figure 46B:
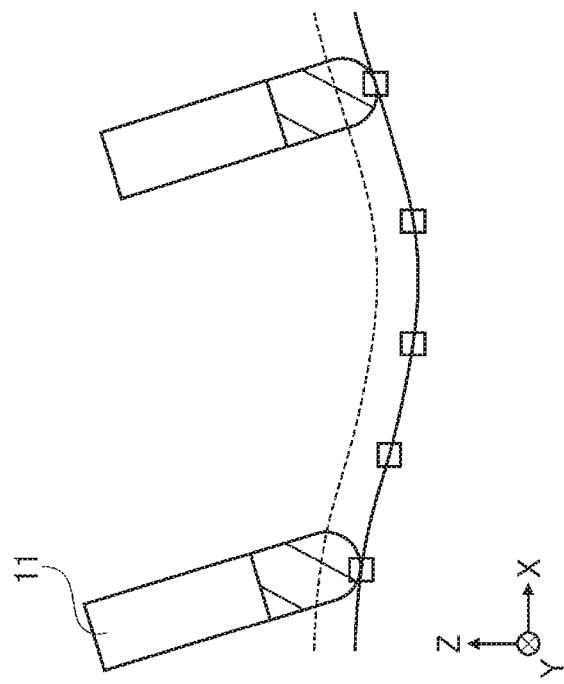
FIGS. 46A and 46B are diagrams for describing the method for estimating an attachment error in tool center.
Figure 46A:
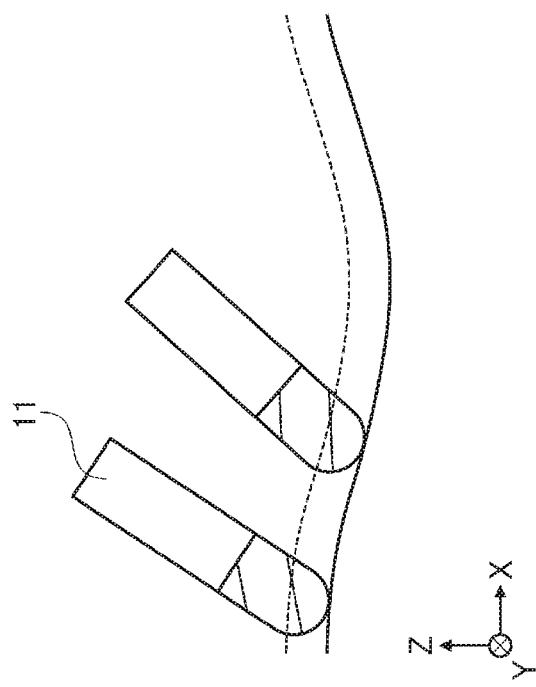

FIG. 46A shows the cutting edge during machining work. In FIG. 46A, the dotted line represents a cutting motion profile of the center of the ball portion during machining work, and the solid line represents a pre-machined surface profile. Ideal cutting motion profile of the center of the ball portion and pre-machined surface profile are known.

FIG. 46B shows a state where the workpiece is rotated 90 degrees about the C axis, and then the cutting edge is brought into contact with the pre-machined surface at a plurality of points. In FIG. 46B, the solid line represents a contact surface profile connecting the contact points.

The positional relationship deriving part 23 identifies an X-direction error in the C-axis rotation center (Y-direction error after and before the C-axis rotation) by numerical analysis such that the contact surface profile and the pre-machined surface profile fit each other best. Specifically, the positional relationship deriving part 23 estimates each contact position from the pre-machined surface profile, derives differences from detected positions where actual contact is made, and identifies the C-axis rotation center coordinates such that the sum of the differences is as small as possible.

As shown in FIG. 45B or FIG. 46B, the relative C-axis rotation center position viewed from the center of the ball portion is identified. The identification of the C-axis rotation center position allows an error in shape of the cutting edge to be measured.

Figure 47:
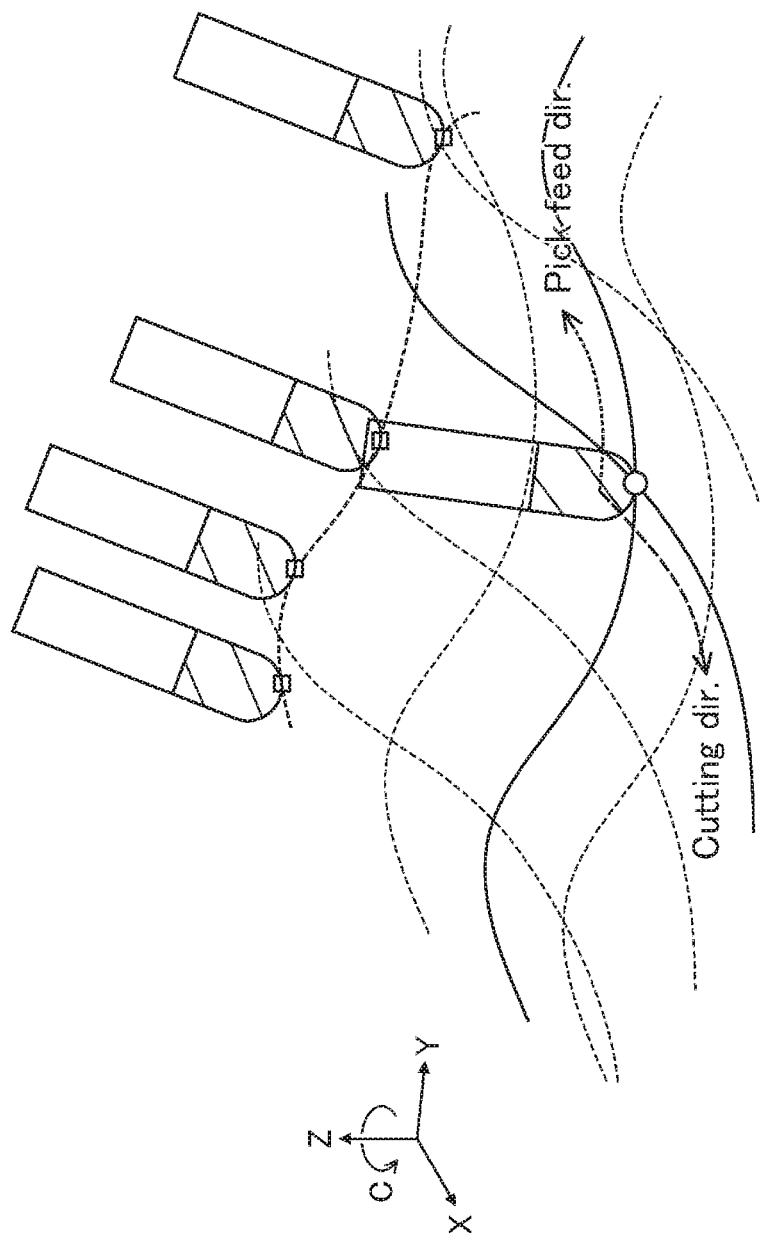
FIG. 47 is a diagram showing a method for measuring an error in shape of the cutting edge.

FIG. 47 shows a technique for measuring an error in shape of the cutting edge. The movement controller 22 rotates the workpiece 90 degrees about the C axis, and brings the cutting edge into contact with the pre-machined surface at a plurality of points along a curve such that the same cutting edge position is brought into contact with the pre-machined surface. FIG. 47 shows a state where the lowest point of the cutting edge in the Z direction comes into contact with the pre-machined surface along a ridge represented by the broken line. The positional relationship deriving part 23 measures deformation in shape of the cutting edge as in the sixth example based on an amount of deviation between the calculated contact position and the detected contact position at each contact point.

The present disclosure has been described based on the examples. It is to be understood by those skilled in the art that the examples are illustrative and that various modifications are possible for a combination of components or processes, and that such modifications are also within the scope of the present disclosure.

An outline of aspects of the present disclosure is as follows. A cutting apparatus according to an aspect of the present disclosure includes a rotation mechanism that rotates a spindle to which a cutting tool or to-be-cut object is attached, a feed mechanism that moves the cutting tool relative to the to-be-cut object or a component, and a controller that controls rotation of the spindle by the rotation mechanism and relative movement of the cutting tool by the feed mechanism. The controller has a capability of using detection information of a contact sensor or time-series data of a detection value related to a drive motor included in the rotation mechanism and/or the feed mechanism to acquire a coordinate value when the cutting tool comes into contact with the to-be-cut object or the component. The controller determines a relative positional relationship between the cutting tool and a rotation center of the to-be-cut object based on coordinate values when the cutting tool comes into contact with the to-be-cut object subjected to turning work or a reference surface whose relative positional relationship with the rotation center of the to-be-cut object is known at least at two positions different from a rotation angle position of the cutting tool during the turning work. According to this aspect, the controller determines the relative positional relationship between the cutting tool and the rotation center of the to-be-cut object based on the coordinate values of the two or more contact positions, thereby eliminating the need for installing, for example, a separate measuring instrument that measures the positional relationship.

Another aspect of the present disclosure is also a cutting apparatus. This apparatus includes a rotation mechanism that rotates a spindle to which a cutting tool or to-be-cut object is attached, a feed mechanism that moves the cutting tool relative to a target object, and a controller that controls rotation of the spindle by the rotation mechanism and relative movement of the cutting tool by the feed mechanism. The controller has a capability of acquiring a coordinate value when the cutting tool is moved relative to an object having a known shape to bring a cutting edge of the cutting tool into contact with the known shape of the object using detection information of a contact sensor or time-series data of a detection value related to a drive motor included in the rotation mechanism and/or the feed mechanism. The controller obtains, based on coordinate values when the cutting edge of the cutting tool comes into contact with the portion having the known shape of the object at least at three positions, at least one of a nose radius of the cutting edge of the cutting tool, center coordinates of the cutting edge of the cutting tool, and an error in shape of the cutting edge of the cutting tool. According to this aspect, the controller can determine a value related to the tool cutting edge based on the coordinate values of the three or more contact positions, thereby eliminating the need for installing, for example, a separate measuring instrument.

Yet another aspect of the present disclosure is also a cutting apparatus. This apparatus includes a rotation mechanism that rotates a spindle to which a cutting tool or to-be-cut object is attached, a feed mechanism that moves the cutting tool relative to the to-be-cut object, and a controller that controls rotation of the spindle by the rotation mechanism and relative movement of the cutting tool by the feed mechanism. The controller has a capability of using detection information of a contact sensor or time-series data of a detection value related to a drive motor included in the rotation mechanism and/or the feed mechanism to acquire a coordinate value when the cutting edge of the cutting tool comes into contact with the to-be-cut object. The controller specifies, based on coordinate values when the cutting tool is moved relative to the to-be-cut object subjected to cutting work using a feed capability of the feed mechanism in a movement direction not used for the cutting work to bring the cutting tool into contact with the to-be-cut object at least at two positions, at least one of an attachment error of the cutting tool, an error in shape of the cutting edge of the cutting tool, and a deviation in movement direction of the cutting tool relative to the to-be-cut object. The controller can use the feed capability of the feed mechanism in a movement direction not used for cutting work to specify at least one of an attachment error of the cutting tool, an error in shape of the cutting edge of the cutting tool, and a deviation in movement direction of the cutting tool relative to the to-be-cut object.

Yet another aspect of the present invention is also a cutting apparatus. This apparatus includes a rotation mechanism that rotates a spindle to which a cutting tool or to-be-cut object is attached, a feed mechanism that moves the cutting tool relative to the to-be-cut object, and a controller that specifies a contact position between the cutting tool and the to-be-cut object from time-series data of a detection value related to a drive motor included in the rotation mechanism and/or the feed mechanism. The controller specifies the contact position based on first time-series data of a detection value acquired before contact and second time-series data of a detection value acquired after contact. According to this aspect, the controller can accurately derive the contact timing between the cutting tool and the to-be-cut object by analyzing detections values including detection values acquired before contact and determine the contact position.

The controller may acquire the second time-series data containing a detection value greater than a predetermined threshold. The controller may set the predetermined threshold based on the first time-series data. The controller may set the predetermined threshold using an average value of the first time-series data. The controller may specify the contact position from a regression equation obtained by regression analysis on the second time-series data and the average value of the first time-series data.

What is claimed is:

1. A cutting apparatus comprising:
   a rotation drive motor that rotates a spindle to which a cutting tool or to-be-cut object is attached;
   a feed drive motor that moves the cutting tool relative to a target object; and
   a controller that is programmed to control rotation of the spindle by the rotation drive motor and relative movement of the cutting tool by the feed drive motor, wherein
   the controller is programmed to have a capability of acquiring a coordinate value when the cutting tool is moved relative to an object having a known shape to bring a cutting edge of the cutting tool into contact with a portion having the known shape of the object using detection information of a contact sensor or time-series data of a detection value related to the rotation drive motor and/or the feed drive motor, and
   the controller is programmed to obtain, based on coordinate values when the cutting edge of the cutting tool comes into contact with the portion having the known shape of the object at least at three positions, at least one of a nose radius of the cutting edge of the cutting tool, center coordinates of the cutting edge of the cutting tool, and an error in shape of the cutting edge of the cutting tool.

2. A cutting apparatus comprising:

a rotation that rotates a spindle to which a cutting tool or to-be-cut object is attached;

a feed drive motor that moves the cutting tool relative to the to-be-cut object; and a controller that is programmed to control rotation of the spindle by the rotation drive motor and relative movement of the cutting tool by the feed drive motor, wherein the controller is programmed to control a capability of using detection information of a contact sensor or time-series data of a detection value related to the rotation drive motor and/or the feed drive motor to acquire a coordinate value when a cutting edge of the cutting tool comes into contact with the to-be-cut object, and the controller is programmed to specify, based on coordinate values when the cutting tool is moved relative to the to-be-cut object subjected to cutting work by a feed capability of the feed drive motor in a movement direction not used for the cutting work to bring a cutting edge of the cutting tool into contact with the to-be-cut object at least at two positions, at least one of an attachment error of the cutting tool, an error in shape of the cutting edge of the cutting tool, and a deviation in the movement direction of the cutting tool relative to the to-be-cut object.

3. A cutting apparatus comprising:

a rotation drive motor that rotates a spindle to which a cutting tool or to-be-cut object is attached;

a feed drive motor that moves the cutting tool relative to the to-be-cut object;

a controller; and a storage medium storing a program, wherein when the program is executed, the program causes the controller to be configured to:
  specify a contact position between the cutting tool and the to-be-cut object from time-series data of a detection value related to the rotation drive motor and/or the feed drive motor, and
  derive a contact timing before the detection value reaches a predetermined threshold, specify the contact position from the contact timing derived, based on first time-series data of a detection value acquired before contact, and change in second time-series data of a detection value acquired after contact, the second time-series data containing a detection value greater than & the predetermined threshold.

4. The cutting apparatus according to claim 3, wherein the controller is also configured to set the predetermined threshold based on the first time-series data.

5. The cutting apparatus according to claim 4, wherein the controller is also configured to set the predetermined threshold using an average value of the first time-series data.

6. A cutting apparatus comprising:

a rotation drive motor that rotates a spindle to which a cutting tool or to-be-cut object is attached;

a feed drive motor that moves the cutting tool relative to the to-be-cut object;

a controller that is programmed to specify a contact position between the cutting tool and the to-be-cut object from time-series data of a detection value related to the rotation drive motor and/or the feed drive motors;

a controller; and a storage medium storing a program, wherein when the program is executed, the program causes the control to be configured to:
  set a threshold for specifying a state of contact between the cutting tool and the to-be-cut object by using first time-series data of a detection value acquired before contact, and specify second time-series data containing a detection value greater than the threshold, and
  specify the contact position based on an average value of the first time-series data and a regression equation obtained by regression analysis of the second time-series data.

7. A non-transitory computer-readable recording medium storing a computer program causing a computer to be configured to:

specify, from time-series data of a detection value related to a rotation drive motor that rotates a spindle to which a cutting tool or to-be-cut object is attached and/or a feed drive motor that moves the cutting tool relative to the to-be-cut object, first time-series data of a detection value acquired before contact and second time-series data of a detection value acquired after contact, the second time-series data containing a detection value greater than a predetermined threshold;

specify a contact timing before the detection value reaches the predetermined threshold based on the first time-series data and changes in the second time-series data; and specify a contact position between the cutting tool and the to-be-cut object based on the contact timing derived.

8. A non-transitory computer-readable recording medium storing a computer program causing a computer to be configured to:

specify, from time-series data of a detection value related to a rotation drive motor that rotates a spindle to which a cutting tool or to-be-cut object is attached and/or a feed drive motor that moves the cutting tool relative to the to-be-cut object, first time-series data of a detection value acquired before contact;

set a threshold for specifying a state of contact between the cutting tool and the to-be-cut object by using the first time-series data, specify second time-series data containing a detection value greater than the predetermined threshold from the time-series data of a detection value related to the rotation drive motor and/or the feed drive motor; and specify a contact position between the cutting tool and the to-be-cut object based on an average value of the first time-series data and a regression equation obtained by regression analysis of the second time-series data.

* * * * *